United States Patent
Orlova et al.

(10) Patent No.: US 10,685,045 B2
(45) Date of Patent: Jun. 16, 2020

(54) SYSTEMS AND METHODS FOR CLUSTER MATCHING ACROSS SAMPLES AND GUIDED VISUALIZATION OF MULTIDIMENSIONAL CYTOMETRY DATA

(71) Applicants: Darya Y. Orlova, Menlo Park, CA (US); Stephen W. Meehan, Burnaby (CA); Wayne A. Moore, San Francisco, CA (US); Guenther Walther, Mountain View, CA (US); David R. Parks, San Francisco, CA (US); Leonore A. Herzenberg, Stanford, CA (US); Connor Meehan, Burnaby (CA)

(72) Inventors: Darya Y. Orlova, Menlo Park, CA (US); Stephen W. Meehan, Burnaby (CA); Wayne A. Moore, San Francisco, CA (US); Guenther Walther, Mountain View, CA (US); David R. Parks, San Francisco, CA (US); Leonore A. Herzenberg, Stanford, CA (US); Connor Meehan, Burnaby (CA)

(73) Assignee: The Board of Trustees of The Leland Stanford Junior University, Palo Alto, CA (US)

( * ) Notice: Subject to any disclaimer, the term of this patent is extended or adjusted under 35 U.S.C. 154(b) by 240 days.

(21) Appl. No.: 15/652,194

(22) Filed: Jul. 17, 2017

(65) Prior Publication Data
US 2018/0018386 A1 Jan. 18, 2018

Related U.S. Application Data

(60) Provisional application No. 62/518,439, filed on Jun. 12, 2017, provisional application No. 62/363,109, filed on Jul. 15, 2016.

(51) Int. Cl.
*G06F 7/02* (2006.01)
*G06F 16/00* (2019.01)
(Continued)

(52) U.S. Cl.
CPC ....... *G06F 16/287* (2019.01); *G01N 15/1429* (2013.01); *G01N 15/1459* (2013.01);
(Continued)

(58) Field of Classification Search
CPC ...... G06F 16/00; G06F 16/287; G06F 16/283; G06F 16/24575; G06F 3/0482;
(Continued)

(56) References Cited

U.S. PATENT DOCUMENTS

| 8,473,215 B2 | 6/2013 | Walther et al. |
| 2005/0246105 A1 | 11/2005 | Faber et al. |

(Continued)

OTHER PUBLICATIONS

Kheng et al, "The analysis and applications of adaptive-binning color histograms," Computer Vision and Understanding, vol. 93 Apr.-Jun. 2004, retrieved Aug. 20, 2019, from https://www.sciencedirect.com/science/article/pii/S1077314203001929. (Year: 2004).*

(Continued)

*Primary Examiner* — Bruce M Moser
(74) *Attorney, Agent, or Firm* — McCarter & English, LLP; Beverly W. Lubit

(57) ABSTRACT

Some embodiments provide methods, systems and computer-readable media that employ adaptive binning and dissimilarity scores based on a quadratic form distance for multidimensional data for matching clusters in data corresponding to different sample. Some embodiments provide methods, systems and computer-readable media for rendering a first interactive display including a two-dimensional plot of at least a portion of a multidimensional data set and (Continued)

a corresponding second interactive display including a plurality of single parameter charts or histograms, each displaying information corresponding to one-dimensional measurements of a different parameter in the multidimensional data set.

15 Claims, 37 Drawing Sheets
(25 of 37 Drawing Sheet(s) Filed in Color)

(51) Int. Cl.
| | |
|---|---|
| *G06F 16/28* | (2019.01) |
| *G06F 3/0482* | (2013.01) |
| *G06F 3/0484* | (2013.01) |
| *G06T 11/20* | (2006.01) |
| *G01N 15/14* | (2006.01) |
| *G06F 16/2457* | (2019.01) |
| *G01N 15/10* | (2006.01) |
| *G01N 15/00* | (2006.01) |

(52) U.S. Cl.
CPC ........ *G06F 3/0482* (2013.01); *G06F 3/04847* (2013.01); *G06F 16/24575* (2019.01); *G06F 16/283* (2019.01); *G06T 11/206* (2013.01); *G01N 2015/0065* (2013.01); *G01N 2015/1006* (2013.01); *G01N 2015/1402* (2013.01); *G01N 2015/1477* (2013.01)

(58) Field of Classification Search
CPC . G06F 3/0487; G06T 11/206; G05N 15/1429; G05N 2015/0065; G05N 2015/1006
See application file for complete search history.

(56) References Cited

U.S. PATENT DOCUMENTS

| | | | |
|---|---|---|---|
| 2006/0020597 | A1 | 1/2006 | Keating et al. |
| 2007/0118297 | A1 | 5/2007 | Thayer |
| 2008/0243398 | A1 | 10/2008 | Rabinowitz et al. |
| 2009/0204637 | A1 | 8/2009 | Li et al. |
| 2010/0112628 | A1 | 5/2010 | Gemez et al. |
| 2012/0173199 | A1* | 7/2012 | Herzenberg ............ G06F 17/18 702/181 |
| 2013/0226469 | A1 | 8/2013 | Robinson et al. |
| 2015/0293992 | A1 | 10/2015 | Meehan et al. |

OTHER PUBLICATIONS

Worley et al, "Generalized Adaptive Binning of Multiway Data," Chemometr Intell Lab Syst, Aug. 2015 pp. 42-46, retrieved Aug. 20, 2019 from https://www.ncbi.nlm.nih.gov/pmc/articles/PMC4456038/. (Year: 2015).*

Cron, A. et al. Hierarchical modeling for rare event detection and cell subset alignment across flow cytometry samples. PLoS Comput Biol. 9(7), e1003130 (2013).

Dundar, M. et al. A non-parametric Bayesian model for joint cell clustering and cluster matching: identification of anomalous sample phenotypes with random effects. BMC Bioinjormatics. 15,314 (2014).

Escobar, M. D. & West, M. Bayesian density estimation and inference using mixtures. JASA. 90(430),577-588 (1995).

Gemez, Y., et al., Blood basophils from cystic fibrosis patients with allergic bronchopulmonary aspergillosis are primed and hyperresponsive to stimulation by Aspergillus allergens. J Cyst Fibros. 11,502-510 (2012).

Ghosn, E. E., et al. Two physically, functionally, and developmentally distinct peritoneal macrophage subsets. Proc Natl Acad Sci USA. 107(6),2568-2573 (2010).

Hastie, T., Tibshirani, R. & Friedman, J. Local methods in high dimensions in the elements of statistical learning. 22-27 (Springer-Verlag, 2009).

Lee, S. et al. Modeling of inter-sample variation in flow cytometric data with the joint clustering and matching procedure. Cytometry A. 89(1),30-43 (2016).

Meehan, S. et al., AutoGate: automating analysis of flow cytometry data. Immunol Res. 58(2-3),218-223 (2014).

Moore, W. A. & Parks, D. R. Update for the logicle data scale including operational code implementations. Cytometry A. 81(4),273-277 (2012).

Pyne, S. et al. Automated high-dimensional flow cytometric data analysis. Proc. Natl Acad Sci USA. 106,8519-8524 (2009).

Roederer et al., Probability binning comparison: a metric for quantitating multivariate distribution differences. Cytometry, (2001) 45: 47-55.

Roederer M. et al. Probability Binning Comparison: a metric for quantitating univariate distribution differences. Cytometry (2001); 45:37-46.

Walther, G. et al. Automatic clustering of flow cytometry data with density-based merging. Adv Bioinformatics. 686759; 10.1155/2009/686759 (2009).

Gentleman, R. et al. "Bioconductor: open software development for computational biology and bioinformatics", Genome Biology. Sep. 2004; vol. 5(10), pp. 1-16.

Lampariello, F. et al., "Complete mathematical modeling method for the analysis of immunofluorescence distributions composed of negative and weakly positive cells", Cytometry.1998; vol. 32, pp. 241-254.

Lo, K. et al. "Automated gating of flow cytometry data via robust model-based clustering", Cytometry. 2008; vol. 73(4), pp. 321-332.

Murphy, R. F. et al., "Automated identification of subpopulations in flow cytometric list mode data using cluster analysis", Cytometry. 1985; vol. 6(4), pp. 302-309.

Overton, W.R. "Modified histogram subtraction technique for analysis of flow cytometry data", Cytometry. 1988; vol. 9(6), pp. 619-626.

Rogers, W.T. et al., "FlowFP: A Bioconductor Package for Fingerprinting Flow Cytometric Data", Adv Bioinformatics,2009; vol. 2009, pp. 1-11.

* cited by examiner

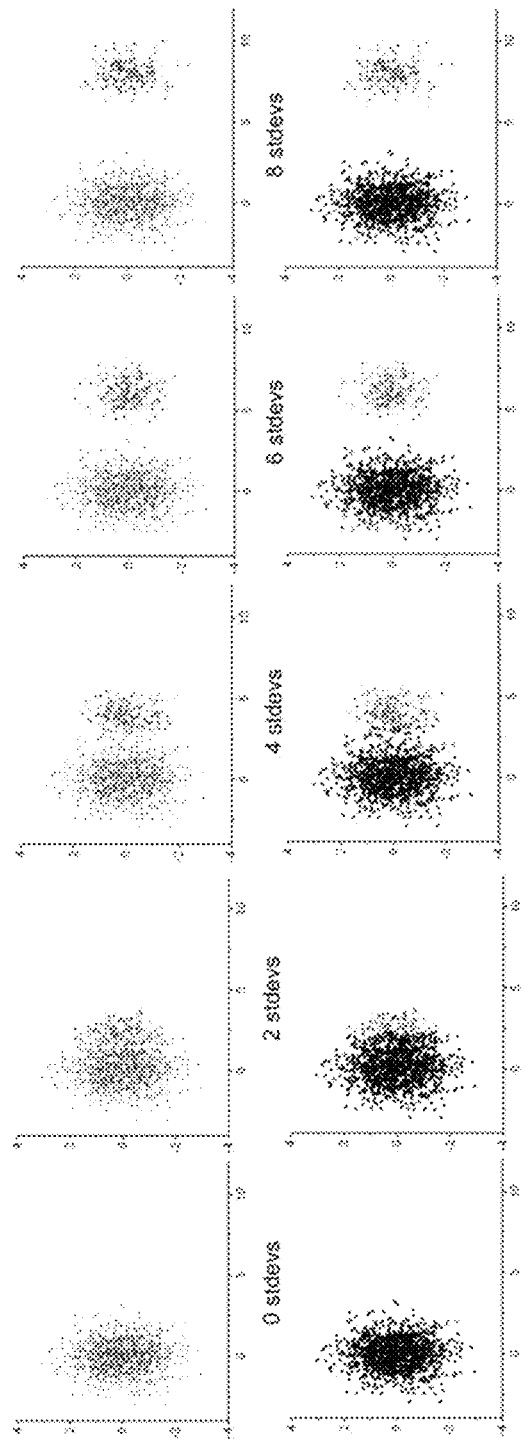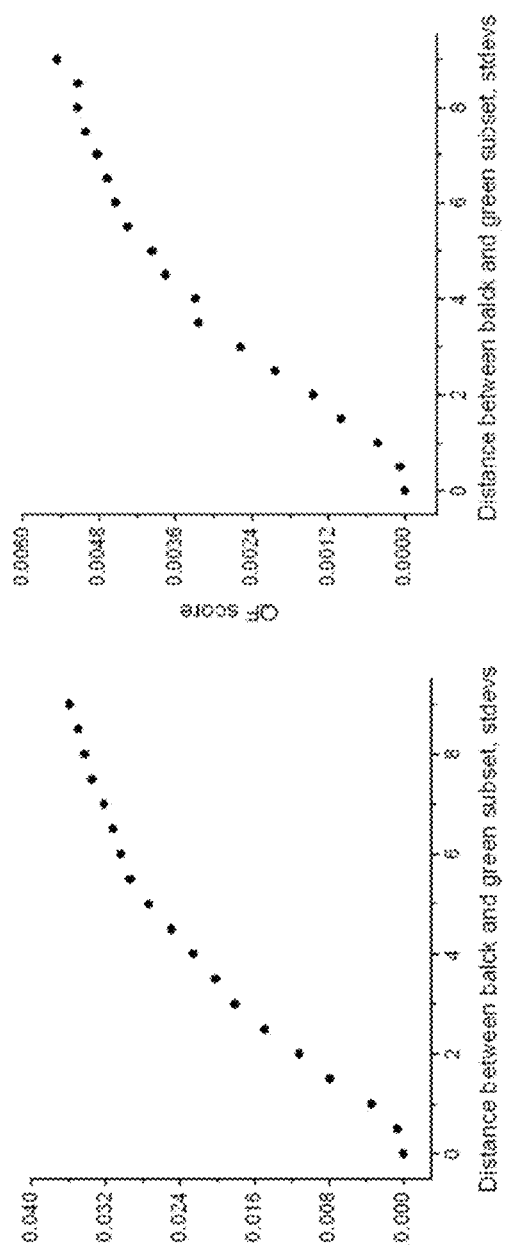
Figure 3A
Figure 3B
Figure 3C
Figure 3D

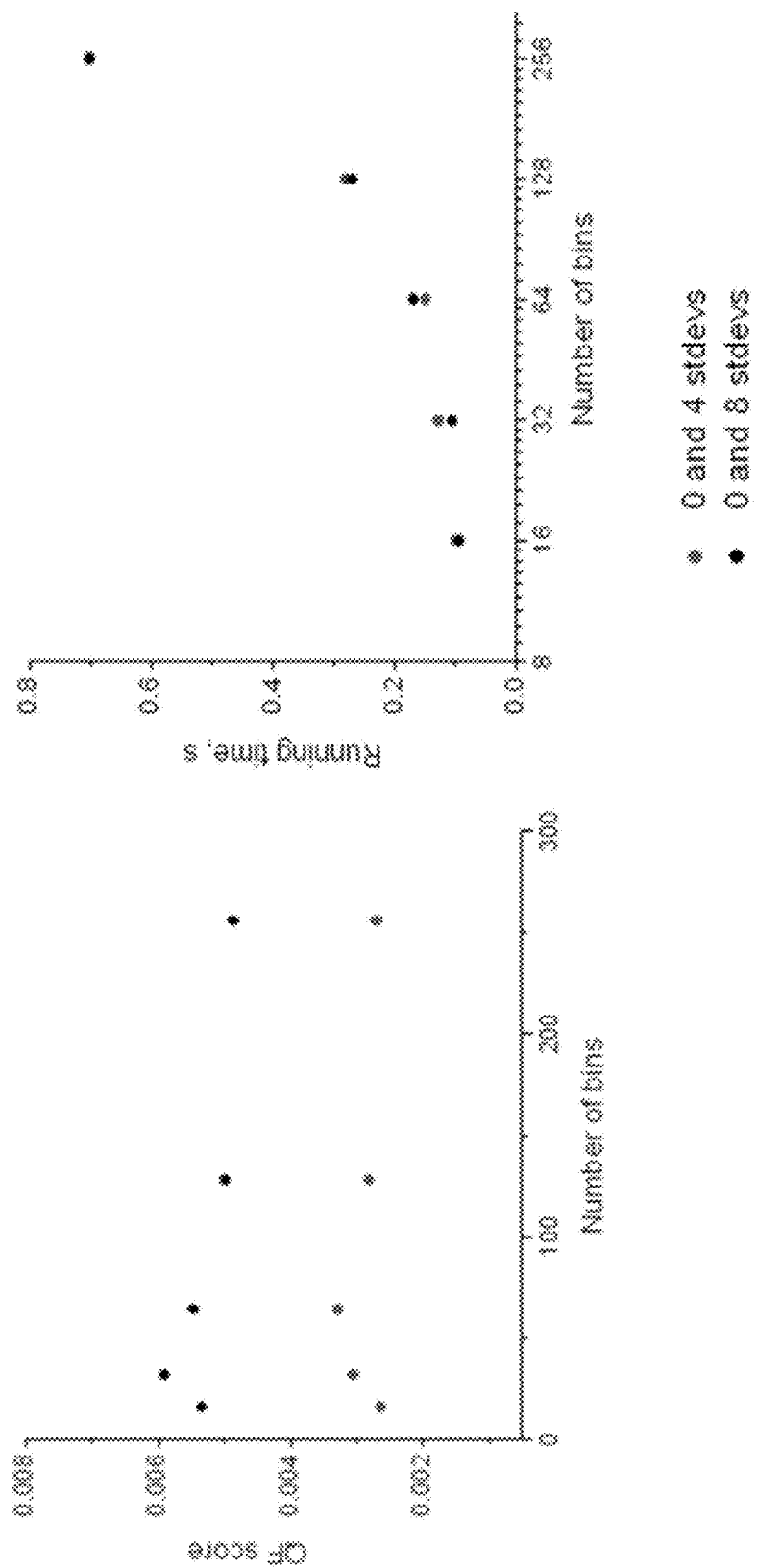

SYSTEMS AND METHODS FOR CLUSTER MATCHING ACROSS SAMPLES AND GUIDED VISUALIZATION OF MULTIDIMENSIONAL CYTOMETRY DATA

CROSS-REFERENCE TO RELATED APPLICATIONS

This application claims the benefit of priority to U.S. Provisional Application No. 62/363,109 filed Jul. 15, 2016, and U.S. Provisional Application No. 62/518,439 filed Jun. 12, 2017, the entire contents of both of which are incorporated by reference herein.

STATEMENT OF GOVERNMENT INTEREST

This invention was made with Government support under contract AI098519 awarded by the National Institutes of Health. The Government has certain rights in the invention.

FIELD OF THE INVENTION

Embodiments are related to the fields of data analysis and visualization (e.g., for cytometry). More specifically, some embodiments are related to tracking clusters corresponding to similar data items (e.g., similar cells) across different samples. Some embodiments are related to visualization tools to facilitate sequential gating of multidimensional data (e.g., Hi-D data).

BACKGROUND

Most flow and mass cytometry applications in biomedical studies are based on comparisons between/among control and test samples. Dissimilarities between/among samples may be due to drug treatment regime, progression of disease, response to therapies, etc. To study these dissimilarities across samples, the populations of cells in each sample may be clustered to reveal phenotypically distinct cell subsets that can then be matched and compared between samples. Despite the widespread use of flow and mass cytometry to evaluate outcomes in the laboratory and the clinic, current analysis methods for sample comparison and matching between samples still require further development to fully accommodate real-world flow/mass cytometry data. At present, methods for samples comparison and matching are either computationally expensive and affected by the curse of dimensionality or fail in the presence of small changes due to instrument noise, calibration, etc., that are very common in flow cytometry and similar type of data as explained below.

Traditionally cluster analysis of flow cytometry data has been done by manual gating of the data, which has proved effective in a gross sense but is both subjective and extremely laborious, particularly with current high-dimensional (Hi-D) (e.g., >6 measured parameters) data sets. The need to facilitate these analyses, and make them more accurate, has motivated development of automated or semi-automatic clustering and cluster matching methods for Hi-D flow and mass cytometry data.

Both of these tasks (cluster identification and cluster matching) are highly challenging because they are subject to the "curse of dimensionality", a well-known statistical problem for Hi-D data that compromises both statistical validity and computational performance as described in Hastie, T., Tibshirani, R. & Friedman, J. Local methods in high dimensions in *The elements of statistical learning.* 22-27 (Springer-Verlag, 2009).

Existing methods address the cluster matching problem in two different ways, both of which have limitations. The first way is to cluster one sample at a time and align and match the cell subsets (clusters) present in multiple samples post clustering (e.g., Pyne, S. et al. Automated high-dimensional flow cytometric data analysis. *Proc. Natl Acad Sci USA.* 106, 8519-8524 (2009) (hereafter "Pyne et al., *Proc. Natl Acad Sci,* 2009")). This conventional approach allows fast computational implementations in low dimensions. However, it can fail if the locations of the populations (clusters) significantly vary from sample to sample, or if populations disappear or appear between samples. When clustering is performed in Hi-D settings, this approach may also be compromised by the curse of dimensionality.

The second type of approach (e.g., see Lee, S. et al. Modeling of inter-sample variation in flow cytometric data with the joint clustering and matching procedure. *Cytometry A.* 89(1), 30-43 (2016) (hereafter "Lee et al., *Cytometry part A,* 2016"); Cron, A. et al. Hierarchical modeling for rare event detection and cell subset alignment across flow cytometry samples. *PLoS Comput Biol.* 9(7), e1003130 (2013) (hereafter "Cron et al., *PLoS Comput Biol,* 2013"); and Dundar, M. et al. A non-parametric Bayesian model for joint cell clustering and cluster matching: identification of anomalous sample phenotypes with random effects. *BMC Bioinformatics.* 15, 314 (2014) (hereafter "Dundar et al., *BMC Bioinformatics,* 2014")) alleviates some of these problems by creating a Hi-D template of meta-clusters (distinct biologically relevant cell types) in which all sample data are pooled, simultaneously clustered, and then matched. With these methods, multiple samples are treated as different realizations of a single underlying model reflecting the biological reality.

Apart from being computationally expensive, the majority of methods that belong to this category identify clusters by fitting mathematical models to datasets. The feasibility of fitting in these case; however, is dramatically affected by the curse of dimensionality, because the number of combinations of possible parameters to be considered increases dramatically as the number of dimensions increases above three or four.

Thus, although the existing methods offer solutions to some aspects of the cluster-matching problem, they still do not fully accommodate real-world flow/mass cytometry data.

Conventional systems and methods also have drawbacks when being used for sequential gating of high dimensional flow data. Some conventional analysis applications used for sequential gating of Hi-D flow data include tools providing progressive two-dimensional (2D) views of the Hi-D flow data. However, conventional analysis applications do not provide the user with guidance for deciding which pair of reagents/markers may be a good candidate for the next recursive analysis round. Instead, it leaves these choices up to the user, who often must resort to trial and error in making these analysis choices, a frustrating process when a large number of reagents and/or fluorescence detectors are used to distinguish individual subsets.

Thus, there is a need for a systems and methods directed to improved cluster matching and user guidance for sequential gating of flow data, especially Hi-D flow data.

BRIEF SUMMARY

Some embodiments are directed to methods, systems, and computer readable media for multidimensional cluster matching across samples. Some embodiments are directed to methods, systems, and computer readable media for visualization of multidimensional data (e.g., to facilitate sequential gating of cytometry data).

An embodiment provides a computer implemented method of matching clusters in data corresponding to different samples. The method includes obtaining or receiving first sample data, second sample data, an identification of one or more clusters in the first sample data, and an identification of one or more clusters in the second sample data. The method also includes performing multivariate adaptive binning on a combined data set including the first sample data and the second sample data to determine a combined binning pattern. The method includes applying the combined binning pattern separately to the first sample data and the second sample data. The method also includes, for at least some combinations of a first identified cluster in the first sample data and a second identified cluster in the second sample data, determining a dissimilarity score for the combination based on a quadratic form distance for multi-dimensional data using the combined binning pattern applied to the first identified cluster and the combined binning pattern applied to the second identified cluster. The method further includes identifying one or more matched clusters and one or more merging candidates based on comparisons of the determined dissimilarity scores for the combinations, and determining, for each merging candidate in the first sample data or the second sample data, whether the merging candidate corresponds to a split of a cluster in the other sample data or corresponds to a missing cluster in the other sample data.

In some embodiments, the method further includes forming the combined data set including the first sample data and the second sample data prior to performing multivariate adaptive binning on the combined data set.

In some embodiments, applying the combined binning pattern separately to the first sample data and the second sample data includes, for at least some of the identified clusters in the first sample data and the second sample data, generating a histogram for the identified cluster based on the combined binning pattern. In some embodiments, a histogram is generated for each identified cluster in the in first sample data and in the second sample data based on the combined binning pattern. In some embodiments, determining the dissimilarity score for the combination based on the quadratic form distance for multi-dimensional data using the combined binning pattern applied to the first identified cluster and the combined binning pattern applied to the second identified cluster includes using the histogram generated for the first identified cluster and the histogram generated for the second identified cluster.

In some embodiments, the dissimilarity score for a first cluster in the first sample data and a second cluster in the second sample data is determined based on the following equation:

$$D^2(h,f) = (h-f)^T A(h-f) = \Sigma_{i=1}^n \Sigma_{j=1}^n a_{ij}(h_i-f_i)(h_j-f_j),$$

in which $h_i$ are the relative frequencies of the first cluster in the first sample data based on the combined binning pattern applied to the first cluster, $f_i$ are the relative frequencies of the second cluster in the second sample data based on the combined binning pattern applied to the second cluster, and $A=[a_{ij}]$ is a matrix of spatial dissimilarity between a bin i in the combined binning pattern of the first cluster in the first sample data and a bin j in the combined binning pattern of the second cluster in the second sample data.

In some embodiments, $a_{ij}=1-d_{M_{ij}}/d_{max}$, where $d_{M_{ij}}$ is the Euclidean distance between centers of mass as calculated on the combined data set of the ith and jth bins in the combined binning pattern, and $d_{max}$ is the maximum value of all the $d_{M_{ij}}$.

In some embodiments, identifying one or more matched clusters and one or more merging candidates based on comparisons of the determined dissimilarity scores for the combinations includes determining a lowest dissimilarity score for each cluster in the first sample data and the second sample data. In some embodiments, identifying one or more matched clusters and one or more merging candidates also includes, for each cluster: identifying the cluster as matched to a corresponding cluster in the other sample data where the lowest dissimilarity score for the cluster in the first sample data or the second sample data is also the lowest dissimilarity score for the corresponding cluster in the other sample data; and identifying the cluster as a candidate merging cluster where the lowest dissimilarity score for the cluster in the first sample data or the second sample data is not the lowest dissimilarity score for the corresponding cluster in the other sample data set.

In some embodiments, determining, for each merging candidate in the first sample data or the second sample data, whether the merging candidate corresponds to a split of a cluster in the other sample data or corresponds to a missing cluster in the other sample data includes combining the merging candidate with the nearest cluster in the same sample data and calculating a new dissimilarity score for the combined cluster. In some embodiments, the determining also includes identifying the merging candidate as a split of the corresponding cluster in the other sample data where the new dissimilarity score is equal to or lower than the lowest prior dissimilarity score for the nearest cluster and using the combination of the merging candidate and the nearest cluster as a merged cluster matched to the corresponding cluster for any further determinations of whether a merging candidate corresponds to a split of a cluster or a missing cluster; and identifying the candidate merging cluster as missing from the other sample where the new dissimilarity score is higher than the lowest prior dissimilarity score for the nearest matched cluster.

In some embodiments, the multivariate adaptive binning is performed in k-dimensions and performing multivariate adaptive binning on the combined data set including the first sample data and the second sample data to determine the combined binning pattern includes dividing the data into k-dimensional bins such that each bin contains the same number of events. In some embodiments, k is between 3 and 50, between 6 and 50, between 7 and 50, between 8 and 50, between 9 and 50, between 10 and 50, or between 6 and 100. In some embodiments, k is greater than 3, greater than 5, greater than 6, greater than 7, greater than 8, greater than 9, or greater than 10.

In some embodiments, a dissimilarity score is determined for each combination of an identified cluster in the first sample data and an identified cluster in the second sample data.

In some embodiments, the first sample data and the second sample data include cytometry data. In some embodiments, the method is a method for aligning cell subsets in different cytometry samples.

In some embodiments, at least some of the dimensions in the multivariate adaptive binning correspond to measured fluorescence data in spectral ranges corresponding to markers in the first sample data and the second sample data.

In some embodiments, for each matched cluster in the first data sample or the second data sample and each corresponding cluster in the other data sample, the method also includes determining a distance between a geometric mean of the matched cluster and a geometric mean of the corresponding cluster. In some embodiments, the method also includes for a distance between the geometric mean of the matched cluster and the geometric mean of the corresponding cluster exceeding a threshold value, identifying the matched cluster and the corresponding cluster as unmatched. In some embodiments, the threshold falls in a range of 2 σ to 5 σ.

An embodiment provides a system for matching clusters in data corresponding to different samples. The system includes memory in communication with storage configured to store first sample data, second sample data, an identification of one or more clusters in the first sample data, and an identification of one or more clusters in the second sample data. The system also includes a processor including: an adaptive binning module, a dissimilarity module, a matching and merging candidate identification module, and a determination module. The adaptive binning module is configured to perform multivariate adaptive binning on a combined data set including the first sample data and the second sample data to determine a combined binning pattern. The dissimilarity module is configured to, for at least some combinations of a first identified cluster in the first sample data and a second identified cluster in the second sample data, determine a dissimilarity score for the combination based on a quadratic form distance for multi-dimensional data using the combined binning pattern applied to the first identified cluster in the first data set and the combined binning pattern applied to the second identified cluster in the second data set. The matching and merging candidate identification module is configured to identify one or more matched clusters and one or more merging candidates based on comparisons of the determined dissimilarity scores for the combinations. The determination module is configured to determine, for each merging candidate in the first sample data or the second sample data, whether the merging candidate corresponds to a split of a cluster in the other sample data or corresponds to a missing cluster in the other sample data.

In some embodiments, the adaptive binning module or the dissimilarity module is further configured to apply the combined binning pattern separately to the first sample data and the second sample data.

In some embodiments, the adaptive binning module or the dissimilarity module is further configured to, for at least some of the identified clusters in the first sample data and the second sample data, generate a histogram for the identified cluster based on the combined binning pattern.

In some embodiments, the dissimilarity module is configured to determine a dissimilarity score for a combination of a first identified cluster in the first sample data and a second identified cluster in the second sample data based on the following equation:

$$D^2(h,f)=(h-f)^T A(h-f)=\Sigma_{i=1}^n \Sigma_{j=1}^n a_{ij}(h_i-f_i)(h_j-f_j),$$

in which $h_i$ are the relative frequencies of the first cluster in the first sample data based on the combined binning pattern applied to the first cluster, $f_i$ are the relative frequencies of the second cluster in the second sample data based on the combined binning pattern applied to the second cluster, and $A=[a_{ij}]$ is a matrix of spatial dissimilarity between a bin i in the combined binning pattern of the first cluster in the first sample data and a bin j in the combined binning pattern of the second cluster in the second sample data. In some embodiments, $a_{ij}=1-d_{M_{ij}}/d_{max}$, where $d_{M_{ij}}$ is the Euclidean distance between centers of mass as calculated on the combined data set of the ith and jth bins in the combined binning pattern, and $d_{max}$ is the maximum value of all the $d_{M_{ij}}$.

In some embodiments, the matching and merging candidate identification module is configured to identify the one or more matched clusters and the one or more merging candidates based on comparisons of the determined dissimilarity scores for the combinations by performing steps including determining a lowest dissimilarity score for each cluster in the first sample data and the second sample data. The steps further include for each cluster: identifying the cluster as matched to a corresponding cluster in the other sample data where the lowest dissimilarity score for the cluster in the first sample data or the second sample data is also the lowest dissimilarity score for the corresponding cluster in the other sample data; and identifying the cluster as a candidate merging cluster where the lowest dissimilarity score for the cluster in the first sample data or the second sample data is not the lowest dissimilarity score for the corresponding cluster in the other sample data set.

In some embodiments, the determination module is configured to determine, for each merging candidate in the first sample data or the second sample data, whether the merging candidate corresponds to a split of a cluster in the other sample data or corresponds to a missing cluster in the other sample data by performing steps including combining the merging candidate with the nearest cluster in the same sample data and calculating a new dissimilarity score for the combined cluster. The steps also include identifying the merging candidate as a split of the corresponding cluster in the other sample data where the new dissimilarity score is equal to or lower than the lowest prior dissimilarity score for the nearest cluster, and using the combination of the merging candidate and the nearest cluster as a merged cluster matched to the corresponding cluster for any further determinations of whether a merging candidate corresponds to a split of a cluster or a missing cluster. The steps also include identifying the candidate merging cluster as missing from the other sample where the new dissimilarity score is higher than the lowest prior dissimilarity score for the nearest matched cluster.

An embodiment provides a method including rendering a graphical user interface. The graphical user interface includes a first interactive display and a second interactive display. The first interactive display includes a two-dimensional plot of at least portion of a data set, the data set including data corresponding to measurements of a plurality of parameters for a plurality of items. The data set has a plurality of dimensions, each dimension corresponding to measurements of a parameter in the plurality of parameters for the plurality of items. The two-dimensional plot displays data corresponding to measurements of a first parameter for a second plurality of items and data corresponding to measurements of a second parameter for the second plurality of items, the second plurality of items being at least a subset of the first plurality of items. The second interactive display includes a plurality of single parameters charts or graphs each single parameter chart or graph displaying information corresponding to one-dimensional measurements of a different parameter for a third plurality of items that includes some or all of the second plurality of items.

In some embodiments, the second interactive display is rendered based on receipt of a user selection of a guidance feature of the first interactive display.

In some embodiments, the third plurality of items is the same as the second plurality of items.

In some embodiments, the third plurality of items is a subset of the second plurality of items corresponding to a prior user selection of a portion of the two-dimensional plot displaying data corresponding to the third plurality of items.

In some embodiments, the method further includes receiving a user selection of a portion of the two-dimensional plot in the first interactive display through the graphical user interface, the selected portion of the two-dimensional plot displaying data corresponding to a fourth plurality of items, and, in response to the user selection, modifying each single parameter chart or graph in the second interactive display to include data corresponding to measurements of a parameter for the fourth plurality of items.

In some embodiments, the second plurality of items is a subset of the plurality of items previously determined using one or more prior selections of items based on one or more parameters, and wherein the method further includes displaying a graphical indication in the second interactive display for each single parameter chart or graph indicating whether the associated parameter was used in the one or more prior selections to determine the subset of the plurality of items. In some embodiments, the second interactive display includes a label corresponding each single parameter chart or graph, and the graphical indication that the associated parameter was used in the one or more prior selections to determine the second plurality of items includes an appearance of the associated label. In some embodiments, the second plurality of items is a subset of the plurality of items previously determined using one or more gates of the items based on one or more of the parameters, and wherein the graphical indicator in the second interactive display for each single parameter chart or graph indicates whether the associated parameter was used for the one or more gates.

In some embodiments, the two-dimensional plot displays values corresponding to first parameter horizontally and displays values corresponding to the second parameter vertically. In some embodiments, the method further includes displaying a first graphical indicator in the second interactive display indicating that a first single parameter plot or graph corresponds to the first parameter displayed in the two-dimensional plot of the first interactive display and displaying a second graphical indicator in the second interactive display indicating that a second single parameter plot or graph corresponds to the second parameter displayed in the two-dimensional plot of the second interactive display. In some embodiments, the method also includes receiving a user input regarding the first graphical indicator in the second interactive display, a user input regarding the second graphical indicator in the second interactive display, or both, and controlling which parameters are displayed in the two-dimensional plot of the first interactive display based on the received user input regarding the first graphical indicator, the second graphical indicator, or both.

In some embodiments, the one-dimensional measurements for a parameter are converted or scaled to a common scale for display in the plurality of single parameter charts or graphs. In some embodiments, the one-dimensional measurements for a parameter are converted to a common logicle scale for display in the plurality of single parameter charts or graphs.

In some embodiments, the second interactive display further includes a graphical indication of a threshold for values in each of the single parameter charts or graphs. In some embodiments, the graphical indication of the threshold includes a line. In some embodiments, the graphical indication of the threshold includes a different style of display for data falling below the threshold than for data above the threshold in each of the plurality of single parameter charts or graphs. In some embodiments, the second interactive display further includes a graphical indication of a percentage of items in the third plurality of items having a value larger than the threshold for each of the plurality of single parameter charts or graphs. In some embodiments, the second interactive display includes a graphical indication of a median of measurements for the third plurality of items that are above the threshold for each of the plurality of single parameter charts or graphs.

In some embodiments, the method further includes receiving an input from a user indicating an user interaction with the second interactive display to change the threshold, and, in response to the input, adjusting the graphical indication of the threshold in the second interactive display based on the input and changing any additional graphical indications based on the threshold in the second interactive display.

In some embodiments, the method further includes displaying a selection indicator associated with each single parameter chart or graph in the second interactive display, and receiving an input from a user indicating a selection of one or more of the selection indicators and, in response to the input, identifying the one or more associated single parameter charts or graphs as selected. The method also includes receiving a second input from a user indicating an user interaction with the second interactive display to change the threshold, and, in response to the input, adjusting the graphical indication of the threshold in the second interactive display for the selected one or more single parameter charts or graphs based on the input, and changing any additional graphical indications based on the changed threshold for the selected one or more single parameter charts or graphs in the second interactive display.

In some embodiments, the method also includes modifying the display of the two-dimensional plot in the first interactive window based on the input from the user indicating a user interaction with the second interactive display to change the threshold.

In some embodiments, the method also includes modifying the display of the two-dimensional plot in the first interactive window based on the input from the user indicating a user interaction with the second interactive display to change the threshold for a single parameter chart or graph corresponding the first parameter or the second parameter in the two-dimensional plot. In some embodiments, the threshold is a positive staining threshold to distinguish between data corresponding to a background signal and data corresponding to selective binding of a staining reagent specific to the parameter for each single parameter chart or graph.

In some embodiments, each single parameter chart or graph includes a bar chart. In some embodiments, each single parameter bar chart uses color to depict density in at least a portion of the chart. In some embodiments, each single parameter chart or graph includes a histogram. In some embodiments, the second interactive window includes a histogram selection feature and receipt of an input from a user indicating selection of the histogram selection feature causes the interactive display to display a plurality of single parameter histograms.

In some embodiments, the two-dimensional plot displays measurements corresponding to the first parameter, measurements corresponding to the second parameter, or both using a biexponential scale. In some embodiments, the biexponential scale is a logicle scale.

In some embodiments, the plurality of single parameter charts or graphs includes between 3 and 50 single parameter charts or graphs. In some embodiments, the plurality of single parameter charts or graphs includes between 6 and 50 single parameter charts or graphs. In some embodiments, the plurality of single parameter charts or graphs includes between 10 and 50 single parameter charts or graphs. In some embodiments, the plurality of single parameter charts or graphs includes between 6 and 100 single parameter charts or graphs. In some embodiments, the plurality of single parameter charts or graph includes more than 4 single parameter charts or graphs, more than 5 single parameter charts or graphs, more than 6 single parameter charts or graphs, more than 7 single parameter charts or graphs, more than 8 single parameter charts or graphs, more than 9 single parameter charts or graphs, or more than 10 single parameter charts or graphs.

In some embodiments, the data corresponds to cytometry data. In some embodiments, the method is a method of visualization of cytometry data for guiding gate selection. In some embodiments, the method facilitates sequential gating of the data. In some embodiments, the method is a method for guiding clustering strategy.

Some embodiments provide a non-transitory machine readable medium storing instructions executable by a processing device for performing any of the methods described, depicted, or disclosed herein.

Other variations will be clear from the teachings herein to those of skill in the art.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3A includes separate dot plots panels of two normal distributions of a first population (shown in black) and a second smaller population (shown in green). From left to right across the panels, the mean of the smaller green population is shifted along the x axis in fixed increments of 2 standard deviations each.

FIG. 3B includes dot plot panels similar to those of 3A except that the first black population in the panels of FIG. 3A is three times smaller than the first black population in the panels of FIG. 3B.

FIG. 3C is a graph of the calculated QF dissimilarity scores between the first "0 stdevs" panel on the left and other panels in FIG. 3A as a function of the distance between the mean of the first distribution and the mean of the second distribution in the other panel in accordance with an embodiment.

FIG. 3D is a graph of the calculated QF dissimilarity scores between the first "0 stdevs" panel on the left and other panels in FIG. 3B as a function of the distance between the mean of the first distribution and the mean of the second distribution in the other panel in accordance with an embodiment.

FIG. 4A is a graph of calculated QF dissimilarity scores between the first "0 stdevs" panel and the "4 stdevs" panel and between the first "0 stdevs" panel and the "8 stdevs" panel for the data shown in FIG. 3A as a function of the number of bins used for adaptive binning accordance with an embodiment.

FIG. 4B is a graph of running time for calculating the dissimilarity scores shown in FIG. 4A for different numbers of bins in accordance with an embodiment.

Figure 1A:
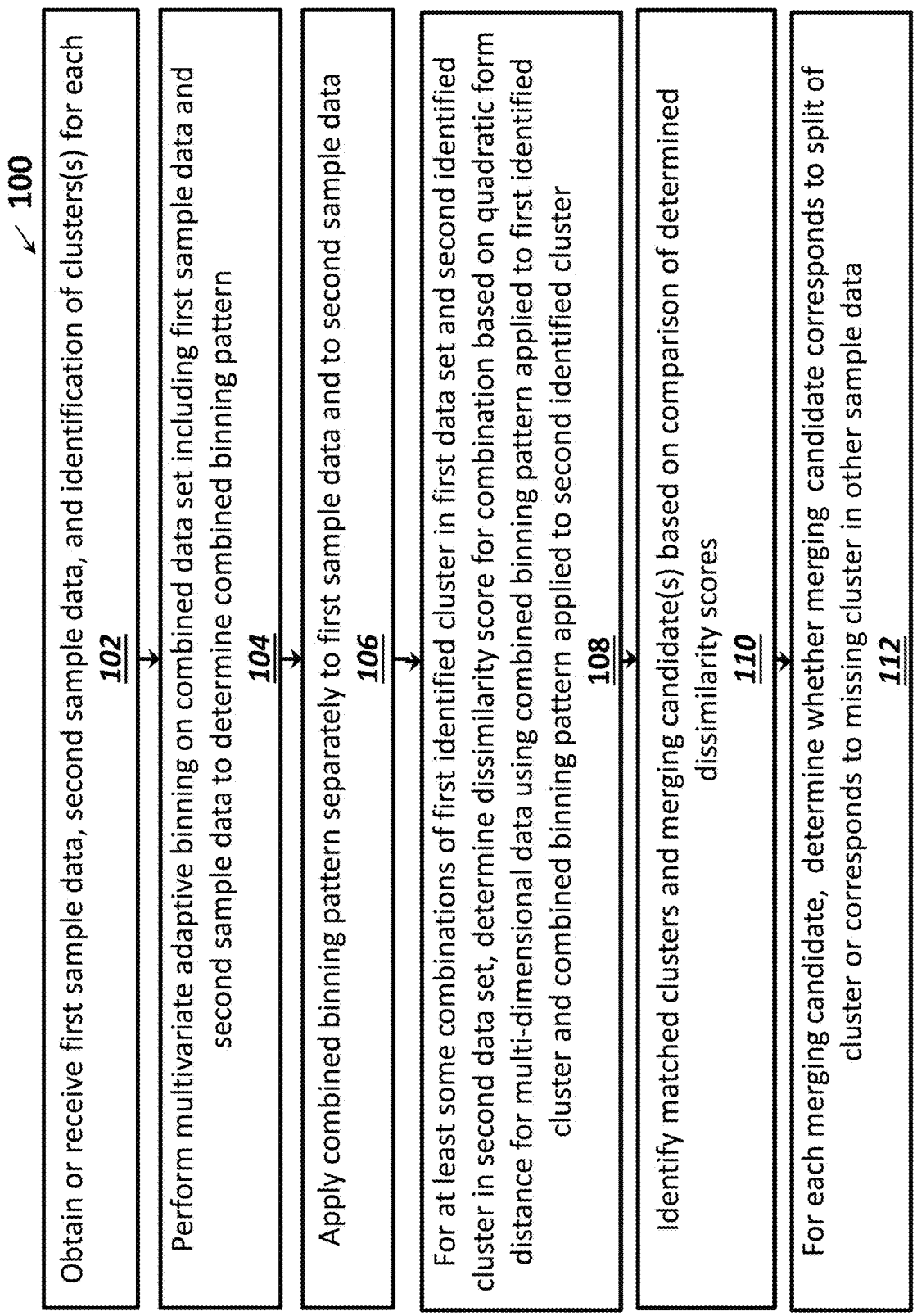
FIG. 1A depicts a flow chart of a method in an accordance with an embodiment.

Additional features, functions and benefits of the disclosed methods, systems and media will be apparent from the description which follows, particularly when read in conjunction with the appended figures.

DETAILED DESCRIPTION OF THE INVENTION

Definitions

As used herein, an item is something that is subjected to measurement to yield data regarding multiple different parameters corresponding to different dimensions in a dataset. In some embodiments, an item refers to an individual particle (e.g., including a cell or a group of cells), which is subjected to measurements in a flow cytometry system to produce multidimensional data. Examples of resulting measured data for the item, include, but are not limited to optical scatting measurements and florescence measurements corresponding to different markers or staining for flow cytometry.

The term "gating" as used herein refers to identification of a homogenous subpopulation, or relatively homogeneous subpopulation, of items (e.g., cells corresponding to one type) out of a larger set of items (e.g., cells of different types). A "gate" as used herein refers to a selection in one or more dimensions (corresponding to one or more measured parameters) of a subset of items from a larger set of items. For example, gating in the form of a gate or multiple gates may be used to distinguish one type of cells from other types of cells based on data from a flow cytometry system. Conventionally, two-dimensional gates are often used for analysis of flow cytometry data. Gates may be imposed sequentially, such that a subset of items resulting from a prior gate in one or more dimensions (corresponding to one or more measured parameters for the items) is used when determining a further gate in one or more other dimensions (corresponding to one or more other parameters for the items). For example, data corresponding to cells may initially be gated in two dimensions, with data corresponding to cells falling within the gate being used for further gating in other dimensions. Thus, a sequence of two-dimensional gates can be used to identify subpopulations of items (e.g., subpopulations of cells) from a multivariate data set including data for a larger plurality of items (e.g., larger group of cells).

The term "marker" as used herein refers to a structure that is associated with a cell or particle and is detectable because it emits a signal including, but not limited to, fluorescence, that can be measured by a detection instrument or because it is reactive with a reagent that emits such a signal or causes the emission of such a signal.

The term "reagent" as used herein refers to a substance used in a chemical reaction to detect, measure, examine, or produce other substances. Reagents include, but are not limited to, a dye, an antibody, a fluorophores, and a chromophore.

The term "stain" as used herein refers to a composition of a dye(s) or pigment(s) used to make a structure, a material, a cell, a cell component, a membrane, a granule, a nucleus, a cell surface receptor, a peptide, a microorganism, a nucleic acid, a protein or a tissue distinguishable. The term "staining reagent" and, unless otherwise defined, the term "reagent" as used herein are synonymous with the term "stain."

Unless defined otherwise, all technical terms used herein have the same meaning as commonly understood by one of skill in the art to which this disclosed subject matter belongs. Any methods and materials similar or equivalent to those described herein also can be used in the practice of or testing utilizing of the presently disclosed subject matter.

It must be noted that as used herein and in the appended claims, the singular forms "a", "and", and "the" include plural references unless the context clearly dictates otherwise.

Reference in the present specification to "one embodiment" or "an embodiment" means that a particular feature, structure, or characteristic described in connection with the embodiment is included in at least one embodiment of the invention. The appearances of the phrase "in one embodiment" or "an embodiment" in various places in the specification do not necessarily all refer to the same embodiment.

Cluster Matching Between Samples

Identifying clusters of data items (e.g., cell populations) and tracking their changes across samples of the same type often reveals the conditions the samples are subjected to, for instance, biological conditions. To study these cross-condition changes, the individual samples may be clustered. Clustering is described in U.S. Patent Application Publication No. 2015/0293992 entitled "Cluster Processing and Ranking Methods Including Methods Applicable to Cluster Developed Through Density Based Merging", the entire contents of which is incorporated by reference herein. Part of the flow/mass cytometry data analysis process is aligning (matching) cell subsets (e.g., clusters) between relevant samples. The populations present in multiple samples can be aligned and matched post clustering in order to perform a secondary analysis, (e.g., for longitudinal clinical studies, or comparison of multiple experiments). Population matching is one of the most important analytical tools used in the flow/mass cytometry data analysis pipeline in a variety of research/clinical settings. As explained above and below, conventional methods and systems address this cluster-matching/population-matching problem in ways that are computationally expensive, affected by the curse of dimensionality, and/or fail when population patterns significantly vary between samples. The inventors developed methods and systems for matching clusters in data in multiple dimensions (e.g., Hi-D data) corresponding to different samples The methods and systems employ a dissimilarity score based on a quadratic form distance. The methods and systems are both computationally efficient and accommodate data where population locations differ significantly (even disappear or appear) from sample to sample. The inventors demonstrated the effectiveness of some embodiments of the method by employing the method on sample datasets from immunology studies as described below with respect to Examples 1 through 4.

Recently developed cluster matching methods for tracking populations across samples can be informally divided into two types: separate clustering and matching, and joint clustering and matching, which are described below.

The separate clustering and matching approach identifies cluster locations in each individual sample (e.g., by using mixture models), see e.g., Pyne et al., *Proc. Natl Acad Sci,* 2009. This approach then pools these cluster locations for all of the samples in a given class, for example "healthy controls", and clusters again (e.g., by using partitioning around medoids) to construct a Hi-D template of meta-clusters.

This type of approach is likely to fail when the population pattern varies significantly between samples (i.e., population locations differ significantly or even (dis)appear from sample to sample) as discussed in detail in Cron et al., *PLoS Comput Biol,* 2013; and Dundar et al., *BMC Bioinformatics,* 2014. Thus, this approach may fail when a meta-cluster corresponding to distinct cell subsets splits into multiple sub-clusters if extraneous clusters appear in one (or more) of the samples. Further, because the partitioning of individual samples into clusters is performed independently from sample to sample, even quite similar samples may be poorly aligned.

The joint clustering and matching approach, (e.g., Lee et al., *Cytometry part A,* 2016; Cron et al., *PLOS Comput Bio,* 2013; and Dundar et al., *BMC Bioinformatics,* 2014), aligns cell populations based on direct modelling of contributions from individual and grouped samples. It can be thus considered as "hierarchical extension of statistical mixture models," because it applies a hierarchical (multi-level) model that incorporates information from both the individual and group levels when fitted to flow cytometry data. In this approach, an individual sample is considered as a noisy realization of a more general biological population mixture. For example, individual samples could be modelled using a Dirichlet process gaussian mixture model approach (e.g., see Escobar, M. D. & West, M. Bayesian density estimation and inference using mixtures. *JASA.* 90(430), 577-588 (1995)) and linked through hierarchical prior.

Both of these approaches rely heavily on fitting mathematical models to identify and match clusters. Accordingly, they are dramatically hindered by the curse of dimensionality because the number of combinations of possible parameters for fitting increases dramatically as the number of dimensions increases above three or four. Additionally, these methods are computationally demanding and often rely on a heuristic to tune a set of input parameters.

To address the key problems mentioned above, the inventors developed methods that rely on a dissimilarity measure between cell populations that satisfies the following criteria: (1) it should possess the properties of a metric (non-negative symmetric functions that satisfy the triangle inequality and the axiom of coincidence); (2) it should distinguish biologically significant differences from small differences due to instrument drift or other irrelevant factors; (3) it should be non-parametric, to account for the complex structure of the cell populations commonly found in flow cytometry data; and, (4) it should be computationally efficient, so that modern high throughput analyses can be performed quickly. However, constraint #2 (the need to distinguish biologically significant differences) is the most critical for flow cytometry and similar datasets.

Some conventional cluster matching methods employ the use of a dissimilarity measure between cell populations, such as Joint Clustering and Matching, e.g., see Lee et al., *Cytometry part A,* 2016, which is based on a symmetric form of the Kullback-Leibler (KL) divergence; and Pyne et al., *Proc. Natl Acad Sci*, 2009, which relies on a solution of minimum cost bipartite matching (essentially minimum euclidean distance and corresponding weights difference to solve). However, the dissimilarity measurements used in these conventional cluster matching methods do not satisfy the criteria above.

The inventors determined that distance metrics, which take into account changes in both location and frequency, rather than just changes in one or the other, are the most suitable and accurate methods for comparing multivariate non-parametric flow cytometry data distributions. However, some distance metrics, such as Earth Mover's Distance (EMD) are computationally complex. Further, the EMD can be slow for practical applications of cluster matching tasks in Hi-D flow cytometry.

To overcome the problems with conventional cluster matching methods, and the speed limitations associated with using a dissimilarity measure that includes the EMD, the inventors developed computationally efficient methods of cluster matching employing a dissimilarity score based on the quadratic form (QF) distance measure, which takes changes both in location and frequency into account and is insensitive to small changes caused by instrument noise. The dissimilarity score based on the quadratic form distance measure (also referred to as the QF dissimilarity score or QF score herein) also satisfies the criteria (1)-(4) discussed above.

Some methods described herein employ the QF dissimilarity score for multi-dimensional cluster matching for flow and mass cytometry applications. Some embodiments described herein can be employed for matching data clusters in multiple dimensions (e.g., more than 2 dimensions, more than 3 dimensions, more than 4 dimensions, more than 5 dimensions, more than 6, dimensions, more than 7 dimensions, more than 8 dimensions, more than 9 dimensions, more than 10 dimensions, more than 11 dimensions, more than 12 dimensions, more than 13 dimensions, more than 14 dimensions, more than 15 dimensions, more than 16 dimensions, more than 17 dimensions, or dimensions in a range of 2 to 50, 3 to 50, 4 to 50, 5 to 50, 6 to 50, 7 to 50, 8 to 50, 9 to 50, 10 to 50, 11 to 50, 12 to 50, 13 to 50, 14 to 50, 15 to 50, 16 to 50, 17 to 50, 2 to 100, 3 to 100, 4 to 100, 5 to 100, 6 to 100, 7 to 100, 8 to 100, 9 to 100, 10 to 100, 11 to 100, 12 to 100, 13 to 100, 14 to 100, 15 to 100, 16 to 100, 17 to 100, 7 to 10, 7 to 20, 7 to 30, or 7 to 40). Some embodiments described herein can be employed for matching data clusters in a high number of dimensions (e.g., greater than 6 dimensions).

Some methods described herein employ the QF dissimilarity score for multi-dimensional cluster matching for flow and mass cytometry applications. Some embodiments described herein provide methods that enable valid identification and isolation of cellular (or other) subsets in which markers are expressed. To avoid the "curse of dimensionality", in some embodiments, methods employ a QF dissimilarity score for cluster matching. In some embodiments, methods employ a two-dimensional density-based merging (DBM) for clustering (e.g., see Walther, G. et al. Automatic clustering of flow cytometry data with density-based merging. *Adv Bioinformatics*. 686759; 10.1155/2009/686759 (2009)) combined with a QF dissimilarity score for cluster matching. Methods are not limited to data in which clusters are identified in two dimensions or methods employing density-based merging to identify clusters. For example in some embodiments, the identification of cluster may be performed in more than two dimensions (e.g., more than 2 dimensions, more than 3 dimensions, more than 4 dimensions, more than 5 dimensions, more than 6, dimensions, more than 7 dimensions, more than 8 dimensions, more than 9 dimensions, more than 10 dimensions, more than 11 dimensions, more than 12 dimensions, more than 13 dimensions, more than 14 dimensions, more than 15 dimensions, more than 16 dimensions, more than 17 dimensions, or dimensions in a range of 2 to 50, 3 to 50, 4 to 50, 5 to 50, 6 to 50, 7 to 50, 8 to 50, 9 to 50, 10 to 50, 11 to 50, 12 to 50, 13 to 50, 14 to 50, 15 to 50, 16 to 50, 17 to 50, 2 to 100, 3 to 100, 4 to 100, 5 to 100, 6 to 100, 7 to 100, 8 to 100, 9 to 100, 10 to 100, 11 to 100, 12 to 100, 13 to 100, 14 to 100, 15 to 100, 16 to 100, 17 to 100, 7 to 10, 7 to 20, 7 to 30, or 7 to 40). In some embodiments, other methods may be used for the identification of clusters in two dimensions or in more than two dimensions. In some embodiments, other methods (e.g., manual, automated, or semi-automated) may be used to identify multi-dimensional clusters in the data. For example, in some embodiments, domain knowledge-driven manual gating, a sequential automated clustering approach, a simultaneous clustering approach, or other suitable method may be employed for the identification of clusters.

In some embodiments, methods described herein are extended to work with large collections of samples, e.g., the QF dissimilarity score can be used to construct templates of meta-clusters for samples that belong to one class and can further be used to align these templates of meta-clusters between classes. Some embodiments include a method of forming a template based on sample data sets for a plurality of samples (e.g., $S_1$, $S_2$, $S_3$, $S_4$) using the QF dissimilarity score. The method includes matching clusters between data for pairs of samples in the plurality of samples (e.g., between $S_1$ and $S_2$, and between $S_3$ and $S_4$) using the QF dissimilarity score as described herein The matched clusters in a pair of samples are then merged into a corresponding meta-cluster in a template corresponding to the pair of samples (e.g., resulting in templates $T(S_1, S_2)$ and $T(S_3, S_4)$. In some embodiments, meta-clusters in a template corresponding to a pair of samples (e.g., templates $T(S_1, S_2)$) are matched to meta-clusters in a template corresponding to another pair of samples $T(S_3, S_4)$. The matched meta-clusters are then merged into a corresponding higher level meta-cluster in a higher level template corresponding to both pairs of samples $T(S_1, S_2, S_3, S_4)$. In some embodiments, this process may be iterated until the data for all of the samples in the plurality is included in a final template that has meta-clusters corresponding to clusters in all of the plurality of samples. In some embodiments the meta-clusters represent generic cell populations that appear in each sample in the plurality of samples with some sample specific variation. In some embodiments, the resulting template is a collection of relatively homogeneous meta-clusters commonly shared across samples of a given class. In some embodiments, the resulting template describes key immunophenotypes of an overall class of samples in a formal, yet robust, manner.

Some embodiments described herein address problems described above associated with conventional clustering and cluster matching between samples. For example some embodiments described herein include a method that employs a dissimilarity score that incorporates a form of the quadratic form (QF) distance measure to match cell subsets (clusters) present in multiple samples postclustering. In some embodiments, the cluster matching method accommodates data sets where the location of a population varies significantly from sample to sample in two-dimensional display, or when populations disappear or appear between samples.

The QF distance is a metric that quantifies the dissimilarity between any two univariate histograms. It takes into account both differences in location as well as in frequencies at given locations. The inventors employ a method that extends the QF distance metric to the multivariate case and applies it to cluster matching (e.g., for flow/mass cytometry data).

Some embodiments improve the performance of a system by improving the efficiency of cluster matching between samples, as compared to conventional techniques for multivariate cluster matching. Some embodiments improve the performance of a system by enabling multivariate cluster matching in a large number of dimensions, and enabling cluster matching for data where clusters significantly vary from sample to sample or disappear between samples.

Figure 1B:
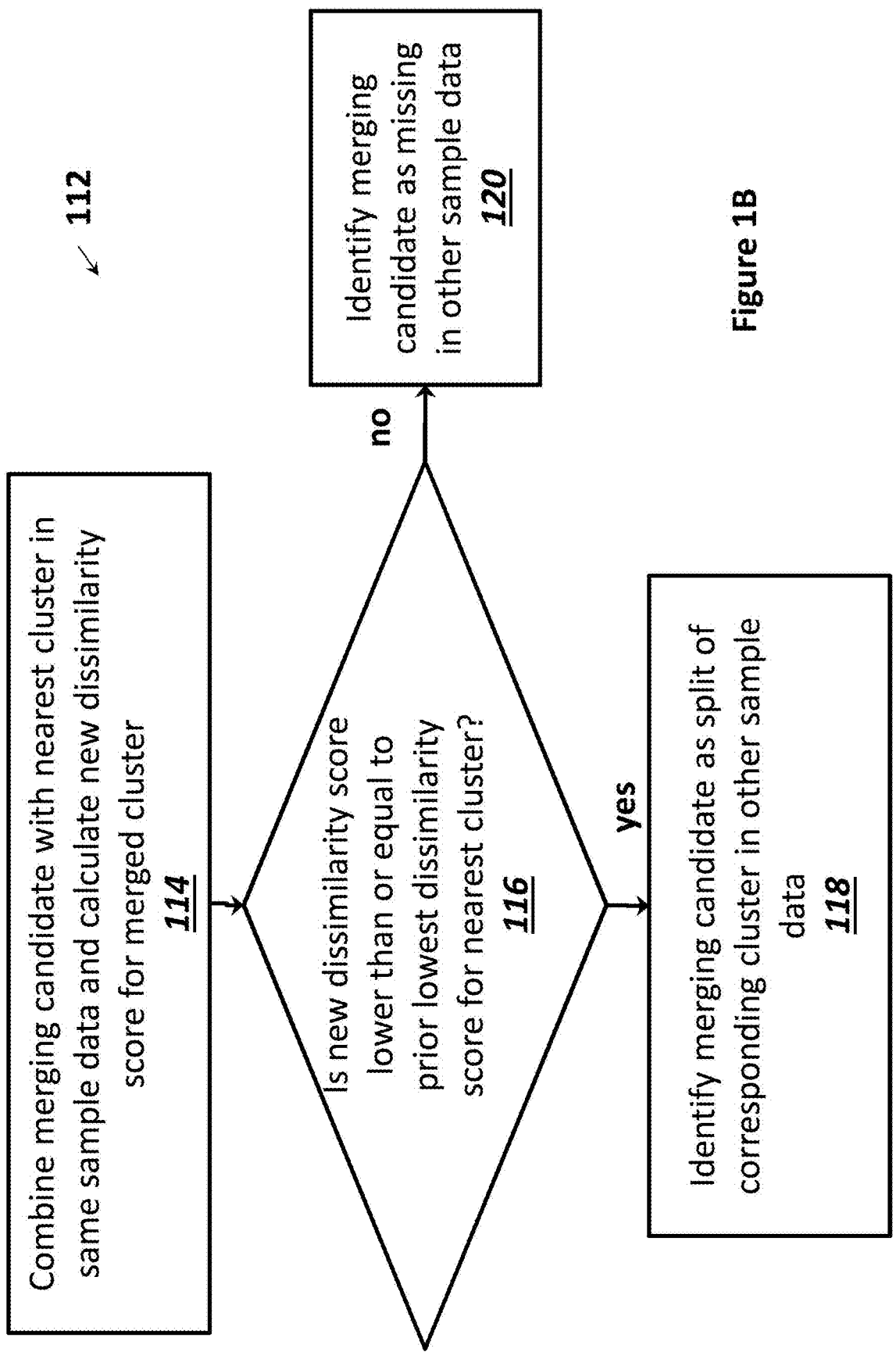
FIG. 1B depicts a flow chart of a portion of the method depicted in FIG. 1A in accordance with an embodiment.

An example method 100 for cluster matching is depicted in FIGS. 1A and 1B and described below. The method 100 is a computer-implemented method. Example devices and systems for implementing method 100 are described below with respect to FIGS. 28 through 31; however, one of ordinary skill in the art will appreciate that one or more other devices or systems may be used to implement the method.

Figure 2A:
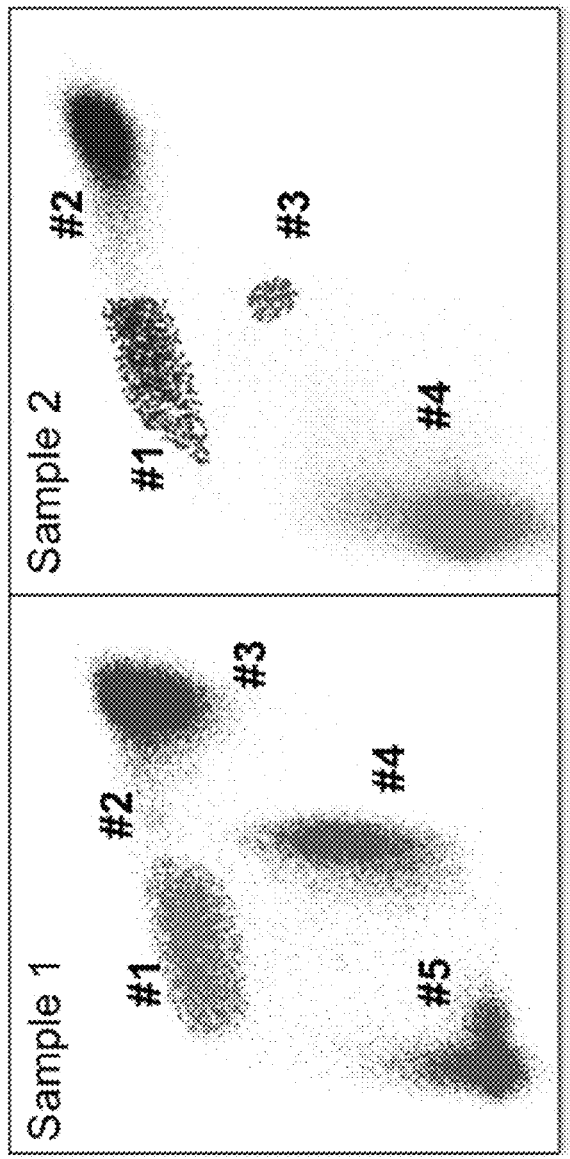
FIG. 2A includes two-dimensional dot plots for data from a first sample and a second sample after gating to identify clusters in each, with different clusters identified using different colors in accordance with an embodiment.
Figure 2B:
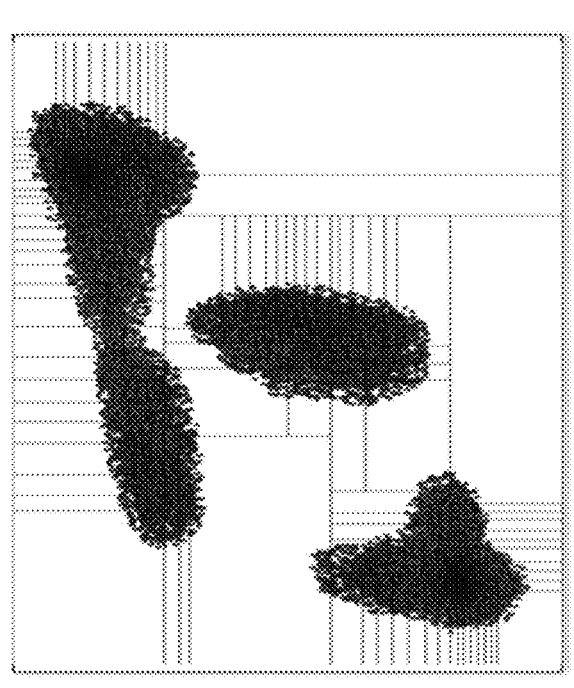
FIG. 2B depicts a scatter plot for a combined data set including the first sample data (shown in dark blue) and the second sample data (shown in maroon) with gray lines indicating an adaptive binning pattern based on the combined data set in accordance with an embodiment.

The method 100 includes obtaining or receiving a first sample data set, a second sample data set, an identification of one or more clusters in the first sample data set and an identification of one or more clusters in the second sample data (step 102, FIG. 1A). In some embodiments, the method includes identifying one or more clusters in the first data set and identifying one or more clusters in the second data set to obtain the identification of the one or more clusters in the first data set and the identification of one or more clusters in the second data set. In some embodiments, an automated or manual gating procedure is used or was used to identify the data of interest (e.g., the clusters) in a preprocessing step. FIG. 2A includes 2-D dot plots of the first sample data (left, labeled Sample 1) and the second sample data (right, labeled Sample 2). In each plot, the left axis is a dimension of the measured data (e.g., logicle transformed fluorescence data for a spectral range corresponding to a first reagent marker or scattering data) and the bottom axis is a different dimension of the measured data (e.g., logicle transformed fluorescence data for a spectral range corresponding to a second reagent marker or scattering data). In the example shown in FIG. 2A, the different colors in each dot plot in 2A correspond to different clusters of data as identified using a density-based merging clustering method. Each cluster in each sample data set is assigned a number for reference (e.g., #1 through #5 for sample 1 and #1 through #4 for sample 2). FIG. 2B is a dot plot of the combined or merged data set, with the first sample data shown in dark blue and the second sample data shown in maroon.

Multivariate adaptive binning is performed on the combined data set to determine a multivariate combined binning pattern (step 104, FIG. 1). The gray lines in FIG. 2B indicate the determined combined binning pattern. Adaptive binning is a method for dividing k-dimensional data into k-dimensional bins such that all bins contain the same number of events. This strategy requires k-dimensional bins of variable size that "adapt" to the structure of the data. Additional details regarding adaptive binning and multivariate adaptive binning can be found in Roederer et al., Probability binning comparison: a metric for quantitating multivariate distribution differences. Cytometry, (2001) 45: 47-55 and Roederer M. et al. Probability Binning Comparison: a metric for quantitating univariate distribution differences. Cytometry (2001); 45: 37-46, the contents of each of which is incorporated by reference herein in its entirety. The Roederer articles refer to adaptive binning as multivariate probability binning or probability binning (PB).

Although the multivariate adaptive binning is shown for illustrative purposes in two dimensions in FIG. 2B resulting in two-dimensional bins. In some embodiments, the multivariate adaptive binning is performed in more than two dimensions. For example, in some embodiments, the multivariate adaptive binning is performed in k-dimensions resulting in k-dimensional bins where k is greater than 2, greater than 3, greater than 4, greater than 5, greater than 6, greater than 7, greater than 8, greater than 9, greater than 10, greater than 11, greater than 12, greater than 13, greater than 14, greater than 15, greater than 17, between 2 and 50, between 3 and 50, between 4 and 50, between 5 and 50, between 6 and 50, between 7 and 50, between 8 and 50, between 9 and 50, between 10 and 50, between 11 and 50, between 12 and 50, between 13 and 50, between 14 and 50, between 15 and 50, between 16 and 50, between 17 and 50, between 2 and 100, between 3 and 100, between 4 and 50, between 5 and 50, between 6 and 50, between 7 and 50, between 8 and 50, between 9 and 100, between 10 and 100, between 11 and 100, between 12 and 100, between 13 and 100, between 14 and 100, between 15 and 100, between 16 and 100, between 17 and 100, between 7 and 10, between 7 and 20, between 7 and 30, or between 7 and 40.

Figure 2C:
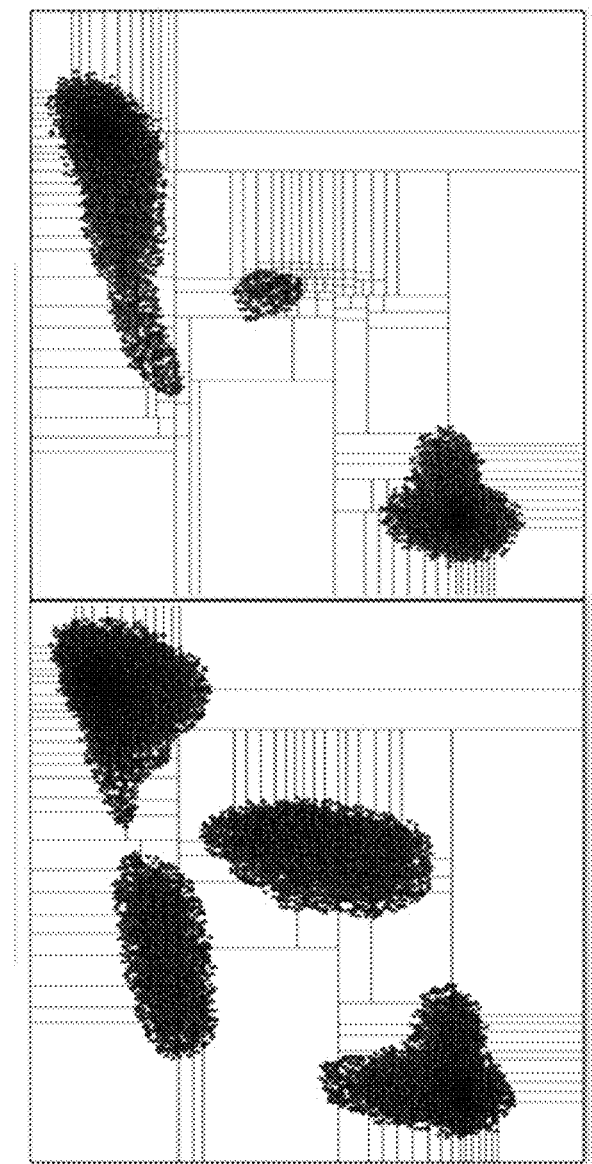
FIG. 2C includes two-dimensional dot plots for the first sample data (shown in dark blue) and the second sample data (shown in maroon) with the adaptive binning pattern for the combined data set superimposed on each individual data set in accordance with an embodiment.

The determined combined binning pattern is applied separately to the first sample data and the second sample data (step 106, FIG. 1A). FIG. 2C illustrates the combined binning pattern applied separately to the dot plot for the first sample data (left) and to the dot plot for the second sample data (right). In some embodiments, application of the determined combined binning pattern to the first sample data and the second sample data includes, for at least some of the identified clusters in the first sample data and the second sample data, generating a histogram for the cluster based on the determined combined binning pattern. In some embodiments, a histogram is generated for each identified cluster in each of the samples.

Figure 2D:
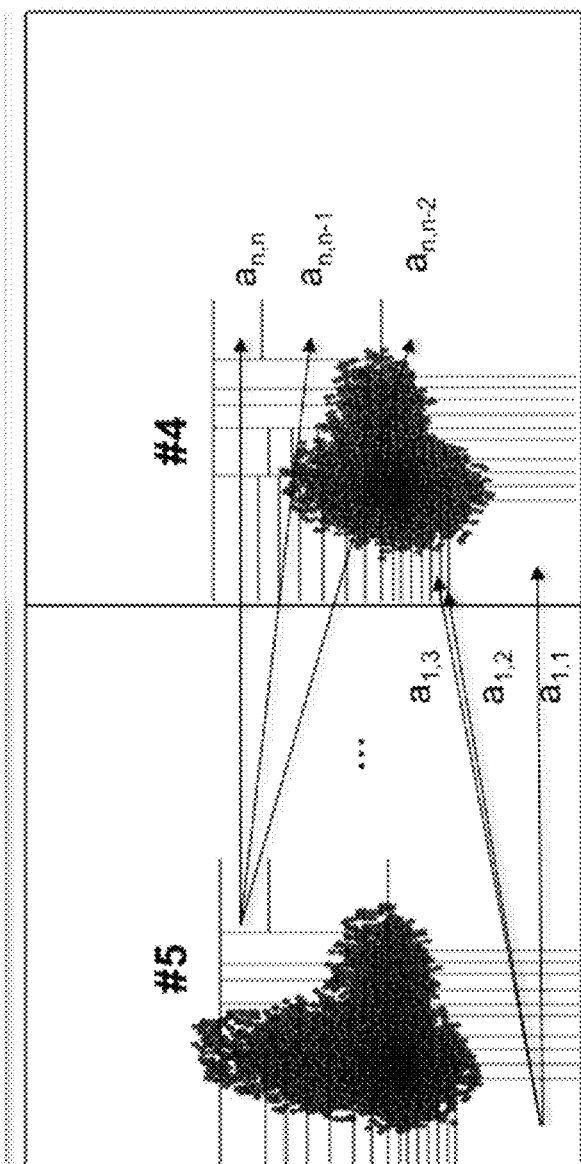
FIG. 2D includes separate two-dimensional dot plots of cluster #5 in the first sample data and cluster #4 in the second sample data illustrating the applied combined binning pattern and parameters for calculation of a dissimilarity score between the two clusters in accordance with an embodiment.

For at least some combinations of a first identified cluster in the first sample data and a second identified cluster in the second sample data, a dissimilarity score is calculated for the combination based on a quadratic form distance for multidimensional data using the combined binning pattern applied to the first identified cluster and the combined binning pattern applied to the second identified cluster (step 108, FIG. 1A). In some embodiments, a dissimilarity score is calculated for each combination of an identified cluster in the first sample data and an identified cluster in the second sample data. In some embodiments, a dissimilarity score is calculated for each combination of first cluster in the first sample for which a histogram was generated and a second cluster in the second sample for which a histogram was generated. In some embodiments, histograms are generated for all clusters in the first sample and the second sample, and a dissimilarly score is calculated for each combination of a cluster in the first sample and a cluster in the second sample. In some embodiments, each dissimilarly score $D^2(h, f)$ is calculated using the following equation:

$$D^2(h,f)=(h-f)^T A(h-f)=\Sigma_{i=1}^n \Sigma_{j=1}^n a_{ij}(h_i-f_i)(h_j-f_j), \quad (1)$$

in which $h_i$ is the relative frequency for bin i of the cluster under consideration from the first sample as determined based on application of the combined binning pattern to the first sample data. Similarly, $f_i$ is the relative frequency for bin i of the cluster from the second sample as determined based on application of the combined binning pattern to the second sample data. Note that $\Sigma_i h_i = \Sigma_i f_i = 1$ for relative frequencies. The matrix $A = [a_{ij}]$ is a matrix of spatial dissimilarity between bins i and j. For $D^2(h, f)$ to be nonnegative, the matrix A needs to be nonnegative definite. To account for multidimensional spatial dissimilarity, the inventors use the following equation:

$$a_{ij} = 1 - d_{M_{ij}}/d_{max} \quad (2)$$

where $d_{M_{ij}}$ is the Euclidean distance between centers of mass (as calculated on the combined data set) of the ith and jth bins, and $d_{max}$ is the maximum value of all the $d_{M_{ij}}$. $D^2(h, f)$ is always nonnegative for this choice of A. The dissimilarity score calculated using equations (1) and (2) is referred to as the QF dissimilarity score or QF score herein. FIG. 2D graphically illustrates the bin indexes as used for the determination of the spatial dissimilarity matrix for cluster #5 from the first sample (shown on the left) and cluster #4 for the second sample (shown on the right).

QF dissimilarity scores for the various combinations of a first cluster in the first sample and a second cluster in the second sample are compared to identify matched clusters and candidates for merging (step 110, FIG. 1A). Table 1 below includes QF dissimilarity scores for all pairwise combinations of a first cluster in the first sample and a second cluster in the second sample for the data shown in FIGS. 2A-2D.

TABLE 1

Cluster QF Dissimilarity Scores

| Cluster ID | Sample 2 - #1 | Sample 2 - #2 | Sample 2 - #3 | Sample 2 - #4 |
| --- | --- | --- | --- | --- |
| Sample 1 - #1 | 0.03 | 0.960 | 0.914 | 1.279 |
| *Sample 1 - #2* | 1.497 | *0.709* | 1.316 | 1.682 |
| Sample 1 - #3 | 1.470 | 0.0293 | 1.230 | 1.566 |
| Sample 1 - #4 | 1.050 | 0.949 | 0.178 | 1.200 |
| Sample 1 - #5 | 1.470 | 1.495 | 1.372 | 0.01 |

The cluster pairs with the smallest QF dissimilarity score (e.g., the lowest score for each row and column) are identified as matched (see entries in bold in Table 1 above). Any unmatched clusters (e.g., Sample 1-#2) are treated as merging candidates The merging candidate Sample 1-#2 and its corresponding lowest dissimilarity score are indicated in italics in Table 1 above.

A determination is made for each merging candidate regarding whether the merging candidate corresponds to a split of a cluster in the other sample data or corresponds to a missing cluster in the other sample data (see FIG. 1A, step 112). Specifically, for each merging candidate, the merging candidate is combined with its nearest cluster in the same sample and the QF dissimilarity score is recalculated based on the merged cluster (step 114, FIG. 1B).

To determine the nearest cluster to a merging candidate in the first sample data or the second sample data, the cluster in the other sample data that has the lowest dissimilarity score with the merging candidate cluster is identified. For Table 1 above, where the merging candidate is Sample 1-#2, the cluster in the second sample data that has the lowest dissimilarity score with the merging candidate cluster is Sample 2-#2 (see dissimilarity score in italics in Table 1 above). The other cluster in the first sample data that also has its lowest dissimilarity score with the same cluster in the second sample (e.g., Sample 2-#2 cluster) is the nearest cluster to the merging candidate. In the example in Table 1, the Sample 1-#3 cluster is the nearest cluster to the merging candidate Sample 1-#2 cluster because the Sample 1-#3 cluster also has its lowest dissimilarity score with the Sample 2-#2 cluster. In this example, the Sample 1-#3 cluster is matched to the Sample 2-#2 cluster. Table 2 below includes the recalculated dissimilarity score, 0.0290, after merging the merging candidate (e.g., Sample 1-#2) with the nearest cluster (e.g., Sample 1-#3) (shown in bold and italics).

TABLE 2

Cluster Dissimilarity Scores after Merging #2 and #3 of Sample 1

| Cluster ID (relative frequency) | Sample 2 - #1 (0.9%) | Sample 2 - #2 (37%) | Sample 2 - #3 (0.1%) | Sample 2 - #4 (62%) |
| --- | --- | --- | --- | --- |
| Sample 1 - #1 (5%) | 0.03 [0.6; 0.3]σ | | | |
| Sample 1 - merged #2∪#3 (48%) | | *0.0290* [0.9; 0.3]σ | | |
| Sample 1 - #4 (15%) | | | 0.178 [0.7; 1.06]σ | |
| Sample 1 - #5 (32%) | | | | 0.01 [0.7; 0.3]σ |

If the recalculated dissimilarity score for the merged cluster is lower than the original dissimilarity score for the closest matched cluster, this indicates that the merging is accurate and the two merged clusters in one sample's data correspond to a single cluster in the other sample's data and the merging candidate is identified as a split of the corresponding cluster in the other sample data (step 118, FIG. 1B). This could be described as the cluster in one sample's data splitting into two clusters in the other sample's data or the two clusters in one sample's data merging into a single cluster in the other sample's data. The recalculated QF dissimilarity score for Sample 1-#2∪#3 merged clusters and Sample 2-#2 cluster in Table 2, specifically 0.0290, is lower than the 0.0293 original QF dissimilarity score for the Sample 1-#3 cluster and the Sample 2-#2 cluster. This indicates that the merging of Sample 1 clusters #2 and #3 is accurate, and that clusters #2 and #3 in the Sample 1 data correspond to cluster #2 in the Sample 2 data.

If the recalculated QF dissimilarity score for the merged cluster is higher than the original matched QF dissimilarity score for the nearest cluster, this indicates that the merging is not accurate and that the merging candidate does not match a cluster in the other sample's data, and the merging candidate is identified as missing in the other data sample (step 120, FIG. 1B). This may be described as a cluster in one sample's data disappearing from the other sample's data, or this may be described as a new cluster appearing in a sample's data.

As noted above, in some embodiments the multivariate adaptive binning may be performed in k-dimensions, resulting in k-dimensional bins, where k can be 2 or more than 2. When the multivariate adaptive binning is performed in more than 2 dimensions, equations (1) and (2) can still be applied resulting in QF dissimilarity scores based on data having more than 2 dimensions. Use of the QF dissimilarity scores based on data having more than two dimensions results in identification of match clusters, split clusters and missing clusters based on matching in more than two dimensions. Some embodiments described herein include matching based on Hi-D data.

In some embodiments, for each pair of matched clusters, information regarding relative frequency and the distance between the geometric means of the matched clusters is also calculated. For example, Table 2 above includes information regarding relative frequency of each cluster in parentheses, and includes information regarding the distance between the geometric means of the matched clusters in square brackets. For example, cluster #4 represents 62% of Sample 2 and its geometric mean is just 0.07 σ away in one dimension and 0.3 σ away in the other dimension from cluster #5 that represents 32% of Sample 1. In some embodiments, this additional information helps to accommodate cases when, for example, each sample has only one subset and these subsets belong to different categories (i.e., different cell populations). In some embodiments, a very large distance between geometric means (e.g., greater than a threshold such as >3 σ) may indicated that there is no cluster to match with in the other sample. In some embodiments, the threshold may fall in a range of 2 σ to 5 σ.

In some embodiments, each pair of matched clusters can be further compared to reveal global (dis)similarity by sequentially matching these clusters in each possible combination of dimension pairs. For example, clusters that are matched in 2 dimensions out of e.g., measured 6 dimensions, could be matched in other dimensions as well to check whether they match in all measured dimensions.

In some embodiments, the cluster matching is used to track a population's changes across samples, e.g., to reveal the biological conditions the samples are subjected to. In some embodiments, the changes are in response to therapy, allergy, etc. However, applications of methods described herein are not limited to flow cytometry data, mass cytometry data, or cytometry data.

Using synthetic datasets shown in FIGS. 3A and 3B, the inventors verified that a QF dissimilarity score, calculated using equations (1) and (2) above, increases smoothly and monotonically with the growing separation between two subsets (e.g., clusters). Dot plots in FIG. 3A and FIG. 3B show two normal distributions: a first large population (black) and a second smaller population (green). The first black population in the panels of FIG. 3A is three times smaller than the first black population the panels of FIG. 3B. For both FIG. 3A and FIG. 3B, the mean of the second green population is in the same location as the mean of the first black population in the panel on the left, which is referred to as the "0 stdevs" panel. The mean of the second green population is displaced along the x axis in fixed increments (2 standard deviations) in each of the successive panels from left to right. For each displacement, a QF dissimilarity score was calculated between the first panel on the left corresponding to "0 stdevs" and the combined distribution of the first (black) population with the second (green) population for other panels. As the second green population moves further from the first black population, the QF dissimilarity score increases monotonically as shown in the graphs of FIGS. 3C and 3D, which corresponds to the panels in FIGS. 3A and 3B, respectively. This property of the QF dissimilarity score is important, because it ensures that small differences between clusters (subsets) in either subset location (e.g., due to instrument drift) or subset frequency will be reflected as small changes in the QF dissimilarity score. In general, this is a critical property for cluster matching approaches designed to analyze flow cytometry and similar datasets, where small changes due to instrument noise, calibration, etc. are very common. This property ensures that biologically similar samples with minor data aberrations, e.g., caused by shifts in flow instrument configuration during data collection, will still be well aligned.

The inventors also performed an analysis to demonstrate the sensitivity, or lack of sensitivity, of the QF dissimilarity score to the binning parameter. Three samples ("0 stdevs", "4 stdevs", and "8 stdevs") were selected from the synthetic dataset shown in the plots in FIG. 3B for a range of bin sizes. The absolute event count for each sample was 3200 (which became 6400 when samples were combined/merged to determine the adaptive binning pattern). The data was binned using n=16; 32; 64; 128; and 256 bins with results for the QF dissimilarity score as a function of bin number shown in FIG. 4A and the corresponding running time shown in FIG. 4B. As shown, the running time increased linearly with the number of bins (see FIG. 4B) while QF dissimilarity scores remained relatively constant (see FIG. 4A).

Overall the data in FIG. 4A indicate that QFMatch is robust in the choice of the number of bins. However, choosing the appropriate number of bins is a tradeoff between the method's speed and the binning resolution of the sample. Matching samples that contain small populations of cells may require finer binning than matching samples with larger populations only. For example, in some embodiments, for samples that contain small cell populations (e.g., cluster #3 in Sample 2, FIG. 2A), a number of bins may be selected such that there are 2 $\log_2 N$ events per bin, where N is the number of events in the smallest cell subset.

Figure 4C:
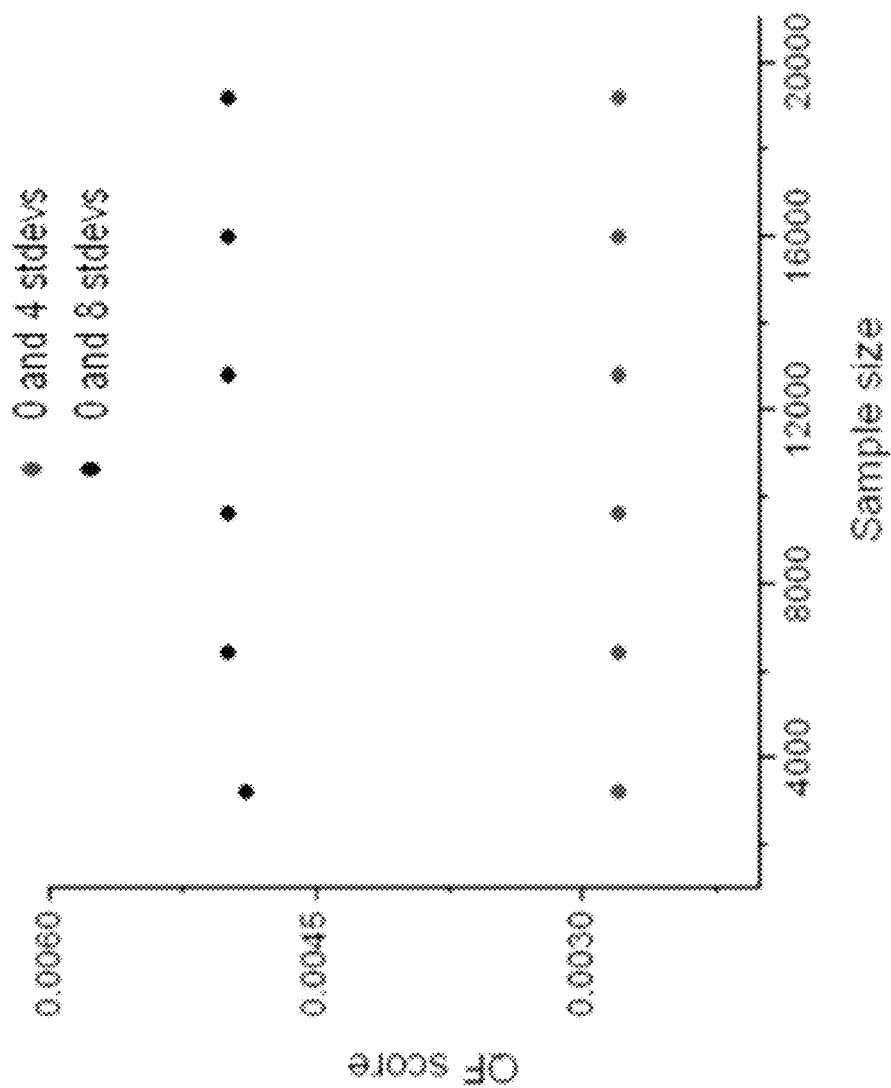
FIG. 4C is a graph of calculated QF dissimilarity scores between the first "0 stdevs" panel and the "4 stdevs" panel and calculated QF dissimilarity scores between the first "0 stdevs" panel and the "8 stdevs" panel for data sets having different sample sizes in accordance with an embodiment.

The inventors also demonstrated that the QF dissimilarity score is invariable with sample size. The size of the data sets shown in FIG. 3B was increased from the original sample size (3200 events including 200 events corresponding to the small green population) by 2-6 times and QF dissimilarity scores were calculated for the combinations of the "4 stdevs" with "0 stdevs" samples and the "8 stdevs" with "0 stdevs" samples using 128 bins. As shown in FIG. 4C the QF dissimilarity scores were not affected by changes in sample size.

Figure 5:
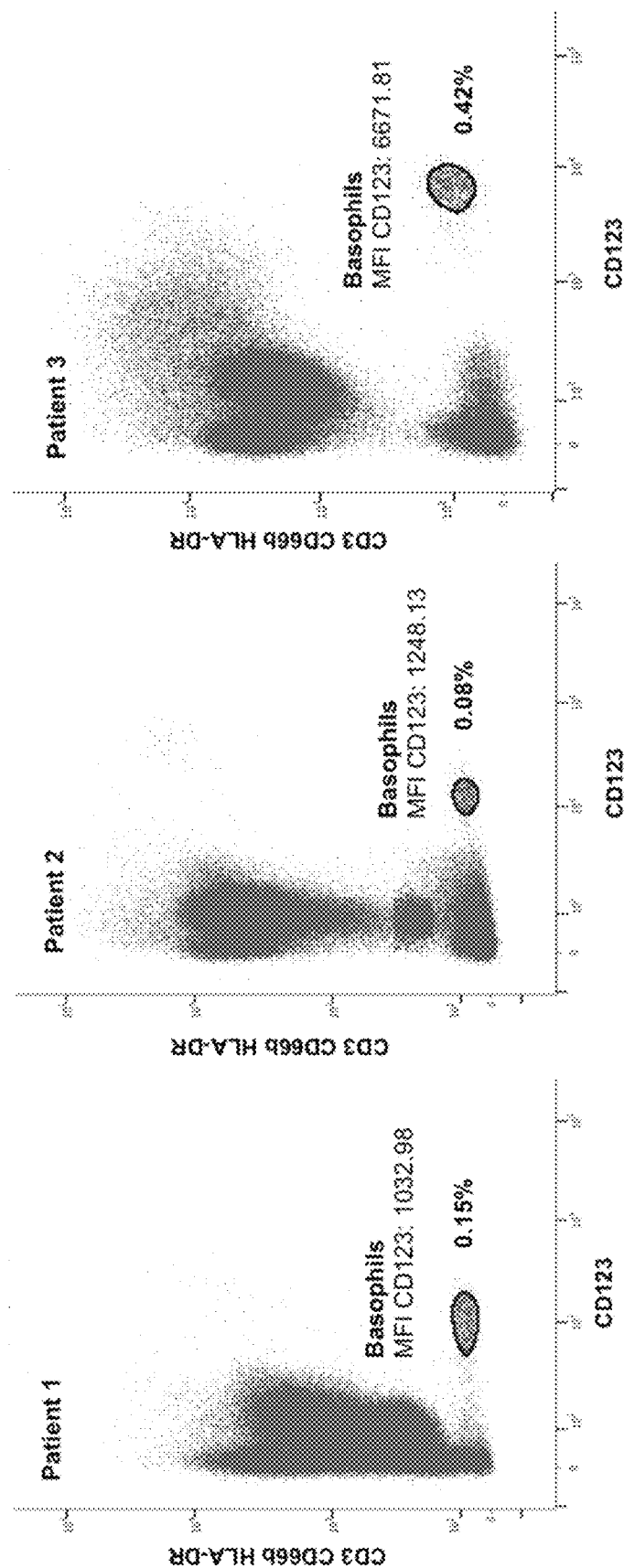
FIG. 5 includes dot plots of samples from different patients showing matched basophils clusters across different samples for Example 2.

Examples 1 through 4 below and corresponding FIGS. 5 through 7 address the application of method 100 to real datasets for multidimensional alignment of cell populations identified in flow cytometry data.

Visualization of Multivariate Data and Guidance for Sequential Gating

Other embodiments described herein address complexities associated with visualization of high dimensional (Hi-D) data (e.g., for sequential gating). Some embodiments facilitate the sequential 2D identification of medically or otherwise significant subsets of data and provide tools to speed and support user identification of efficient analysis paths through Hi-D data (e.g., data with more than 6 measured parameters). Some embodiments provide a novel, coordinated one-dimensional data display for all measured parameters in a given analysis. The display can be used to inform parameter selection for the next two dimensional (2D) gating view. Such embodiments include a method for guiding clustering strategy.

Some embodiments described herein include a novel, routinely accessible data display that shows one dimensional (1D) staining outcomes for each of the measured parameters in a selected subset of data. This interactive display showing one dimensional staining outcomes may be referred to as a "guidance display", a "guidance window", a "pathfinder window", a "look ahead/look aside window", or the "second interactive display" herein. In some embodiments, the guidance display is coupled to a corresponding interactive display including a 2D data plot, which may be referred to as a "2D display", "plot editor display", or a "plot editor window" or "first interactive display" herein. Together, the coupled displays (subset 2D data display and the guidance display including one-dimensional staining outcomes for each parameter) may be described as an "all-D/2D" projection pursuit.

One method includes rendering a graphical user interface to a user. The graphical user interface includes a first interactive display including a two-dimensional plot of at least a portion of a data set (e.g., a plot editor window 310, see FIG. 8). In some embodiments, the first interactive display may be referred to as the "2D window", the "2D display", the "plot editor window", or the "plot editor display."

The data set includes data corresponding to a measurements of a plurality of parameters for a plurality of items (e.g., a plurality of cells). The data set has a plurality of dimensions, with each dimension corresponding to measurements of a parameter in the plurality of parameters for the plurality of items. In some embodiments, the parameters correspond to optical measurements of the items (e.g., cells), such as optical scattering measurements and/or measurements of fluorescence in wavelength ranges associated with particular markers or stains. In some embodiments, the data corresponds to measurements made using cytometry system. In some embodiments, the data corresponds to measurements made using a flow cytometry system.

The two-dimensional plot displays data corresponding to measurements of a first parameter (e.g., corresponding to the x-axis of the plot) and measurements of a second parameter (e.g., corresponding to the y-axis of the plot) for a second plurality of items. For example, in FIG. 8, the first parameter corresponds to measurements of fluorescence in a wavelength range for the IgM stain/marker and the second parameter corresponds to measurements of fluorescence in a wavelength range corresponding to the IgD stain/marker. In some embodiments, the second plurality of items is the same as the plurality of items, meaning that data for each of the plurality of items is shown in the two-dimensional plot. In some embodiments, the second plurality of items is a subset of the plurality of items, meaning that data for only some of the plurality of items is shown in the two-dimensional plot.

Figure 8:
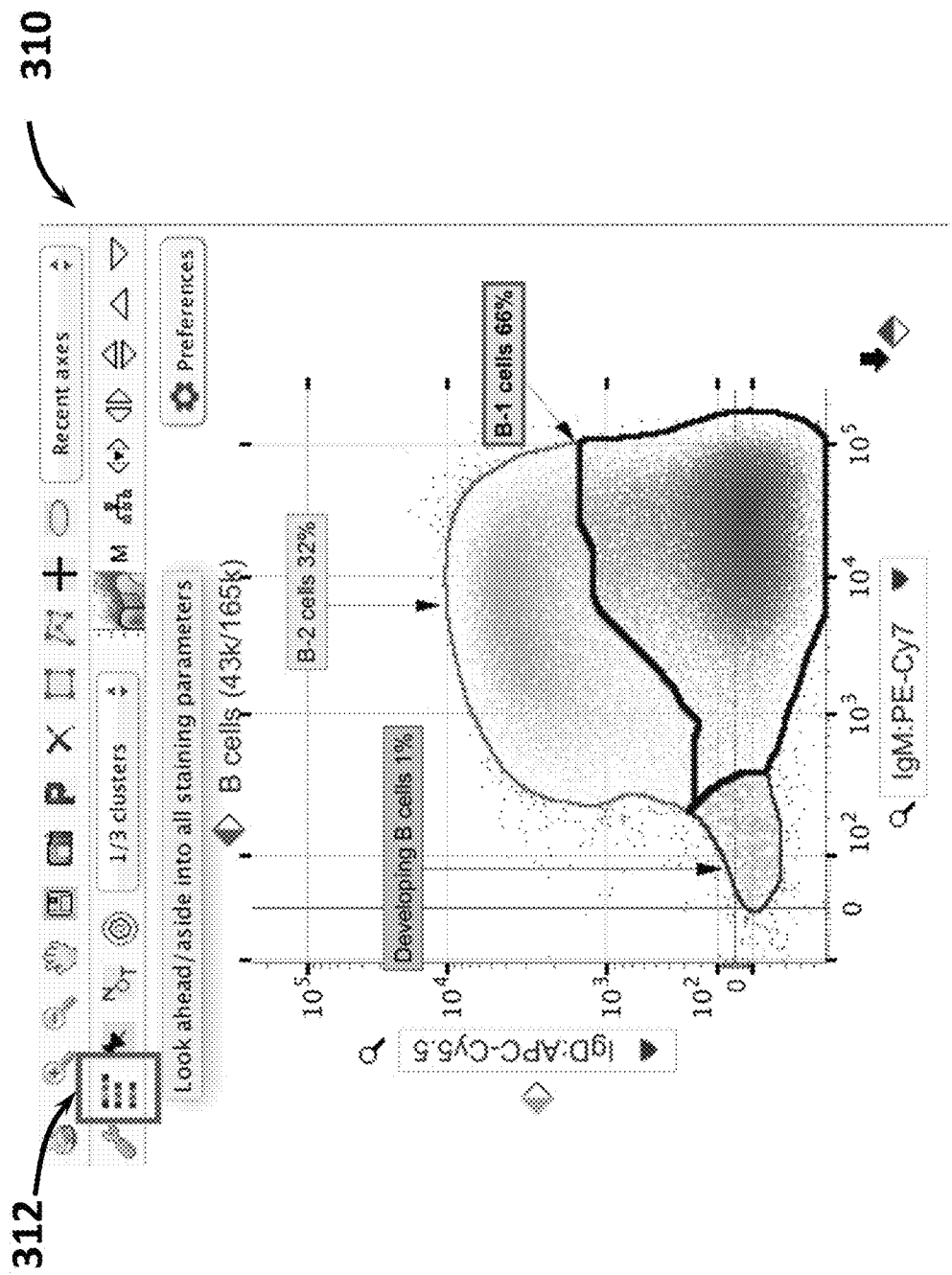
FIG. 8 includes a screen shot of 2D cluster plot window including a user selection of a subset of the displayed data displayed in a plot editor window that includes a guidance selection feature in accordance with an embodiment.

The graphical user interface also includes a second interactive display (e.g., guidance window 314 in FIG. 9), which may be referred to herein as a "guidance display" or a "guidance window", including a plurality of single parameter chart or graphs with each single parameter chart or graph displaying information corresponding to one-dimensional measurements of a different parameter for a third plurality of items that includes some or all of the second plurality of items. In some embodiments, the graphical user interface displays the second interactive display (e.g., the guidance window 314) in response to receiving through the graphical user interface a user selection of a guidance feature of the first interactive display. For example, the first interactive display (e.g., plot editor window 310) may include a guidance selection feature in the form of a "look ahead/ aside" toolbar icon 312 shown on the plot editor window (see FIG. 8) or a. The guidance selection feature may be in the form of a tool bar button or a right click menu section, or can have any other suitable form. For example, in some embodiments, receiving a user selection of "look ahead/ aside" toolbar icon 312 while a subset of data is selected in the plot editor window 310 causes a guidance window 314 to be displayed, where the guidance window 314 includes bar charts showing the 1D staining for all parameters for the subset of the data selected in the plot editor window 310 (see FIG. 9). A selection of a portion of the two-dimensional plot in the plot editor window 310 by the user is a selection of a subset of the second plurality of items having values falling in the selected portion of the two-dimensional plot. In some embodiments, the selection in the two-dimensional plot of a subset of the second plurality of items is the selection of a gate. In some embodiments, receipt of a selection of a portion of the two-dimensional plot through the plot editor window 310 causes data corresponding to the selected subset of the second plurality of items (e.g., a third plurality of items) to be displayed in the single parameter charts or graphs of the guidance window 314. For example, receipt of a user selection the "red" subset, which corresponds to B-1 cells in the plot editor window 314 (as shown in FIG. 8) causes the single parameter charts in the corresponding guidance window 314 in FIG. 9 to display marker staining for parameters for the subset of items corresponding to the selected "red" subset of data. This may be referred to as a "look ahead" window herein.

In some embodiments, the guidance selection feature of the plot editor may be selected by a user when there is no selected portion of the two-dimensional plot. In this case, the guidance window 314 includes data for the second plurality of items. This may be referred to as a "look aside" window herein.

In some embodiments, a user may select a different subset of the second plurality of items shown in the plot editor window 314 corresponding to a fourth plurality of items, and based on receipt of the user selection, the single parameter charts in the corresponding guidance window 314 are updated to correspond to data for the fourth plurality of items.

Figure 9:
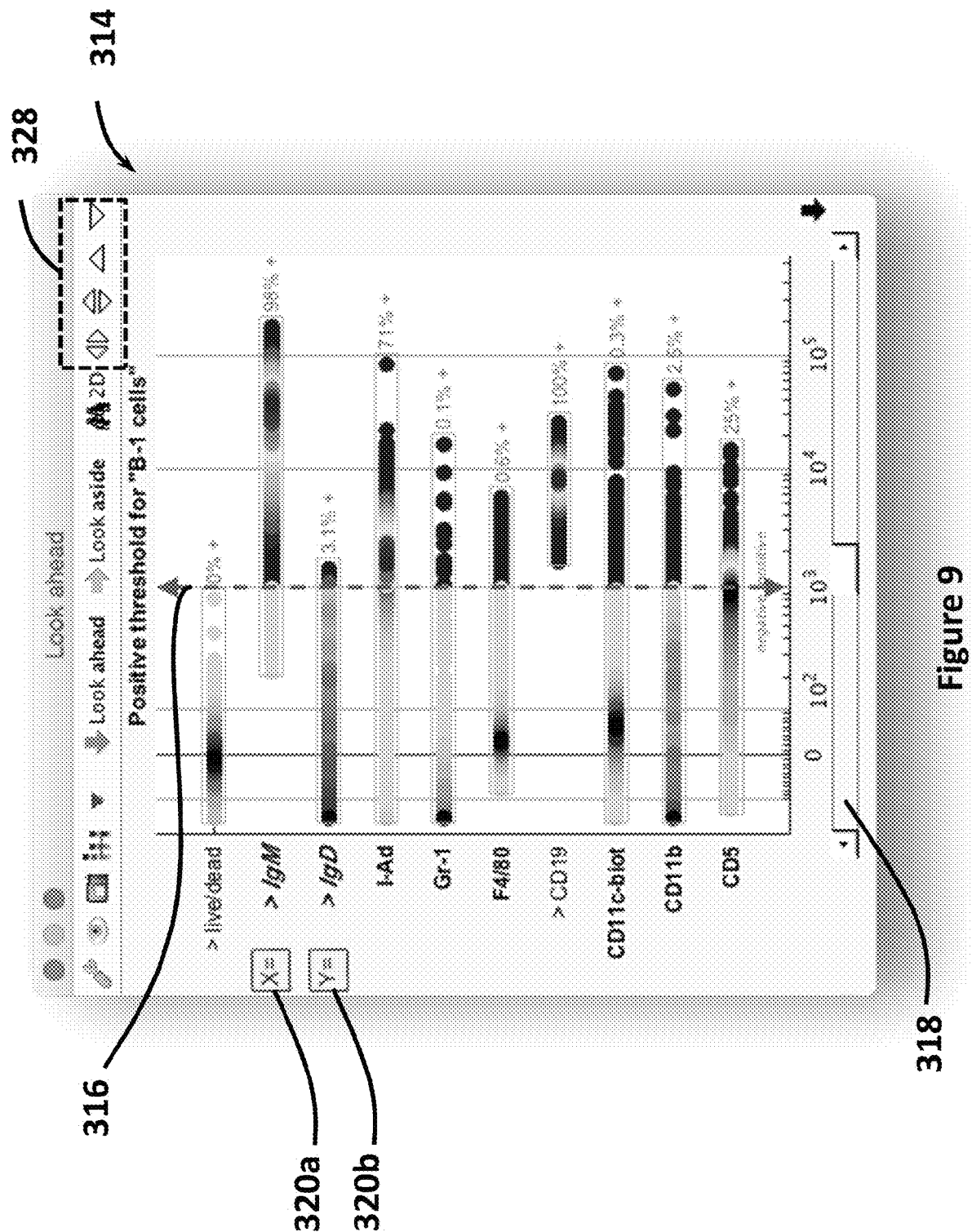
FIG. 9 includes a screen shot of a guidance window displaying a bar chart showing 1D staining densities for all markers for the subset of the data selected in the plot editor window in FIG. 8 in accordance with an embodiment.

In some embodiments, the x-axis of each single parameter chart or graph in the guidance window 314 is a logical scale for the parameter (e.g., scattering measurement or measured signal in a wavelength range for a stain or marker) and each parameter's logical scale is converted to a single common scale (e.g., a common logicle W value) (as shown in FIG. 9). In some embodiments, the single parameter charts or graphs are arranged along a y-axis in the guidance window 14 and the y-axis shows a horizontal bar for each parameter (e.g., each stain/marker in flow cytometry data) (see FIG. 9). In some embodiments, the y-axis label for each bar chart is a label for the marker used for the stain parameter (see FIG. 9). In other embodiments, the bar charts or graphs are vertical and the x-axis of the includes a label for each single parameter chart or graph.

In some embodiments, the second plurality of items, whose data appears in the two-dimensional plot of the plot editor window 310 is a subset of the plurality of items previously determined using one or more prior selections of items based on one or more parameters (e.g., the second plurality of items may have been previously selected from the plurality of items based on one or more gates previously applied to the data). In some embodiments, the method further includes displaying a graphical indication in the second interactive display (e.g., the guidance window) for each single parameter chart or graph indicating whether the associated parameter was used in the one or more prior selections to determine the subset of the plurality of items (e.g., whether the associated parameter was previously used in a gate). In some embodiments, the guidance window 314 includes an indication of whether the marker has been used in a gating sequence. For example, in some embodiments, if a marker has not been used in the gating sequence then the corresponding marker label on the y-axis is shown in bold, otherwise, the marker label is not bolded and has a prefix of ">" (see FIG. 9).

In some embodiments, the coloring of the bar depicts the density of measurements along the logical scale (see FIG. 9).

In some embodiments, the guidance window 314 includes graphical indications 320a, 320b of the markers currently used for the two-dimensional display of data in the corresponding plot editor window (e.g., see the "x=" 320a and "y=" 320b boxes on the y-axis of the guidance window 314 in FIG. 9).

Figure 10:
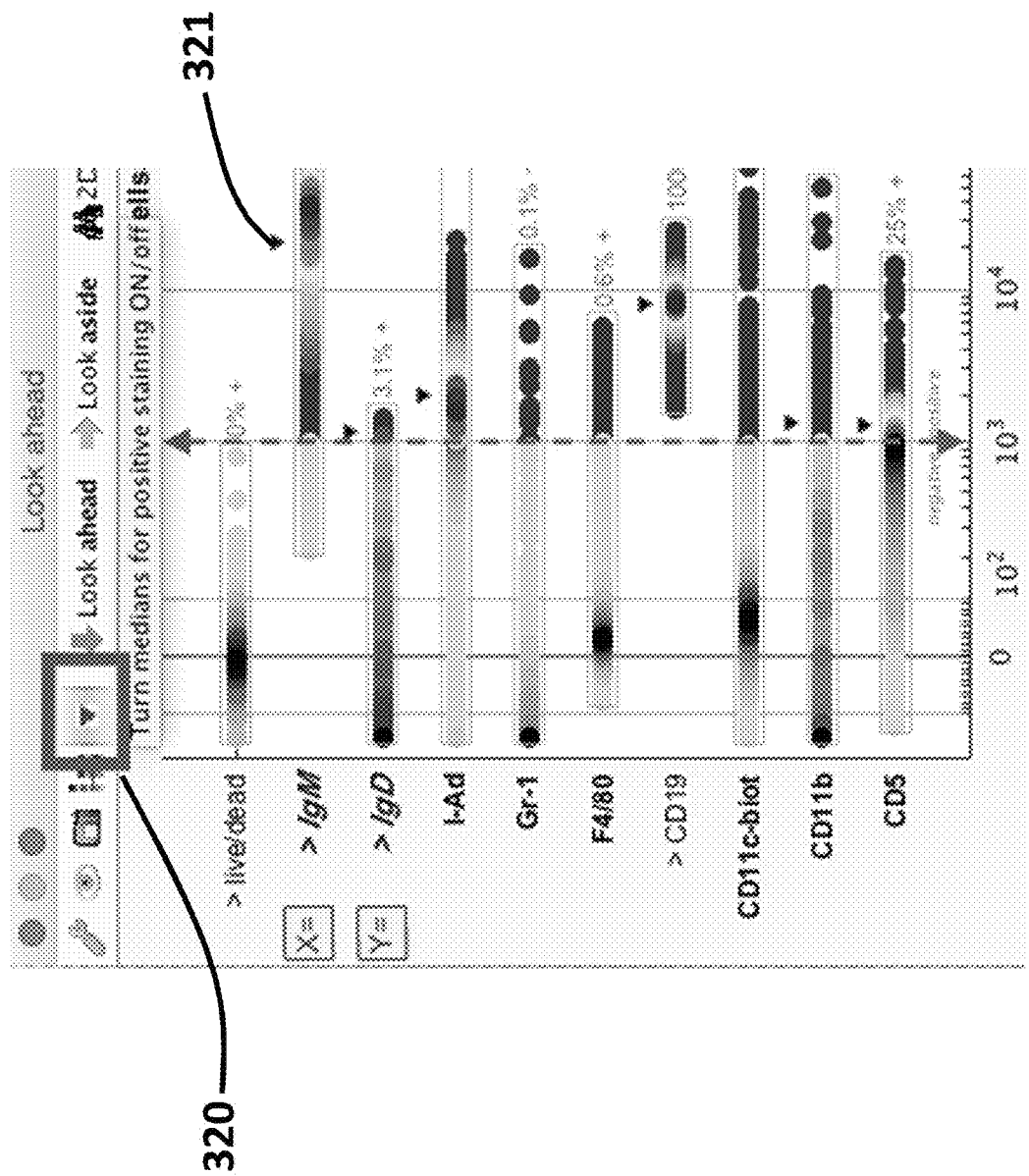
FIG. 10 includes a portion of the screen shot shown in FIG. 9 highlighting a feature for displaying the exact median for all measurements above the threshold in accordance with an embodiment.
Figure 17A:
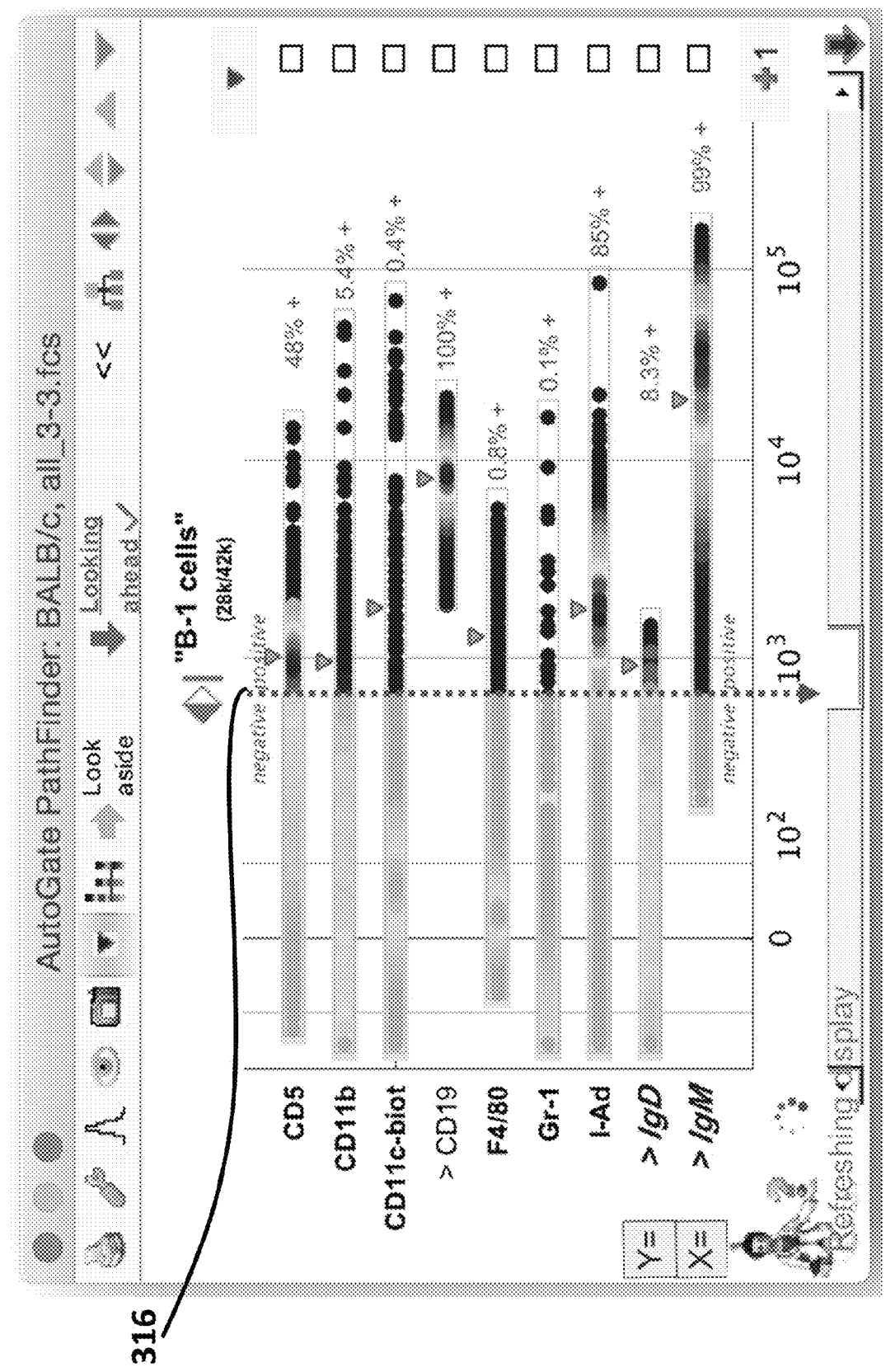
FIG. 17A is a screen shot illustrating a guidance window with check boxes for application of operations to selected parameters/markers in accordance with an embodiment.

In some embodiments, the guidance window includes a user-defined threshold (shown as dotted line 316 in FIG. 9) that the user can use to indicate and adjust where background staining stops and the true staining (e.g., binding of the staining reagent) begins. In some embodiments, the visual representation of density is different on one side of the threshold 316 than on the other. For example, in FIG. 9, to the left of the threshold 316 the cell density is represented by grayscale coloring, and to the right of the threshold the density is represented using pseudo colors (e.g., using FlowJo's pseudo color idiom). As another example, in FIGS. 17A-17C, cell density to the left of the threshold is denoted in washed out pseudocolors and the cell density to the right of the threshold is denoted in bright pseudocolors. In some embodiments, additional information is displayed based on the position of the threshold. For example, in FIG. 9, the percentage of the cells above the threshold is indicated on the right side of each bar. In some embodiments, the threshold can be reset based on user input provided based on elements represented on the guidance window (e.g., by a $2^{nd}$ right click menu or by a scroll bar or slider 318 of the guidance window 314 FIG. 9). In some embodiments, the exact median for all measurements above the threshold can be displayed by selecting a median toolbar feature 322 as shown in FIG. 10 where black triangle 321 indicates such a median value.

Figure 11:
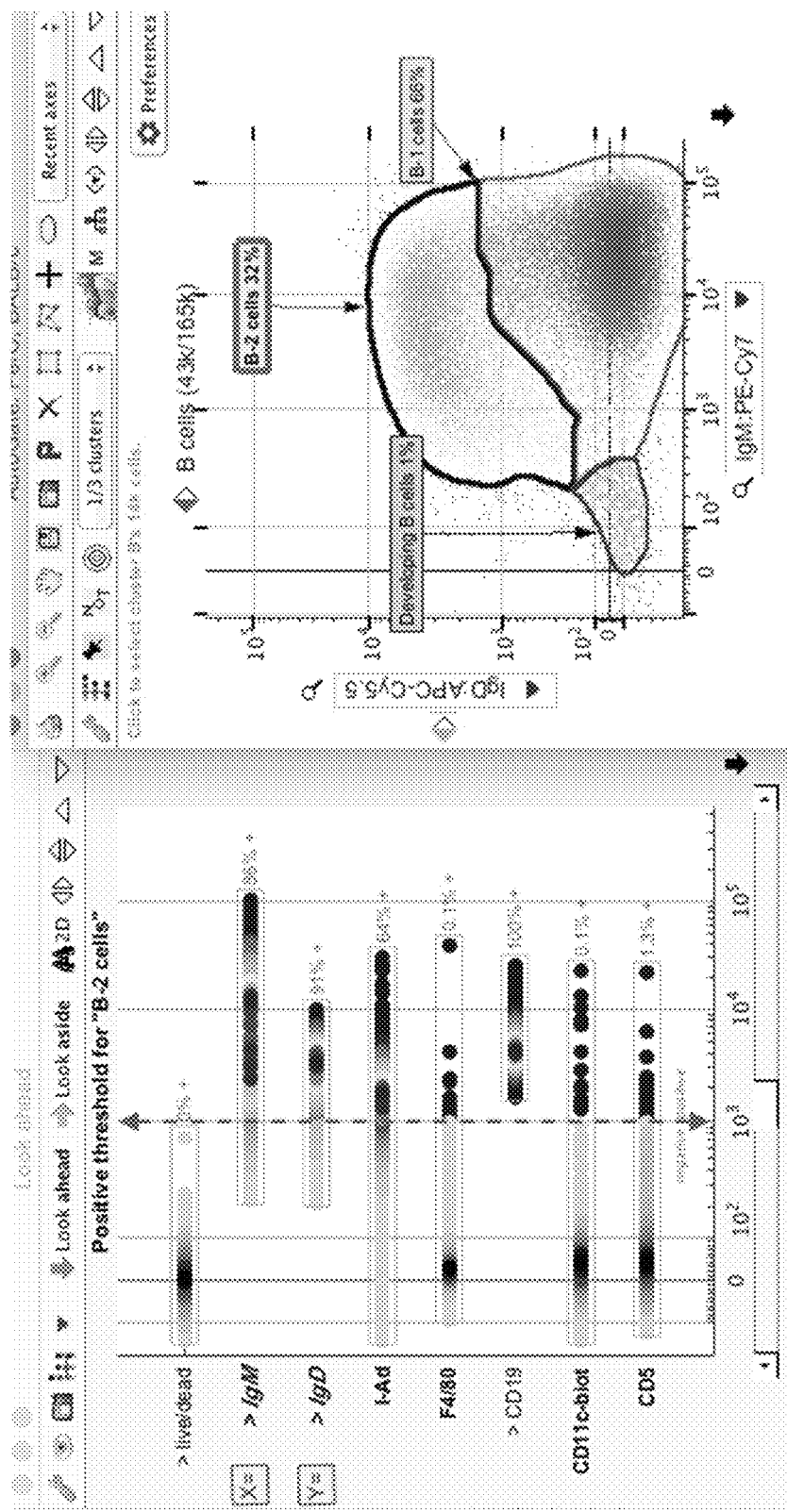
FIG. 11 includes a screen shot of a user selection of a new subset of the data in the plot editor window (right) and corresponding updated marker data for all dimensions displayed in the guidance window (left) in accordance with an embodiment.

In some embodiments, information displayed in the guidance window 314 stays in sync with the plot editor window 310. For example, if the user selects a different cluster or gate in the plot editor window 310, the display in the guidance window immediately changes to reflect the staining of these cells. FIG. 11 shows a user selection of the green cluster corresponding to B-2 cells in the plot editor window 310 and corresponding updated information graphically displayed in the guidance window 314.

Figure 12:
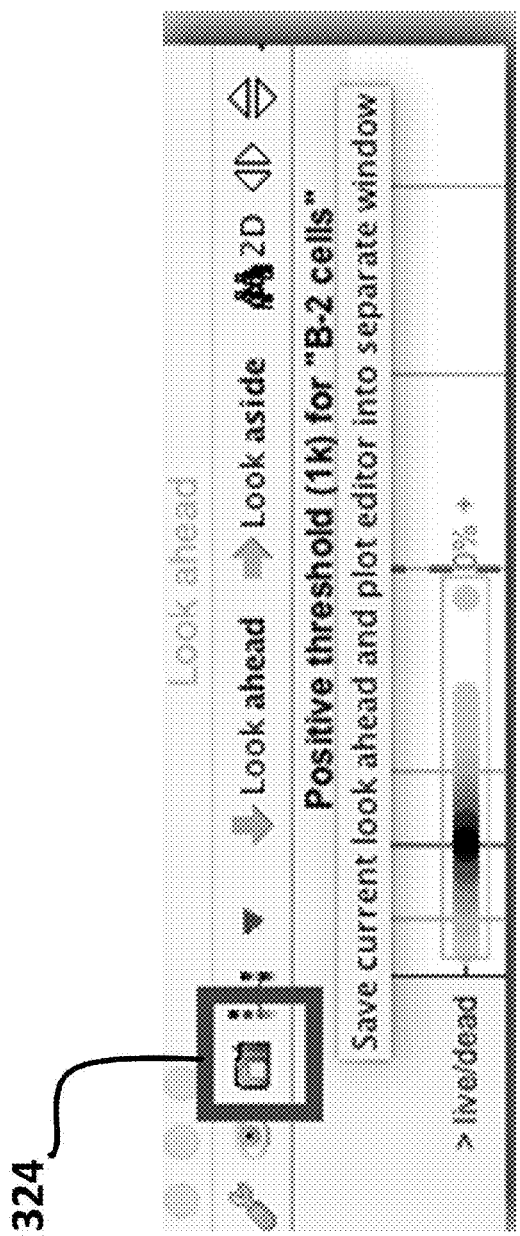
FIG. 12 is a screen shot of a portion of the guidance window highlighting a function for saving generated figures in accordance with an embodiment.

In some embodiments the guidance window includes an image capture feature (e.g., see camera button 324 in FIG. 12) to save images of the two-dimensional plot in the guidance window, of the single parameter charts or graphs in the guidance window, or both.

Figure 13:
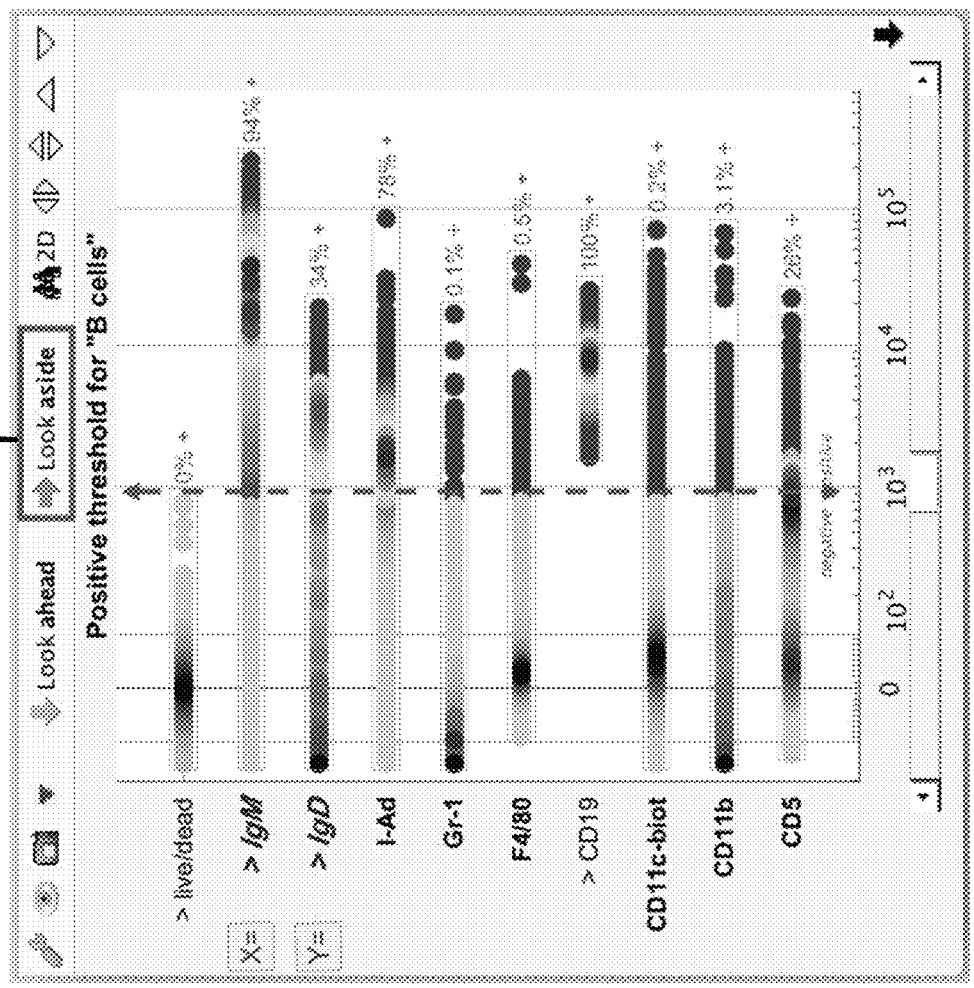
FIG. 13 is a screen shot of the guidance window after selection of a feature to show information in the guidance window corresponding to marker staining of the parent gate in accordance with an embodiment.

In some embodiments, information corresponding to marker staining of the parent gate is displayed in the guidance window in response to a user selection of a "look aside" feature in the guidance window (see "Look aside" button 326 in FIG. 13). With the look aside feature selected, the guidance window contains single parameter graphs and charts including data for all of the items in the two-dimensional plot editor window, regardless of whether a portion of the two-dimensional plot is selected. In some embodiments, if none of the two-dimensional plot in the plot editor is selected, a user only has the option to open a "look aside" window and a feature for selection of a "look ahead" window is not available.

Figure 14:
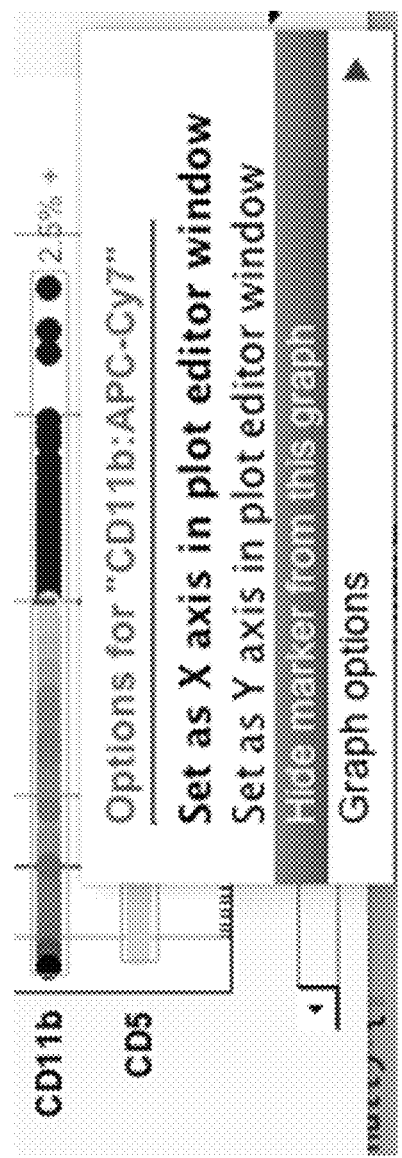
FIG. 14 is a portion of a screen shot showing the hide marker selection feature for the guidance window in accordance with an embodiment.
Figure 15:
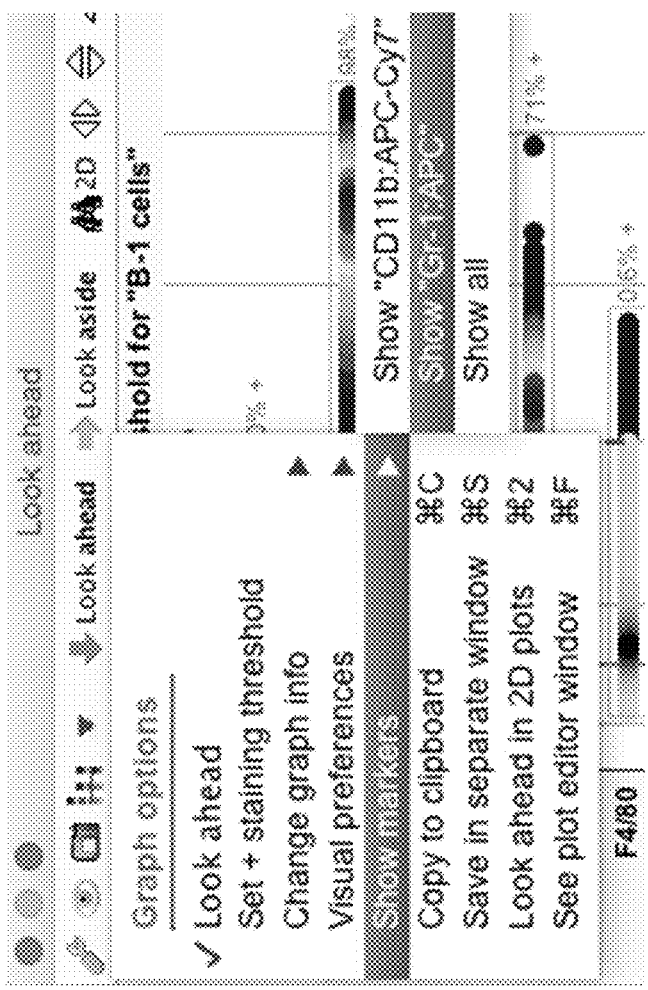
FIG. 15 is a portion of a screen shot illustrating the unhide/show marker selection feature for the guidance window in accordance with an embodiment.

In some embodiments, staining parameter markers may be hidden or shown in the guidance window 314 based on user selections of elements associated with the guidance window. For example, in some embodiments, a right click menu or double click menu displayed when hovering over a bar corresponding to a particular marker may be employed to hide the bar for the marker. For example, to hide the less positive CD11b and Gr-1 stain in the guidance window 310, one would hover over each bar, activate the right click menu, and select "hide marker from this graph" (see FIG. 14). As an example, to restore the display of either or both stains, the user can click the wrench button on the left side of the toolbar guide window 314 and choose from its "Show markers" sub menu (see FIG. 15).

Figure 16A:
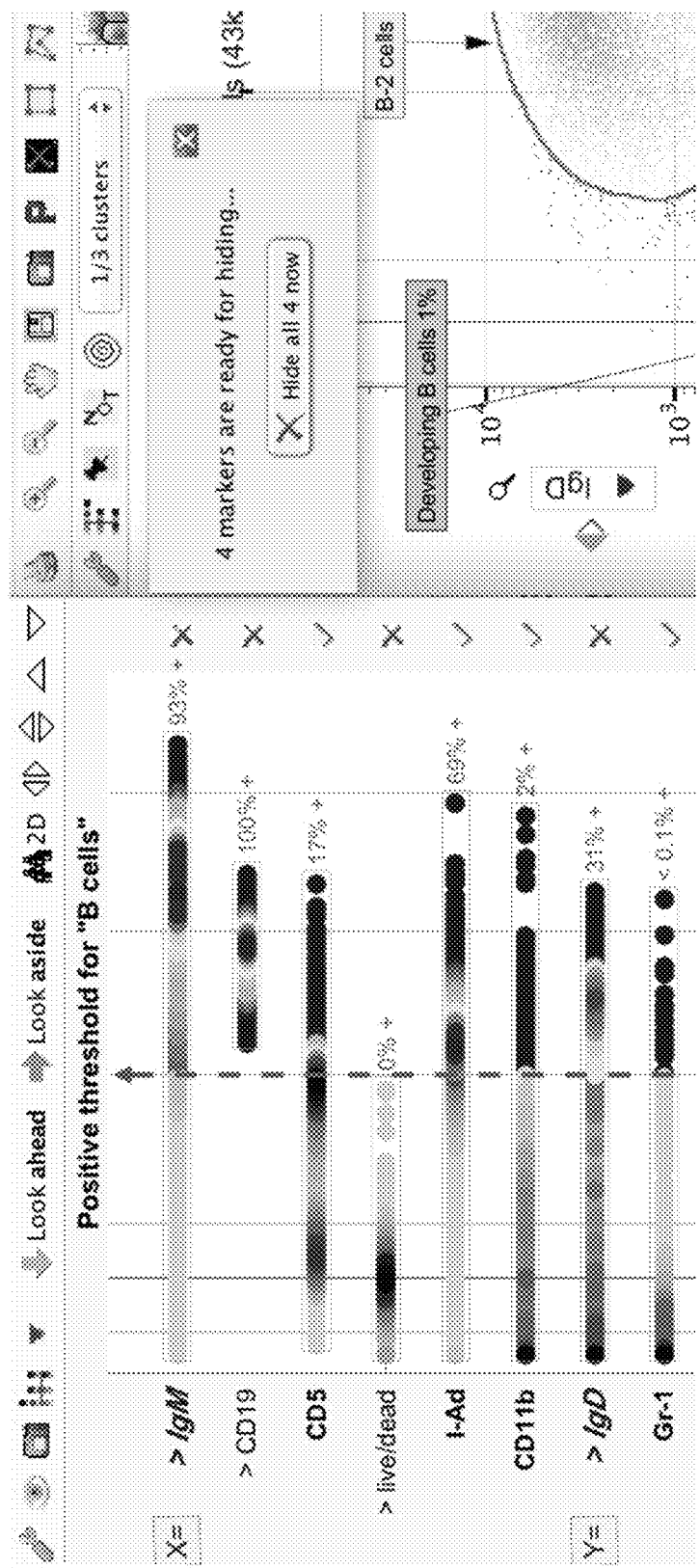
FIG. 16A is a portion of a screen shot illustrating using buttons associated with each bar to hide selected markers in the guidance window in accordance with an embodiment.
Figure 16B:
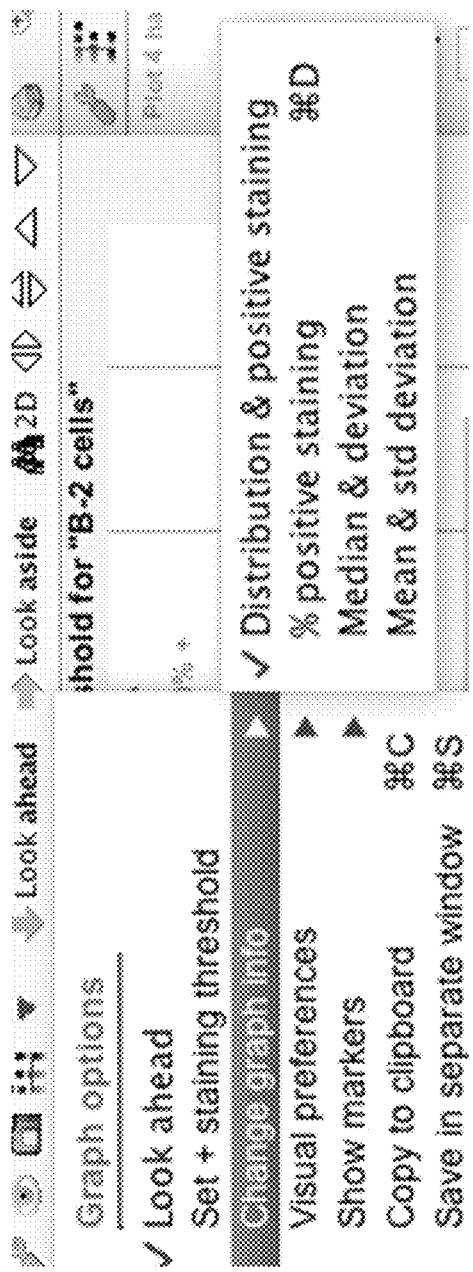
FIG. 16B is a portion of a screen shot illustrating using input control associated with the guidance window to control display of data in the corresponding plot editor window in accordance with an embodiment.

In some embodiments, markers/parameters may be hidden in the guide window based on a received user selection of a displayed graphical element associated with the marker/parameter. For example, in FIG. 16A, check marks and "X" marks on the right side of the guide window are used to hide marker parameters. After selection of "X" marks for the parameter to be hidden, confirmation of the parameters to be hidden is requested as shown on the right side. In the screen shot shown in FIG. 16A, the user is about to hide all of the stains that have been previously used in the gating sequence In some embodiments, selections received from a user based on features or controls displayed in the guidance window are used to control the plot editor window. For example, in some embodiments, the user can change either the X or Y axis in the plot editor window by dragging the "X=" or "Y=" label on the left side of the guidance window to another marker label or horizontal bar, double clicking on a horizontal bar, or right clicking on a horizontal bar and choosing the appropriate menu item. In some embodiments, the guidance window displays features to receive user input to navigate a gating sequence. For example, the guidance window may include buttons on a toolbar that focus the plot editor window on related gate (see buttons 328 in FIG. 9). From left to right the buttons 328 shown in FIG. 9 refocus the plot editor window on: other gates for these sample cells, other gates in this sequence, a parent gate in this sequence, and a child gate in this sequence. In some embodiments, additional options are displayed in the guidance window and user input received based on options displayed in the guidance window change other aspects of the data displayed in plot editor window. For example, in some embodiments, options such as "distribution & positive staining", "% positive staining", "median & deviation", and "median & std deviation" may be displayed to a user (see FIG. 17).

Figure 17B:
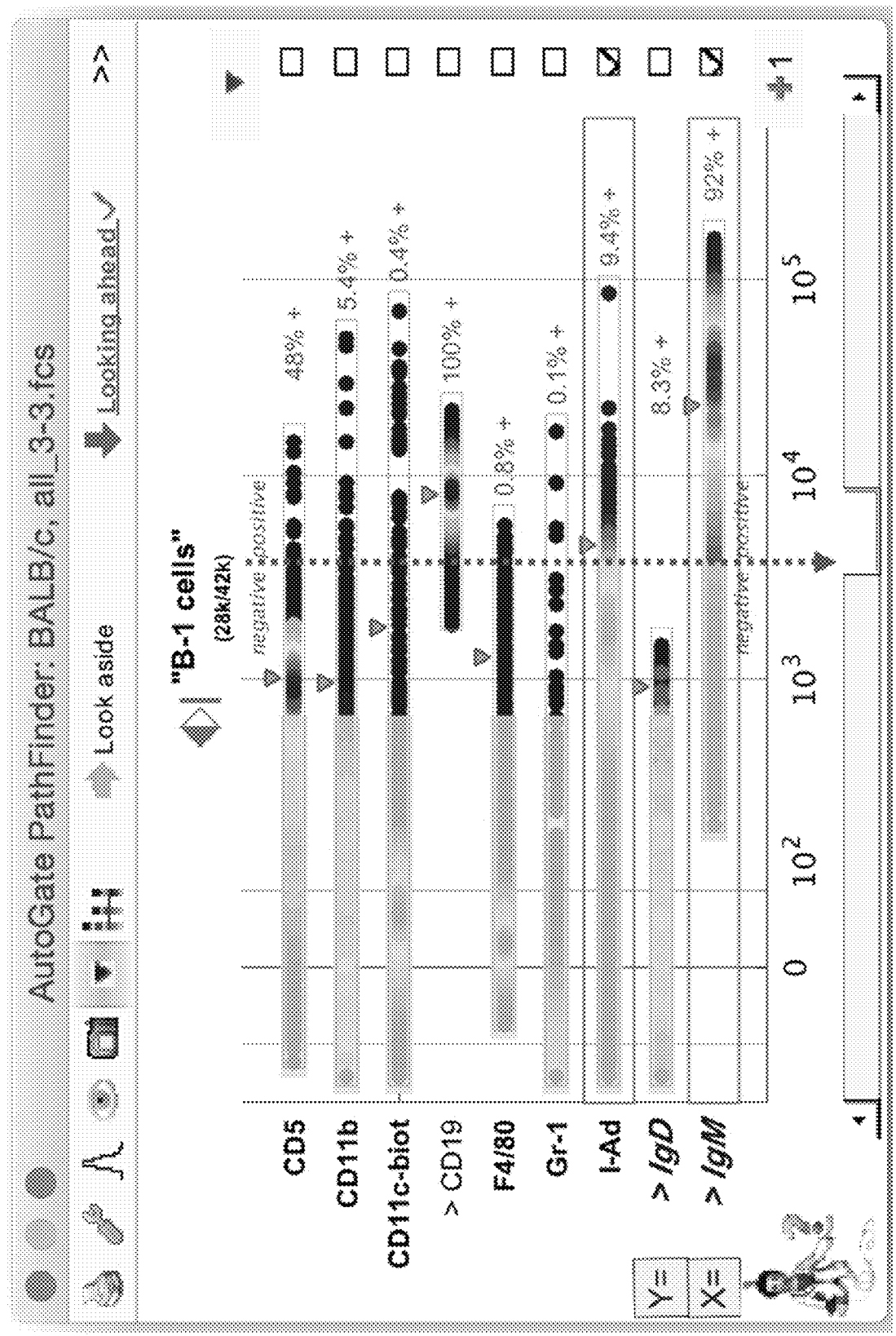
FIG. 17B is a screen shot illustrating a guidance window showing the selection of two markers (e.g., I-Ad and IgM) and selectively changing a staining threshold for only the two selected marker based on user input regarding the location of the threshold line in accordance with an embodiment.
Figure 17C:
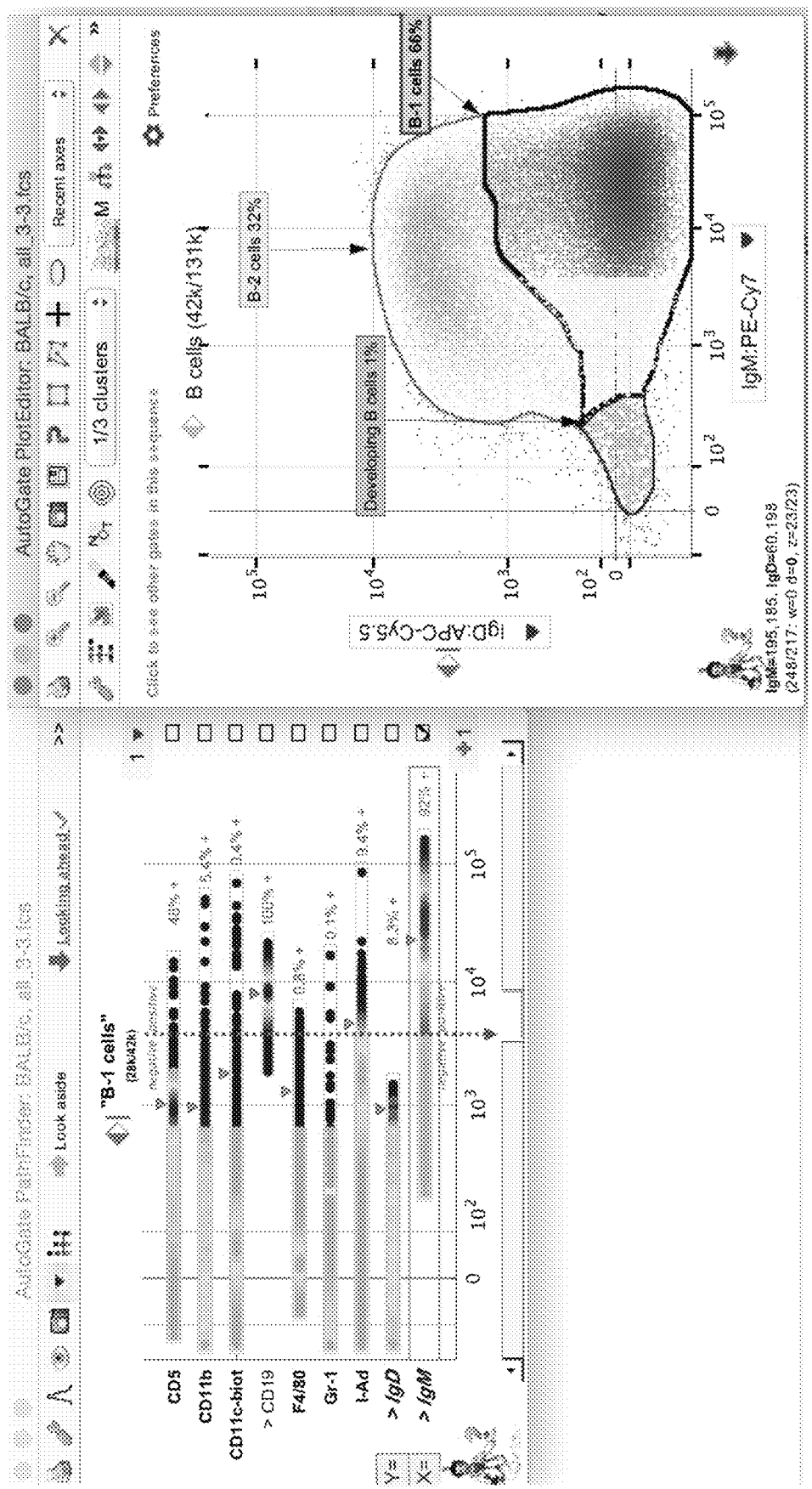
FIG. 17C is a screen shot illustrating a guidance window showing the selection of a marker (e.g., IgM), selectively changing a staining threshold for only the selected marker based on user input regarding the location of the threshold line, and a corresponding change in the items (e.g., cells) selected in the plot editor window based on the changed threshold in accordance with an embodiment.

In some embodiments, the guidance window has graphical features for selection of one or more parameters/markers for application of operations to selected parameters/markers. For example, FIG. 17A includes a guidance window having check boxes for selection on the right hand side of the window. As shown in FIG. 17B, after receiving a user selection of one or more parameters/markers using the check boxes (e.g., checked selections of parameters I-Ad and IgM), receipt of a user indication of an adjustment of the threshold line 316 results in adjustment of the threshold line for only the selected parameters (e.g., I-Ad and IgM). In this way the threshold can be adjusted to different levels for different parameters, as needed. When the guidance window is in a "look ahead" mode, adjustment of a threshold line for a parameter that is included in the two-dimensional plot editor window (e.g., see the adjustment of the IgM threshold in FIG. 17C) is reflected in the two-dimensional plot editor window, meaning some of the selected cells in the plot editor window may be de-selected based on negative staining as shown in FIG. 17C.

FIG. 17B also includes a histogram selection feature (depicted as a purple peak) that can be used to change the single parameter bar charts shown in FIG. 17B into histograms.

In some embodiments, the two-dimensional cluster plot data is displayed using a color-coded density distribution in which color intensity (or color scale) is used to denoted areas of high and low density in a population. For example, see plot editor window 310 in FIGS. 9 and 11.

In some embodiments, to generate the single parameter charts or graphs for a selected "focus set" of cells in a plot editor window, the system gathers all staining measurements (not scatter measurements) for the focus set of cells and then computes the density for each measurement separately. The density for each measurement is then rendered either as a histogram visualization or a probability colouring visualization on a horizontal or vertical bar chart om the guidance window.

In some embodiments, the first interactive display (e.g., the plot editor window) and the second interactive display (e.g., the guidance window) are synchronized such that input received with respect to one interactive display can cause both modification of that interactive display and simultaneous modifications in the other interactive display. For example, changing a selection of a portion of the two-dimensional plot in the plot editor window would cause immediate modification of the corresponding single parameter charts or graphs in the guidance window. Similarly, modification of a threshold in the guidance window for a parameter corresponding to an of the axis in the two-dimensional plot in the plot editor window would cause a simultaneous corresponding modification of the data displayed in the plot editor window.

In some embodiments, the guidance window and associated functionality enables rapid visualization of all staining dimensions for any selected cell subset using either histograms or probability coloring on an averaged logicle scale. In some embodiments, the guidance window and associated functionality guide two-dimensional clustering sequences. In some embodiments, the guidance window and associated functionality facilitate controlling changing parameters for an associated two-dimensional cluster plot in a corresponding plot editor window. For example, using the guidance window, users select one or more staining dimensions and change the associated parameters in the corresponding two-dimensional cluster plot in a corresponding plot editor window. Users can adjust the two-dimensional clusters by removing the negative staining of the dimension(s) selected. Adjustments made by a user in the guidance window may be stored in an analysis template. Methods and systems employing the guidance window and associated functionality may accelerate finding a gating sequence's next step or path forward either when creating an analysis template or after applying it.

In some embodiments, the guidance window also looks for all relevant Fluorescence Minus One (FMO) samples and makes sure the same parent gate exists and then shows a user configurable percentile of where the FMO staining ends (see "Method for automatic background gating using "FMO" control" below).

Methods for Automatic Background Gating Using "FMO" Control

Traditionally, an accurate method for positive events identification involves the use of an "FMO" control (Fluorescence Minus One). This is a sample that has been stained with every reagent except for the one of interest where the difference between measurements of the FMO control and measurements of the test sample identifies positive events. The inventors developed a method for automatic positive events identification (or automatic background gating) involving overlaying a fully stained sample with the FMO control.

Figure 18:
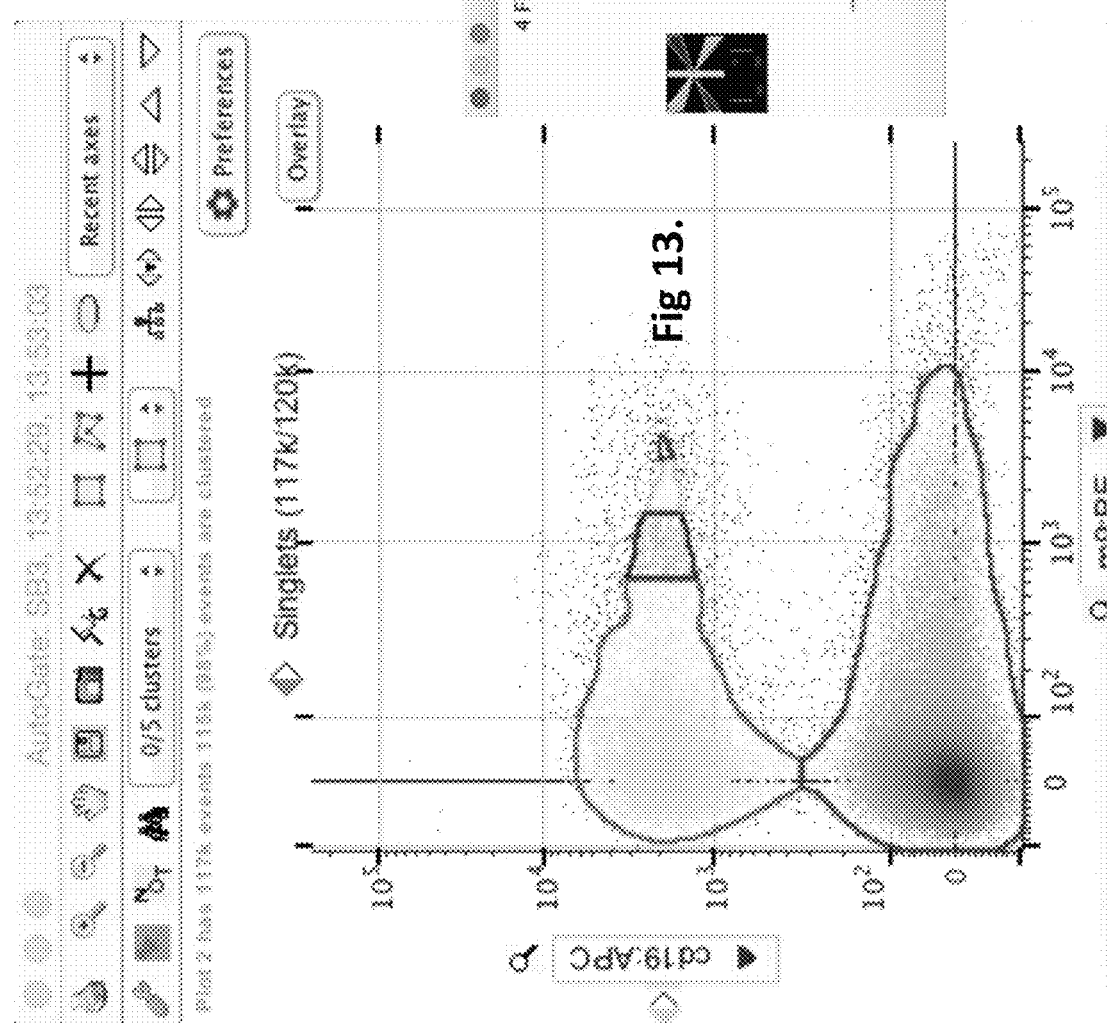
FIG. 18 is a screen shot of a two-dimensional plot of data from a fully stained sample overlaid with a two-dimensional plot of data from a Fluorescence Minus One (FMO) control sample in accordance with an embodiment.
Figure 19:
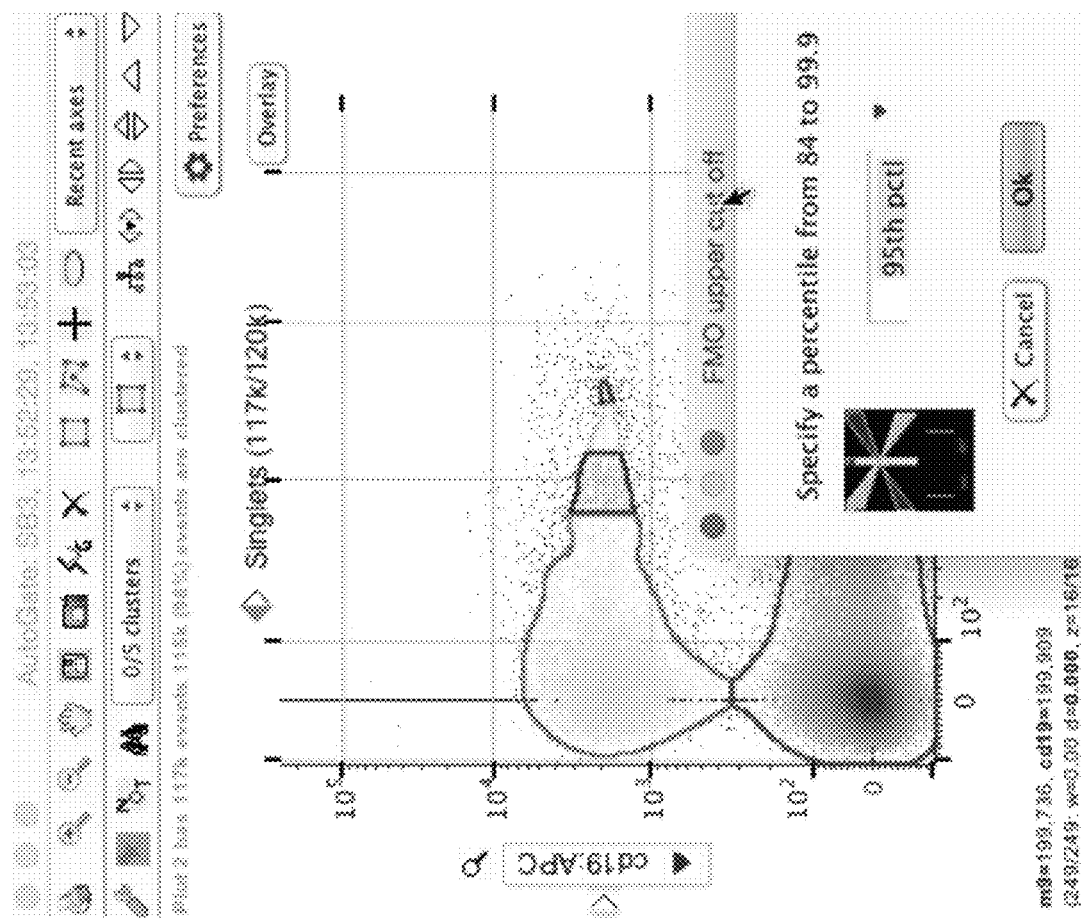
FIG. 19 is a screen shot showing selection of an FMO cutoff percentile in accordance with an embodiment.
Figure 20B:
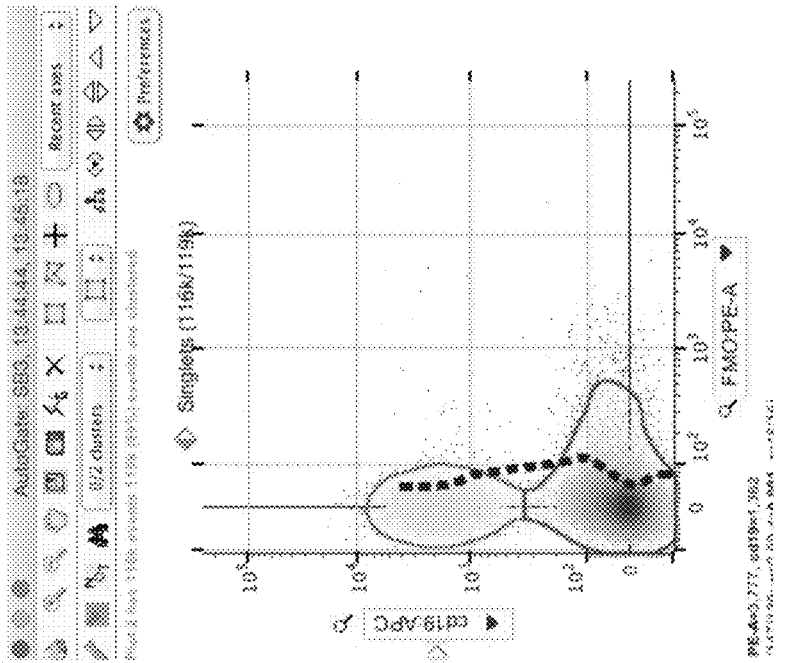
FIG. 20B is a screen shot of only the FMO control sample data showing the FMO line based on the cutoff percentile selection in accordance with an embodiment.
Figure 20A:
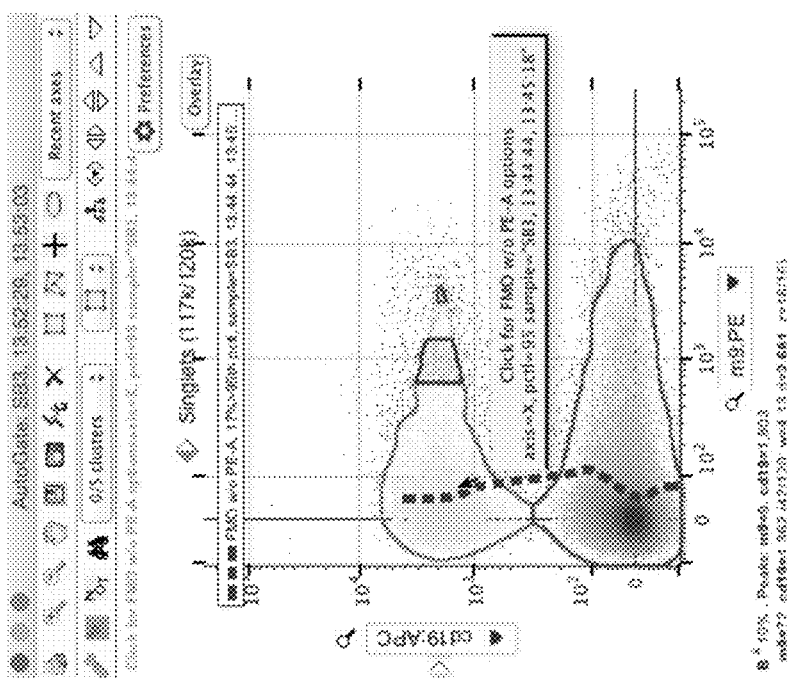
FIG. 20A is a screen shot of two-dimensional data for a fully stained sample overlaying two-dimensional data for an FMO sample showing the FMO line based on the cutoff percentile selection in accordance with an embodiment.
Figure 21:
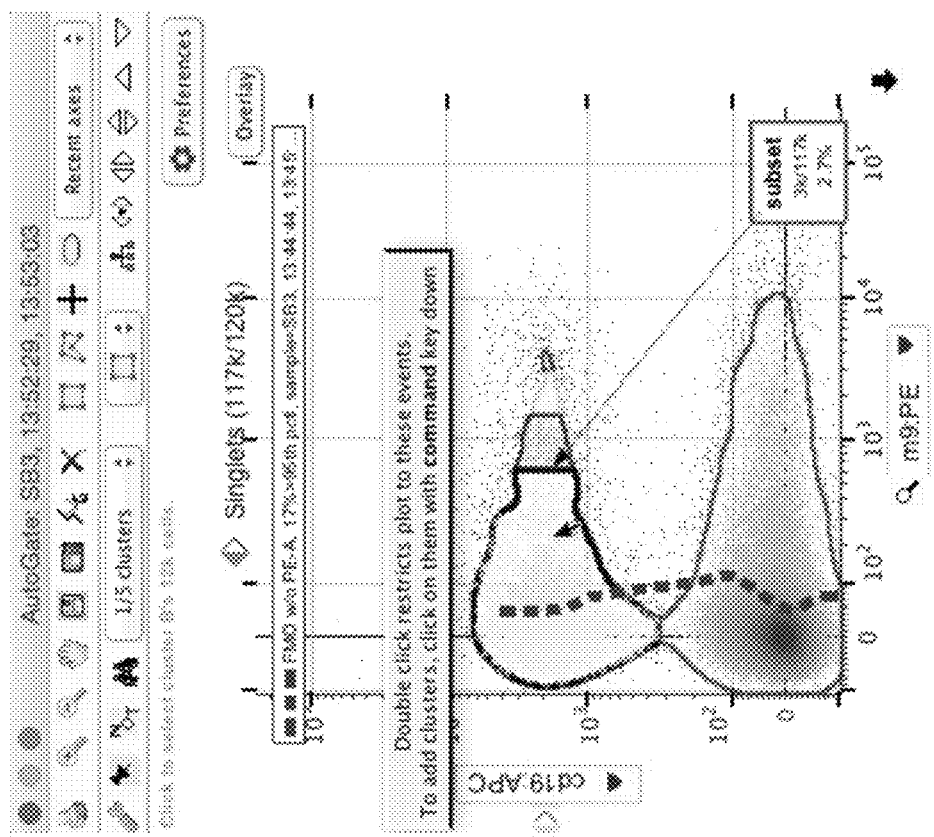
FIG. 21 is a screen shot of the two-dimensional fully stained sample data showing the FMO line based on the cutoff percentile selection in accordance with an embodiment. in accordance with an embodiment.

Initially, a fully stained sample is overlaid with the relevant FMO control as shown in FIG. 18. A cut-off percentile value is defined for the FMO control sample as shown in FIG. 19. In some embodiments, the cut-off value is empirically defined to eliminate of off-scale events and garbage. The dashed line on FIGS. 20A and 2C represents a $95^{th}$ percentile for the FMO control sample-"FMO line" where FIG. 20A shows the fully stained sample data overlaying the FMO control sample data and FIG. 20C shows only the FMO control sample data. With this FMO line present all of the events below this line within a selected gate (e.g., to the left of the dotted line within the selected cluster) will be automatically ruled out from all of the gating selections (see FIG. 21, where a selected cluster has a black border around it and "ruled out" events within the selected cluster are colored in gray).

An example method including using a guidance window to determine sequential gates and using automated background gating is described in Example 5 below.

Systems and Devices

Figure 28:
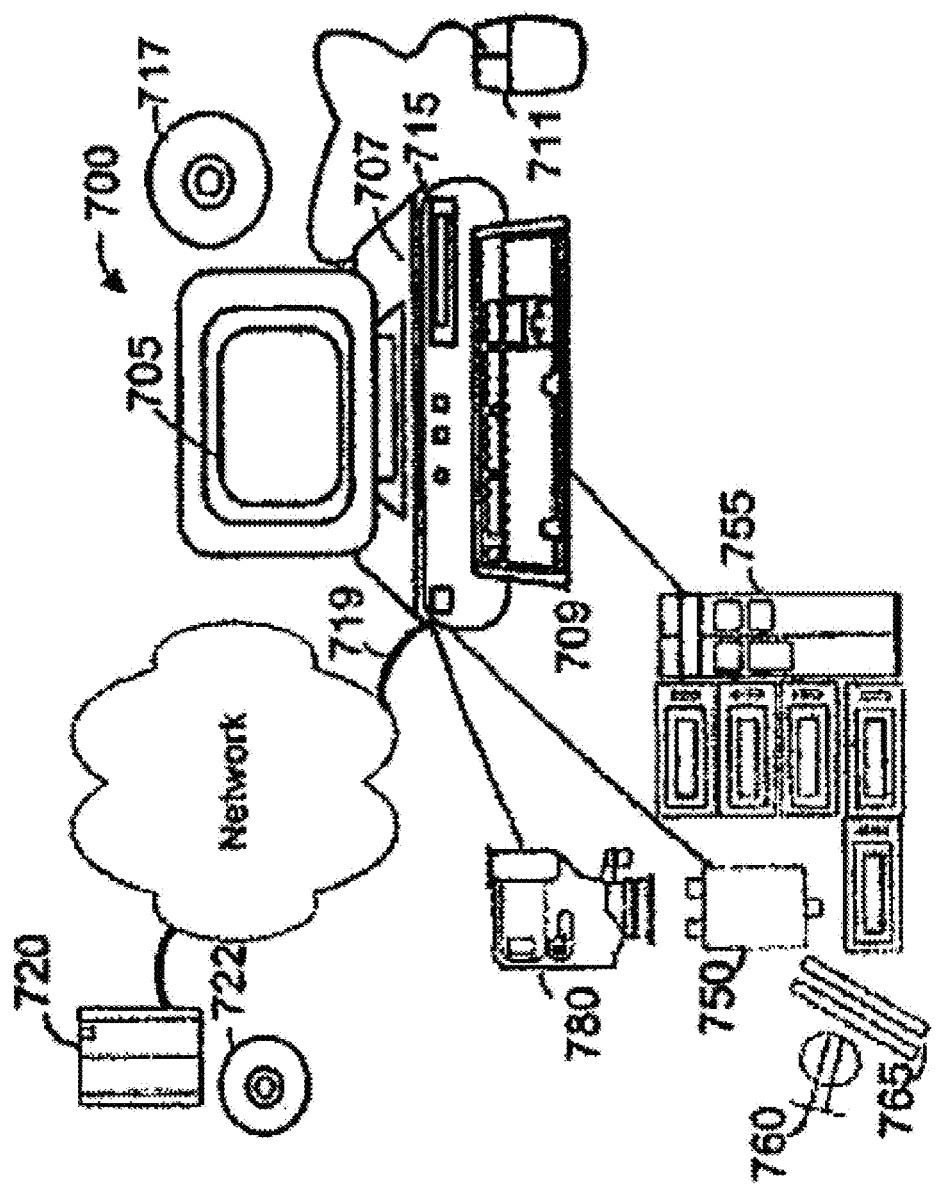
FIG. 28 is a block diagram showing a representative example logic device in which various aspects of the present invention may be embodied.

FIG. 28 is a block diagram showing a representative example computing system or computing device in which various aspects of the present invention may be embodied. As will be understood from the teachings provided herein, the invention can be implemented in hardware and/or software. In some embodiments, different aspects of the invention can be implemented in either client-side logic or server-side logic. Moreover, the invention or components thereof may be embodied in a fixed media program component containing logic instructions and/or data that when loaded into an appropriately configured computing device cause that device to perform according to the invention. A fixed media containing logic instructions may be delivered to a viewer on a fixed media for physically loading into a viewer's computer or a fixed media containing logic instructions may reside on a remote server that a viewer accesses through a communication medium in order to download a program component.

FIG. 28 shows an information appliance, computing system, or digital device 700 that may be understood as a logical apparatus, computing system, or computing device that can perform logical operations regarding image display and/or analysis as described herein. Such a device can be embodied as a general purpose computer system or workstation running logical instructions to perform according to some embodiments of the present invention. Such a device can also be custom and/or specialized laboratory or scientific hardware that integrates logic processing into a machine for performing various sample handling operations. In general, the logic processing components of a device according to some embodiments of the present invention is able to read instructions from media 717 and/or network port 719, which can optionally be connected to server 720 having fixed media 722. Apparatus 700 can thereafter use those instructions to direct actions or perform analysis as understood in the art and described herein. One type of logical apparatus that may embody the invention is a computer system as illustrated in 700, containing CPU 707, optional input devices 709 and 711, storage media (such as disk drives) 715 and optional monitor 705. Fixed media 717, or fixed media 722 over port 719, may be used to program such a system and may represent a disk-type optical or magnetic media, magnetic tape, solid state dynamic or static memory, etc. The invention may also be embodied in whole or in part as software recorded on this fixed media. Communication port 719 may also be used to initially receive instructions that are used to program such a system and may represent any type of communication connection.

FIG. 28 also shows additional components that can be part of a diagnostic system in some embodiments. These components include a microscope or viewer or detector 750, sampling handling 755, light source 760 and filters 765, and a CCD camera or capture device 780 for capturing digital images for analysis as described herein for luminance detection. It will be understood to those of skill in the art that these additional components can be components of a single system that includes logic analysis and/or control. These devices also may be essentially stand-alone devices that are in digital communication with an information appliance such as 700 via a network, bus, wireless communication, etc., as will be understood in the art. It will be understood that components of such a system can have any convenient physical configuration and/or appear and can all be combined into a single integrated system. Thus, the individual components shown in FIG. 28 represent just one example system.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Figure 29:
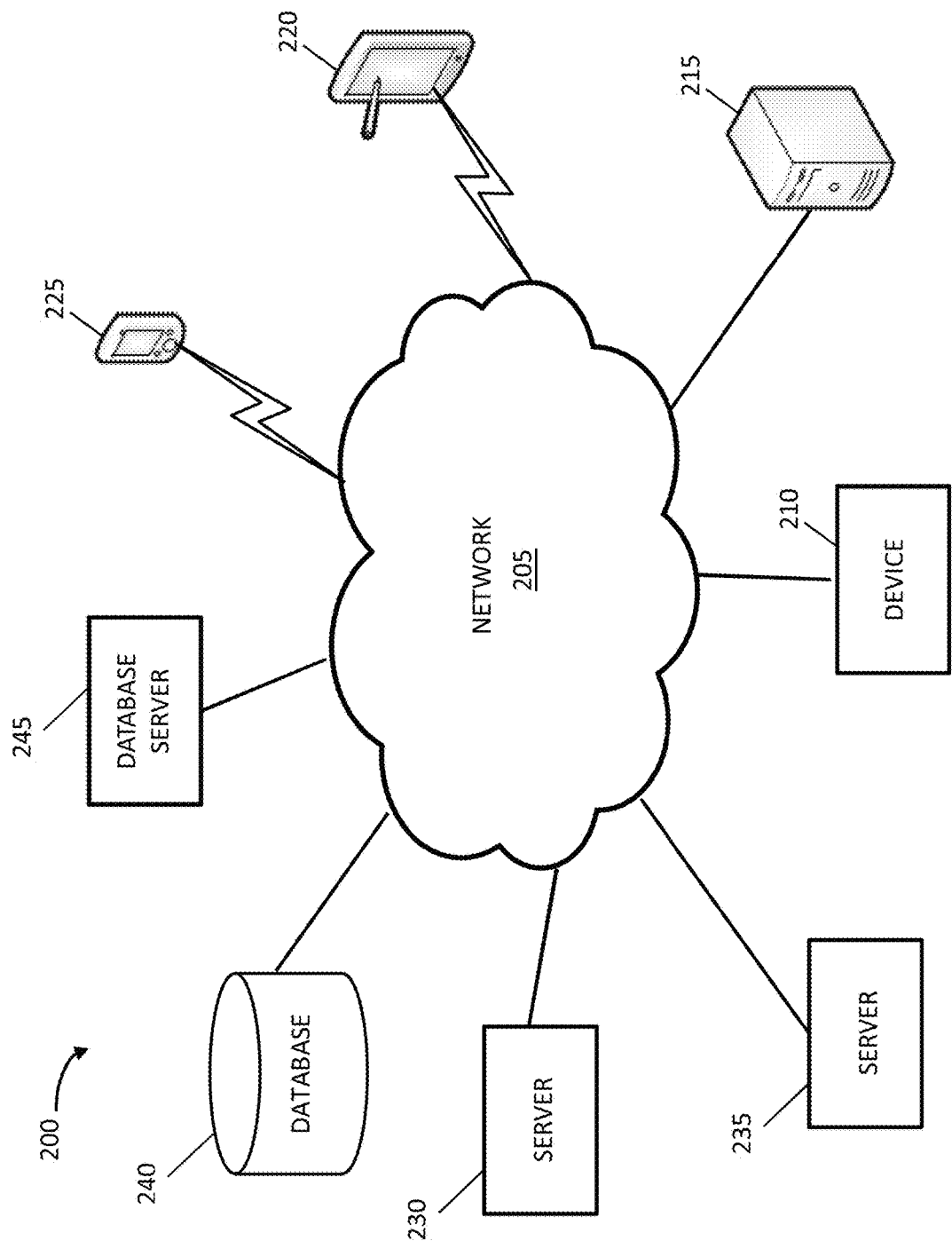
FIG. 29 is a schematic network diagram depicting a system for implementation of methods described herein, in accordance with some embodiments.

FIG. 29 illustrates a network diagram depicting an example system 200 that can be used in part or in full in to implement methods described herein in accordance with an embodiment. The system 200 can include a network 205, a device 210, a device 215, a device 220, a device 225, a server 230, a server 235, a database(s) 240, and a database server(s) 245. Each of the devices 210, 215, 220, 225, servers 230, 235, database(s) 240, and database server(s) 245 is in communication with the network 205.

In an embodiment, one or more portions of network 205 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The devices 210, 215, 220, 225 may include, but are not limited to, work stations, personal computers, general purpose computers, Internet appliances, laptops, desktops, multi-processor systems, set-top boxes, network PCs, wireless devices, portable devices, wearable computers, cellular or mobile phones, portable digital assistants (PDAs), smartphones, tablets, ultrabooks, netbooks, multi-processor systems, microprocessor-based or programmable consumer electronics, mini-computers, and the like. Each of the devices 210, 215, 220, 225 may connect to network 205 via a wired or wireless connection.

In some embodiments, server 230 and server 235 may be part of a distributed computing environment, where some of the tasks/functionalities are distributed between servers 230 and 235. In some embodiments, server 230 and server 235 are part of a parallel computing environment, where server 230 and server 235 perform tasks/functionalities in parallel to provide the computational and processing resources necessary to generate the Bayesian causal relationship networks described herein.

In some embodiments, each of the server 230, 235, database(s) 240, and database server(s) 245 is connected to the network 205 via a wired connection. Alternatively, one or more of the server 230, 235, database(s) 240, or database server(s) 245 may be connected to the network 205 via a wireless connection. Although not shown, database server(s) 245 can be directly connected to database(s) 240, or servers 230, 235 can be directly connected to the database server(s) 245 and/or database(s) 240. Server 230, 235 includes one or more computers or processors configured to communicate with devices 210, 215, 220, 225 via network 205. Server 230, 235 hosts one or more applications or websites accessed by devices 210, 215, 220, and 225 and/or facilitates access to the content of database(s) 240. Database server(s) 245 includes one or more computers or processors configured to facilitate access to the content of database(s) 240. Database(s) 240 include one or more storage devices for storing data and/or instructions for use by server 230, 235, database server(s) 245, and/or devices 210, 215, 220, 225. Database(s) 240, servers 230, 235, and/or database server(s) 245 may be located at one or more geographically distributed locations from each other or from devices 210, 215, 220, 225. Alternatively, database(s) 240 may be included within server 230 or 235, or database server(s) 245.

Figure 30A:
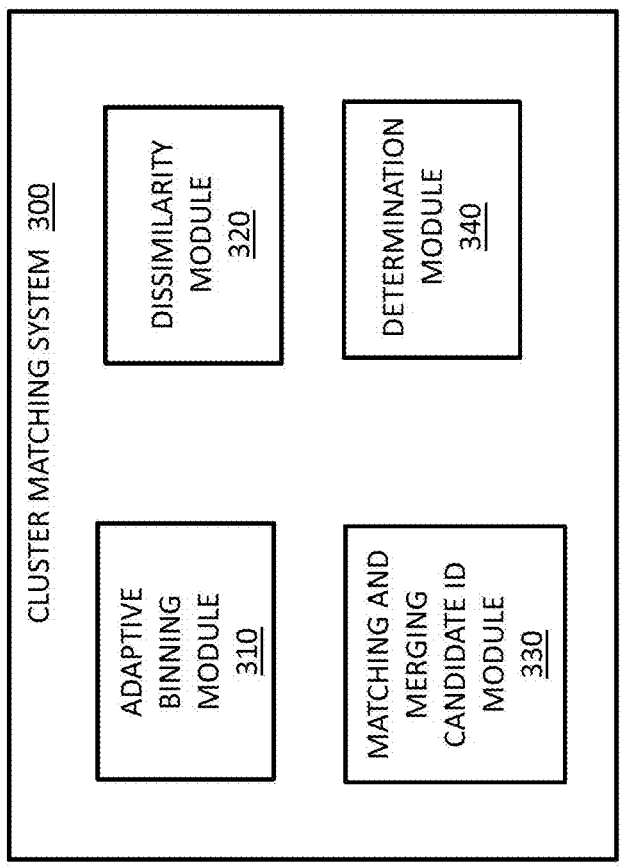
FIG. 30A is a block diagram schematically depicting a system including modules for implementation of methods described herein incorporating cluster matching, in accordance with some embodiments.
Figure 30B:
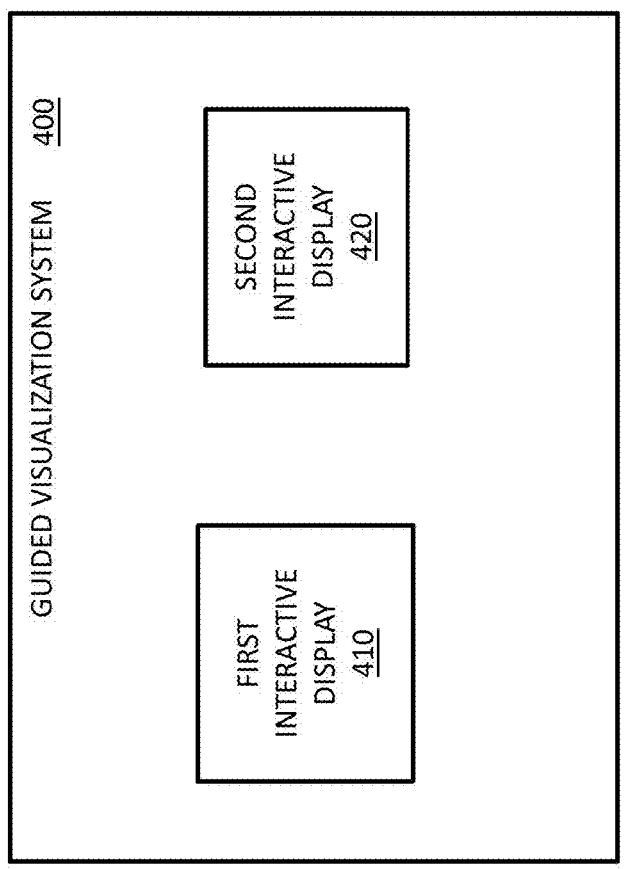
FIG. 30B is a block diagram schematically depicting a system including modules for implementation of methods described herein incorporating guided visualization, in accordance with some embodiments.

FIG. 30A is a block diagram showing a system 300 implemented in modules according to an example embodiment. In some embodiments, the modules include an adaptive binning module 310, a dissimilarity module 320, a matching and merging candidate identification module 330, and a determination module 340. FIG. 30B is a block diagram showing a system 400 implemented in modules according to an example embodiments. In some embodiments the modules include a first interactive display and a second interactive display. In some embodiments, modules 310, 320, 330, 340, 410 and 420 are included in the same system. In an example embodiment, one or more of modules 310, 320, 330, and 340 are included in server 230 and/or server 235 while other of the modules 310, 320, 330, and 340 are provided in the devices 210, 215, 220, 225. In another example embodiment, one or more of modules 310, 320, 330, 340, 410 and 420 are included in server 230 and/or server 235 while other of the modules 310, 320, 330, 340, 410 and 420 are provided in the devices 210, 215, 220, 225.

In alternative embodiments, the modules may be implemented in any of devices 210, 215, 220, 225. The modules may include one or more software components, programs, applications, apps or other units of code base or instructions configured to be executed by one or more processors included in devices 210, 215, 220, 225.

Although modules 310, 320, 330, and 340 are shown as distinct modules in FIG. 30A, it should be understood that modules 310, 320, 330, and 340 may be implemented as fewer or more modules than illustrated. It should be understood that any of modules 310, 320, 330, and 340 may communicate with one or more external components such as databases, servers, database server, or other devices.

Although modules 410 and 420 are shown as distinct modules in FIG. 30B, it should be understood that modules 410 and 420 may be implemented as fewer or more modules than illustrated. It should be understood that any of modules 410 and 420 may communicate with one or more external components such as databases, servers, database server, or other devices.

In some embodiments, the adaptive binning module 310 is a hardware-implemented module or software-implemented module configured to configured to perform multivariate adaptive binning on a combined data set including a first sample data and a second sample data to determine a combined binning pattern.

In some embodiments, the dissimilarity module 320 is a hardware-implemented module or a software implemented module, configured to, for at least some combinations of a first identified cluster in the first sample data and a second identified cluster in the second sample data, determine a dissimilarity score for the combination based on a quadratic form distance for multi-dimensional data using the combined binning pattern applied to the first identified cluster in the first data set and the combined binning pattern applied to the second identified cluster in the second data set.

In some embodiments, the adaptive binning module 310 or the dissimilarity module 320 is further configured to apply the combined binning pattern separately to the first sample data and the second sample data. In some embodiments, the system includes another module that applies the combined binning pattern to the first sample data and the second sample data. In some embodiments, the adaptive binning module or the dissimilarity module is further configured to, for at least some of the identified clusters in the first sample data and the second sample data, generate a histogram for the identified cluster based on the combined binning pattern.

In some embodiments, the dissimilarity module 320 is configured to determine a dissimilarity score for a combination of a first identified cluster in the first sample data and a second identified cluster in the second sample data based on the following equation:

$$D^2(h,f)=(h-f)^T A(h-f)=\Sigma_{i=1}^n \Sigma_{j=1}^n a_{ij}(h_i-f_i)(h_j-f_j),$$

in which $h_i$ are the relative frequencies of the first cluster in the first sample data based on the combined binning pattern applied to the first cluster, $f_i$ are the relative frequencies of the second cluster in the second sample data based on the combined binning pattern applied to the second cluster, and $A=[a_{ij}]$ is a matrix of spatial dissimilarity between a bin i in the combined binning pattern of the first cluster in the first sample data and a bin j in the combined binning pattern of the second cluster in the second sample data. In some embodiments, $a_{ij}=1-d_{M_{ij}}/d_{max}$, where $d_{M_{ij}}$ is the Euclidean distance between centers of mass as calculated on the combined data set of the ith and jth bins in the combined binning pattern, and $d_{max}$ is the maximum value of all the $d_{M_{ij}}$.

In some embodiments, the matching and merging candidate identification module 330 is a hardware-implemented module or software implemented module configured to identify one or more matched clusters and one or more merging candidates based on comparisons of the determined dissimilarity scores for the combinations. In some embodiments, the matching and merging candidate identification module 330 is configured to identify the one or more matched clusters and the one or more merging candidates based on comparisons of the determined dissimilarity scores for the combinations by performing steps including: determining a lowest dissimilarity score for each cluster in the first sample data and the second sample data; and for each cluster, The steps also include identifying the cluster as matched to a corresponding cluster in the other sample data where the lowest dissimilarity score for the cluster in the first sample data or the second sample data is also the lowest dissimilarity score for the corresponding cluster in the other sample data; and identifying the cluster as a candidate merging cluster where the lowest dissimilarity score for the cluster in the first sample data or the second sample data is not the lowest dissimilarity score for the corresponding cluster in the other sample data set.

In some embodiments, the determination module 340 is hardware-implemented module or software implemented module, configured to determine, for each merging candidate in the first sample data or the second sample data, whether the merging candidate corresponds to a split of a cluster in the other sample data or corresponds to a missing cluster in the other sample data. In some embodiments, the determination module 340 is configured to determine, for each merging candidate in the first sample data or the second sample data, whether the merging candidate corresponds to a split of a cluster in the other sample data or corresponds to a missing cluster in the other sample data by performing steps including combining the merging candidate with the nearest cluster in the same sample data and calculating a new dissimilarity score for the combined cluster. The steps also include identifying the merging candidate as a split of the corresponding cluster in the other sample data where the new dissimilarity score is equal to or lower than the lowest prior dissimilarity score for the nearest cluster and using the combination of the merging candidate and the nearest cluster as a merged cluster matched to the corresponding cluster for any further determinations of whether a merging candidate corresponds to a split of a cluster or a missing cluster. The steps also include identifying the candidate merging cluster as missing from the other sample where the new dissimilarity score is higher than the lowest prior dissimilarity score for the nearest matched cluster.

In some embodiments, the first interactive display module 410 is hardware-implemented module or software implemented module configured to display a two-dimensional plot of at least portion of a data set, the data set including data corresponding to measurements of a plurality of parameters for a plurality of items, the data set having a plurality of dimensions, each dimension corresponding to measurements of a parameter in the plurality of parameters for the plurality of items, wherein the two-dimensional plot displays data corresponding to measurements of a first parameter for a second plurality of items and data corresponding to measurements of a second parameter for the second plurality of items, the second plurality of items being at least a subset of the first plurality of items.

In some embodiments, the second interactive display module 420 is hardware-implemented module or software implemented module configured to display a plurality of single parameters charts or graphs each single parameter chart or histogram displaying information corresponding to one-dimensional measurements of a different parameter for a third plurality of items that includes some or all of the second plurality of items.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA), an application-specific integrated circuit (ASIC), or a Graphics Processing Unit (GPU)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

For the purposes of this disclosure, a non-transitory computer readable medium stores computer programs and/or data in machine readable form. By way of example, and not limitation, a computer readable medium can include computer storage media and communication media. Computer storage media includes volatile and non-volatile, removable and non-removable media implemented in any method or technology for storage of information such as computer-readable instructions, data structures, program modules, and specific applications.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 31:
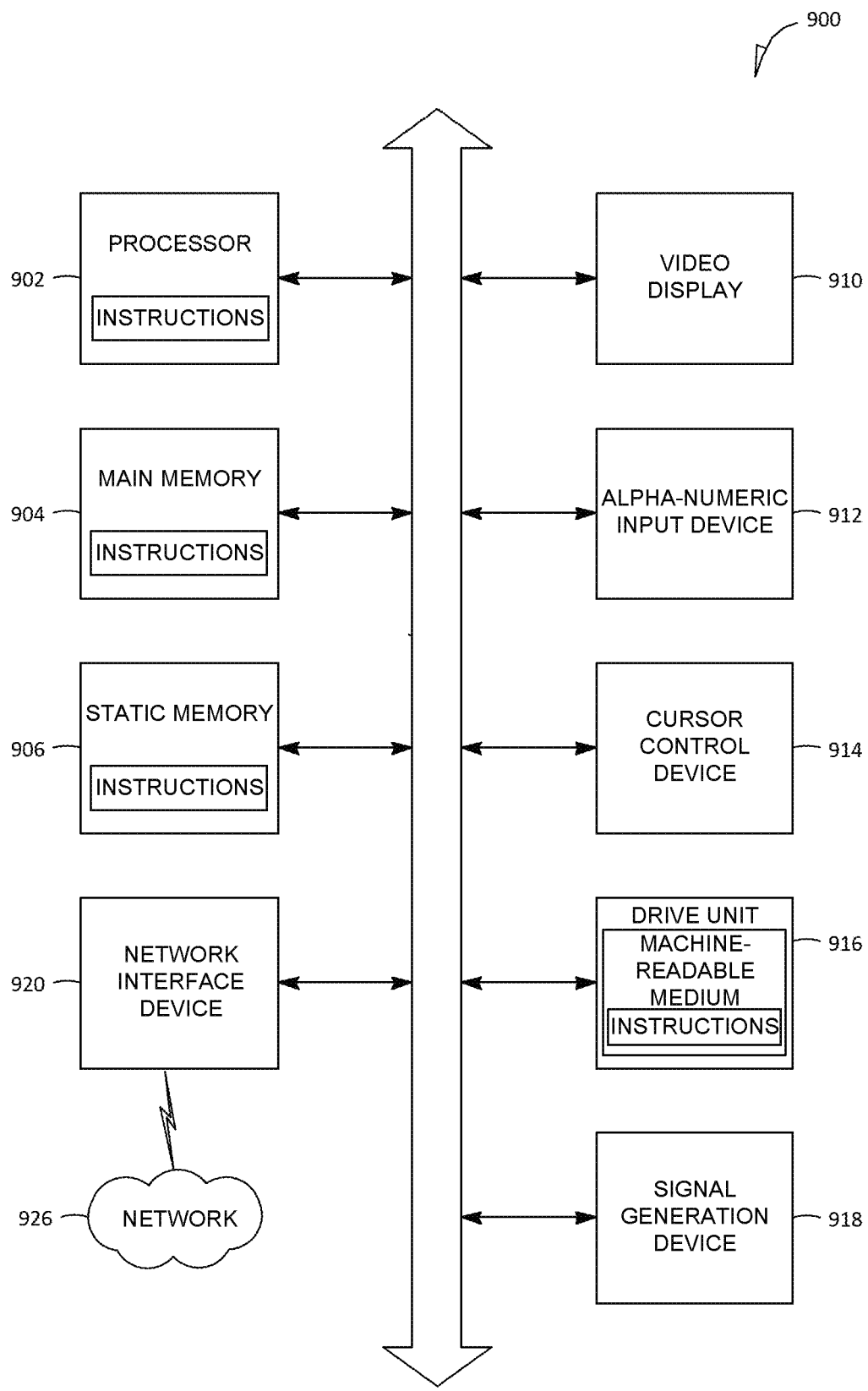
FIG. 31 is a block diagram of a computing device that may be used to implement some embodiments of systems and methods described herein.

FIG. 31 is a block diagram of machine in the example form of a computer system 900 within which instructions, for causing the machine (e.g., device 210, 215, 220, 225; servers 230, 235; database server(s) 240; database(s) 230) to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a multi-core processor, and/or a graphics processing unit (GPU)), a main memory 904 and a static memory 906, which communicate with each other via a bus 908. The computer system 900 may further include a video display unit 910 (e.g., a liquid crystal display (LCD), a touch screen, or a cathode ray tube (CRT)). The computer system 900 also includes an alphanumeric input device 912 (e.g., a physical or virtual keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software) 924 embodying or used by any one or more of the methodologies or functions described herein. The instructions 924 may also reside, completely or at least partially, within the main memory 904, static memory 906, and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Other embodiments will be apparent to those of skill in the art. In particular, a viewer digital information appliance has generally been illustrated as a personal computer. However, the digital computing device is meant to be any information appliance suitable for performing the logic methods of the invention, and could include such devices as a digitally enabled laboratory systems or equipment, digitally enabled television, cell phone, personal digital assistant, etc. Modification within the spirit of the invention will be apparent to those skilled in the art. In addition, various different actions can be used to effect interactions with a system according to some embodiments of the present invention. For example, a voice command may be spoken by an operator, a key may be depressed by an operator, a button on a client-side scientific device may be depressed by an operator, or selection using any pointing device may be effected by the user.

Logic systems and methods such as described herein can include a variety of different components and different functions in a modular fashion. Different embodiments of the invention can include different mixtures of elements and functions and may group various functions as parts of various elements. For purposes of clarity, the invention is described in terms of systems and/or methods that include many different innovative components and innovative combinations of innovative components and known components.

According to aspects of the disclosed subject matter described herein the subject matter is in part described with reference to block diagrams and operational illustrations of methods and devices and devices implementing methods to qualitatively and quantitatively analyze distributions of data. It is understood that each block of the block diagrams or operational illustrations, and combinations of blocks in the block diagrams or operational illustrations, can be implemented by means of analog or digital hardware and computer program instructions or combinations thereof.

These computer program instructions can be provided to a processor of a general purpose computer, special purpose computer, microcontroller, ASIC, or any other programmable data processing apparatus (a "computing device"), such that the instructions, which execute via the processor of the computing device or other programmable data processing apparatus, implement the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. In addition different blocks may be implemented by different processors, such as an array or processors operating in series or parallel arrangement, and exchanging data and/or sharing common data storage media.

Example 1—Workflow for Automated Clustering and Alignment of Cell Populations in Flow Cytometry Data The inventors used three real datasets to demonstrate application of embodiments of the method including QF dissimilarity score-based cluster matching for automated clustering and alignment of cell populations identified in flow cytometry data. Specifically, exemplary methods were used to match subsets between relevant samples (same staining panels) within the biological/biomedical datasets.

The same data workflow was used in all three examples discussed below. The proposed workflow for analyzing all three datasets used in this manuscript included preprocessing the data by sequentially using utilities available in the AutoGate analysis application (described in Meehan, S. et al., AutoGate: automating analysis of flow cytometry data. *Immunol Res*. 58(2-3), 218-223 (2014)), to compensate the data, transform it with the Logicle transformation (as described in Moore, W. A. & Parks, D. R. Update for the logicle data scale including operational code implementations. *Cytometry A*. 81(4), 273-277 (2012)), and cluster the transformed data based on two-dimensional density-based merging (DBM) as described in US 2015/0293992, which is incorporated by reference herein in its entirety. The flow cytometry data preprocessing methods employed did not require user input for parameters such as number of clusters, number of grid bins, density threshold, manual gating for compensation purposes, etc.

The data workflow included using method 100 on the preprocessed data to match clusters across different samples based on QF dissimilarity scores. Method 100 was implemented in the MATLAB language and called by the AutoGate application. Method 100 was also implemented as a standalone MATLAB program. Combining Logicle transformation, DBM for cell population identification, probability binning, and QF dissimilarity scores for cluster matching provided a complete pipeline for cluster matching of flow cytometry samples. However, methods for cluster matching of flow cytometric subsets as described here may be implemented for many different types of preprocessing, not just the preprocessing described above implemented with the AutoGate application. For example, the clusters could have been defined by using domain knowledge-driven manual gating, a sequential automated clustering approach, or a simultaneous clustering approach.

Example 2—Matching of Basophil Populations Between Patient Samples, Even when Marker Expression Levels Vary Between Patients Human and mouse datasets shown for Examples 2 and 3 were generated in previously published studies (see Gernez, Y., et al., Blood basophils from cystic fibrosis patients with allergic bronchopulmonary aspergillosis are primed and hyper-responsive to stimulation by *Aspergillus* allergens. *J Cyst Fibros*. 11, 502-510 (2012) (hereafter "Gernez et al., *J Cyst Fibros*, 2012") and Ghosn, E. E., et al. Two physically, functionally, and developmentally distinct peritoneal macrophage subsets. *Proc Natl Acad Sci USA*. 107(6), 2568-2573 (2010) (hereafter "Ghosn et al., *Proc. Natl Acad Sci*, 2010") for complete materials and methods). Access to the data was provided by the investigators responsible for the studies. Information about instruments used to collect the human and mouse samples can be found in the aforementioned documents (see Gernez et al., *J Cyst Fibros*, 2012 and Ghosn et al., *Proc. Natl Acad Sci*, 2010).

Basophil marker expression levels commonly differ from sample to sample. In the original study (Gernez et al., *J Cyst Fibros*, 2012), the authors used the surface level of CD123 as a phenotypic marker to identify peripheral blood basophils. The expression of this marker commonly varies from patient to patient. For example FIG. 5 includes clusters corresponding to basophil populations (shown in red) that shifted from patient to patient. These basophil clusters in FIG. 5 were identified using the following gating sequence: FSC-A/SSC-A (total white blood cells)→FSC-A/FSC-H (singlets)→CD41a/live/dead (CD41a—live)→Dump [CD3, CD66b, HLA-DR]/CD123 (Dump—, CD123++)]. Method 100 was applied to the preprocessed data and the cluster shown in red was successfully matched even though the mean fluorescence intensity (MFI) varied from 1033 to 6672 across the three patients. Importantly, the matching method was capable of aligning such clusters, even when MFI values and the size of the basophil cluster varied from one sample (e.g., patient) to another. Basophil populations in these patient samples had relative frequencies of the same order of magnitude (see plots in FIG. 5) while the distance between their geometric means was significant ([0.6; 0.7]σ when comparing Patient 1 with Patient 2 and [5.1; 1.6]σ between Patient 1 and Patient 3).

Example 3—Detection of Missing Lymphocyte Populations in the Peritoneal Cavity of RAG Knockout (RAG$^{-/-}$) Mice Samples of wild-type (BALB/c) and knockout (RAG$^{-/-}$) mouse peritoneal cavity cells (PerC) were aligned based on cell surface expression of CD5 and CD19, which respectively identify T and B lymphocytes, i.e., CD5$^{hi}$CD19$^-$ and CD19$^{hi}$CD5$^{lo/-}$. Cells were obtained from the peritoneal cavity of BALB/c (wild-type) and RAG$^{-/-}$ (knockout) mice, stained for surface markers and analysed by flow cytometry (for experiment details, see Ghosn et al., *Proc. Natl Acad Sci*, 2010). The following gating strategy was employed in preprocessing (according to Ghosn et al., *Proc. Natl Acad Sci*, 2010): Propidium Iodide$^-$ (live cells)/FSC-A→FSC-W/ FSC-A→CD19/CD5. The clusters highlighted in the same color in both dot plots in FIG. 6A represent the cell subsets that were matched between the BALB/c (left) and RAG$^{-/-}$ (right) samples (e.g., green #1 with green #1, red #2 with red

2). Unmatched cell subsets are highlighted in blue (e.g., #3, #4 and #5 in the BALB/c dataset on the left) and their corresponding cluster identifiers are highlighted in light gray in the corresponding tables in FIG. 6B.

In this study, the matching method was implemented in Python and the running calculations were performed on a 3.1 GHz Intel Core i7 with 16 GB of RAM running Mac OS X 10.11.6. With this implementation, it took about 14 seconds to align BALB/c with RAG$^{-/-}$ (~268 000 cells total) from FIG. 6A using 256 bins. This example provides a sense of speed of the cluster matching method for one implementation.

Figures 6A, 6B:
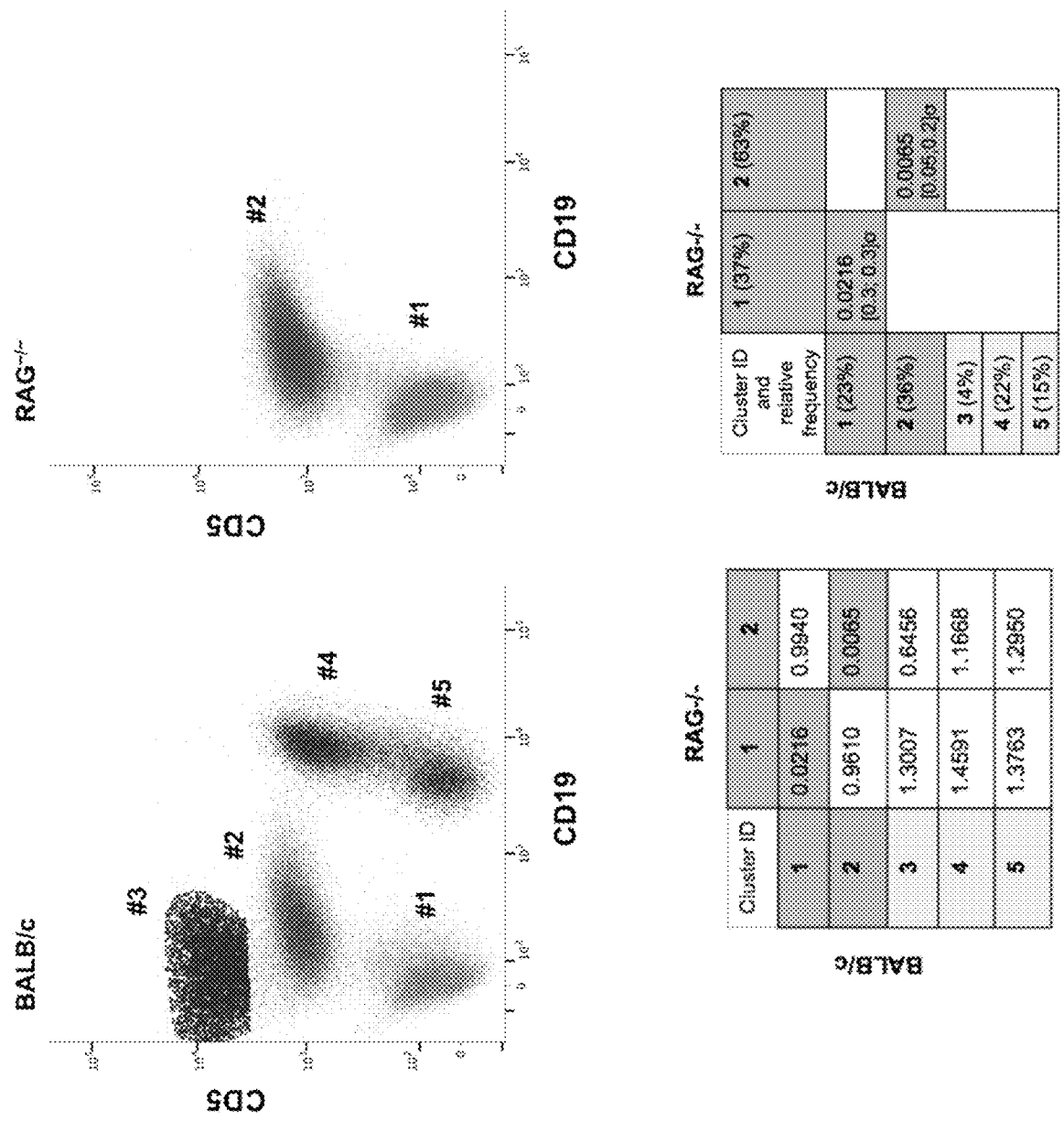
FIG. 6A includes dot plots of samples from BALB/c and RAG-/- mice showing matched and unmatched clusters for Example 3.
FIG. 6B includes tables of calculated QF dissimilarity scores for various cluster pairs for the data shown in the dot plots of FIG. 6A.
Figure 7:
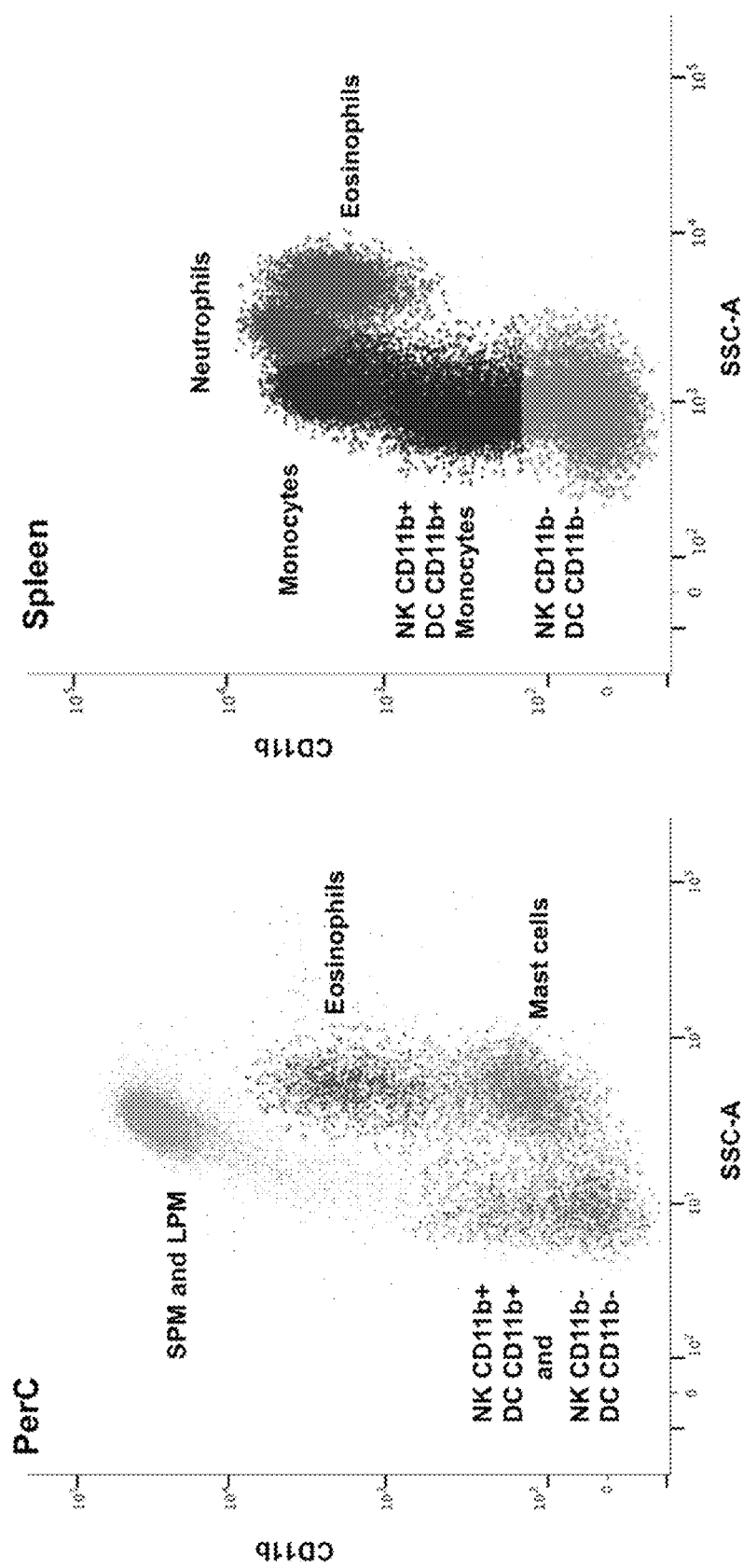
FIG. 7 includes dot plots of PerC and Spleen samples showing matched and unmatched clusters for Example 4.

FIG. 6B includes the tables showing the computed QF dissimilarity scores that compare data for the wild-type reference sample (BALB/c) and for the sample that completely lacks T and B lymphocytes (RAG$^{-/-}$). The unmatched clusters, specifically #3, #4, and #5 highlighted in yellow in the tables, were automatically considered as merging candidates in the method 100. However, calculation of new dissimilarity scores after merging with nearest clusters (shown in the table on the right) didn't decrease any of the initial dissimilarity scores, which indicated that the unmatched clusters were missing clusters, confirming that that RAG$^{-/-}$ mice completely lacked T and B lymphocyte compartments.

Example 4—Cluster Matching of the Murine Lymphoid, Myeloid and Granuloid Lineages Between PerC and Spleen Mouse PerC and spleen datasets were generated at the direction of the inventors using adult (>8 wks) naïve wild-type C57BL/6 strain. Peritoneal cells were harvested by injecting 6 ml of custom RPMI-1640 media into the peritoneal cavity. Spleens were mechanically disrupted to obtain single cell suspension. Cells were filtered over a 70 μm nylon filter and erythrocytes were lysed using ACK buffer. Cells were resuspended at 100×10$^6$ cells/ml and stained on ice for 30 min with a reagent panel that detects a total of 12 parameters. Stained cells were resuspended in 10 ug/ml propidium iodide (PI) to enable exclusion of dead cells. PerC and spleen from wild-type mouse were processed into a single cell suspension and stained with fluorochrome-conjugated monoclonal antibodies in a 12-parameter Hi-D flow cytometry panel (10-color+Side and Forward Scatter).

PerC and Spleen cells were analyzed on Stanford Shared FACS Facility instruments (BD LSRII) equipped with 4 lasers (405 nm, 488 nm, 532 nm, and 640 nm) and 19 PMTs. Data were collected for 0.2×10$^6$ to 2×10$^6$ cells. All datasets were stored immediately after collection into a stable long-term archive maintained by the Stanford Shared FACS Facility.

Data were then pre-preprocessed and clustered using the AutoGate application. The following gating strategy was employed during preprocessing: FSC-H/FSC-A→Propidium Iodide$^-$ (live cells)/FSC-A→CD19$^-$/CD5$^-$→SSC-A/CD11b. The preprocessed data was then aligned between samples using method 100 implemented as a new feature in the AutoGate analysis application. Using a dataset for side scatter (SSc-A, which correlates with cell granularity) and CD11b surface marker measures, the inventors matched mouse PerC and spleen samples to explore differences in the representation of the lymphoid, myeloid and granuloid subsets. The Hi-D panel used in this study identifies the following murine immune cell subsets: lymphoid (NK cells), myeloid (monocytes, macrophages, and dendritic cells), and granuloid (neutrophils, eosinophils and mast cells). As shown in FIG. 7, the clusters highlighted in the same color represented the cell subsets that were matched between PerC and spleen. Unmatched cell subsets were highlighted in light blue for the PerC sample and in violet for the spleen sample. This was a robust test of the cluster matching method because while the type of immune cells present in PerC and spleen are quite different from each other—naïve spleen is virtually absent of mast cells and of small and large peritoneal macrophages (SPM and LPM, respectively), and naïve PerC have very few monocytes and neutrophils—they still share some types of immune cells, including dendritic cells (DC), natural killer cells (NK), and eosinophils. The method successfully aligned the immune cell subsets that are shared between spleen and PerC (marked in the same colors in FIG. 7) and detected the missing cell subsets (marked in different colors in FIG. 7).

Example 5—Guided Gating of SSc Eosinophil Data

Figure 22:
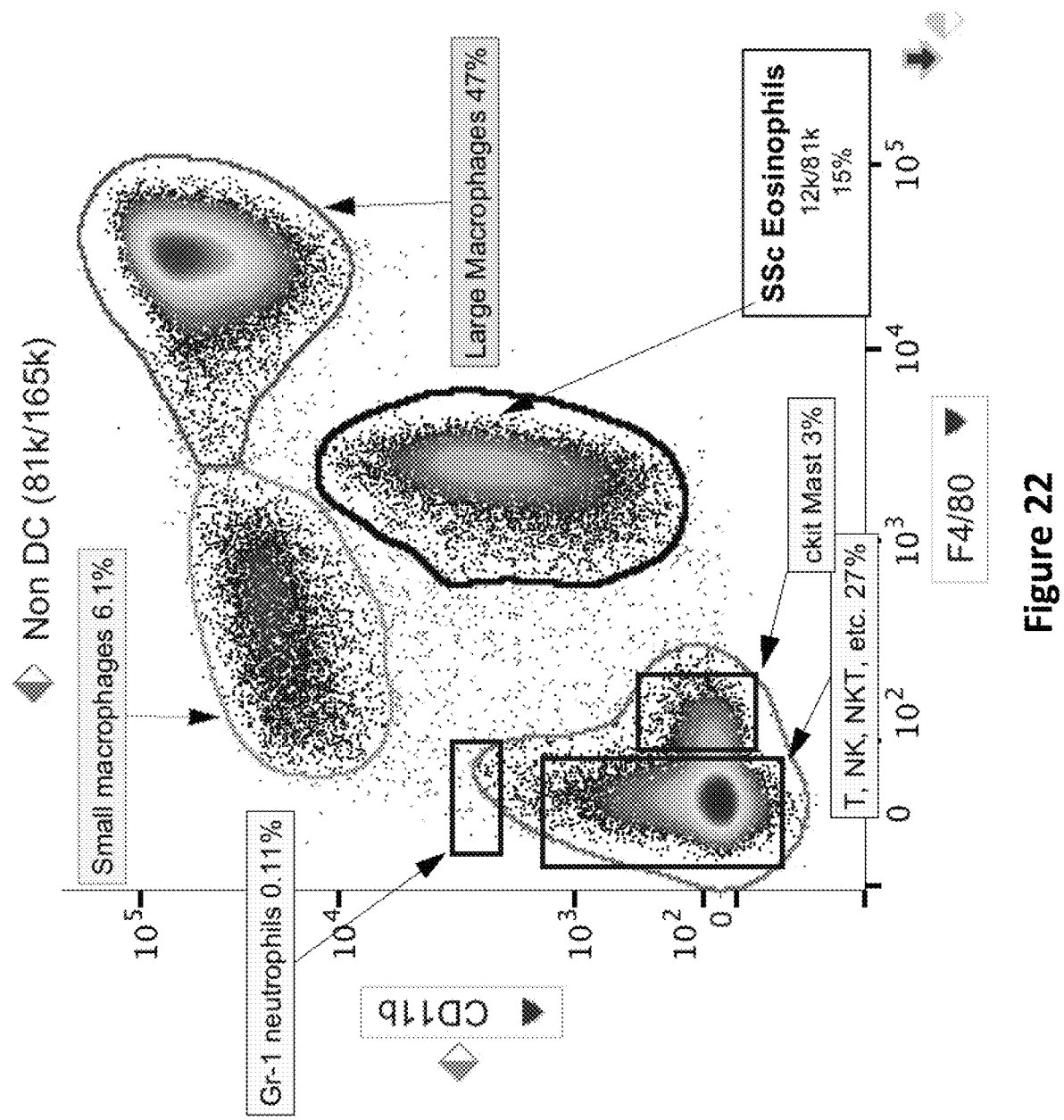
FIG. 22 shows a 2D cluster plot display corresponding to clustered data in a plot editor window for CD11b and F4/80 with the SSc Eosinophils cluster selected in accordance with an embodiment.
Figure 23:
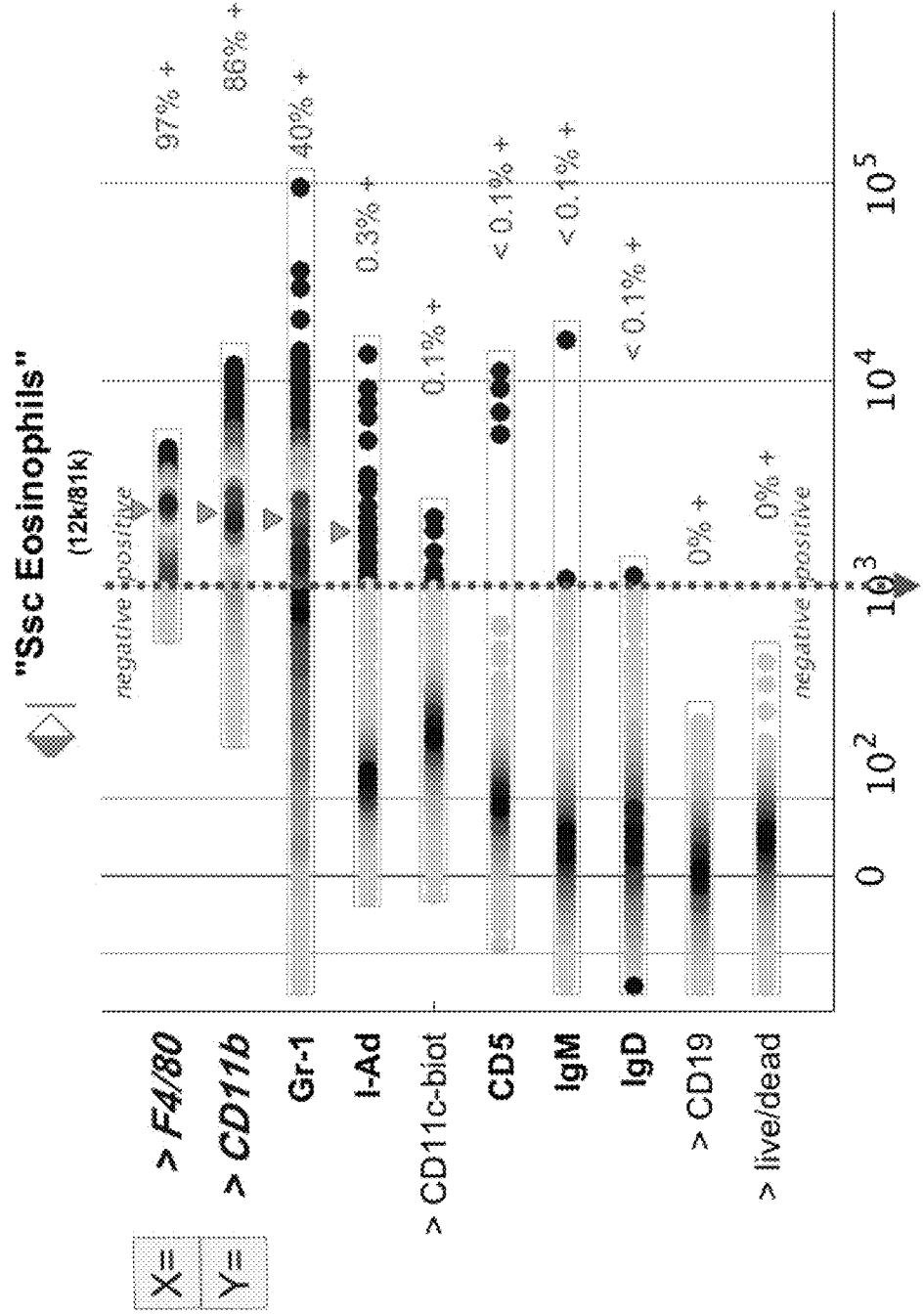
FIG. 23 shows a portion of guidance window for the selected SSc Eosinophils cluster data from FIG. 22 with the densities for various dimensions shown in pseudo color in accordance with an embodiment.
Figure 24:
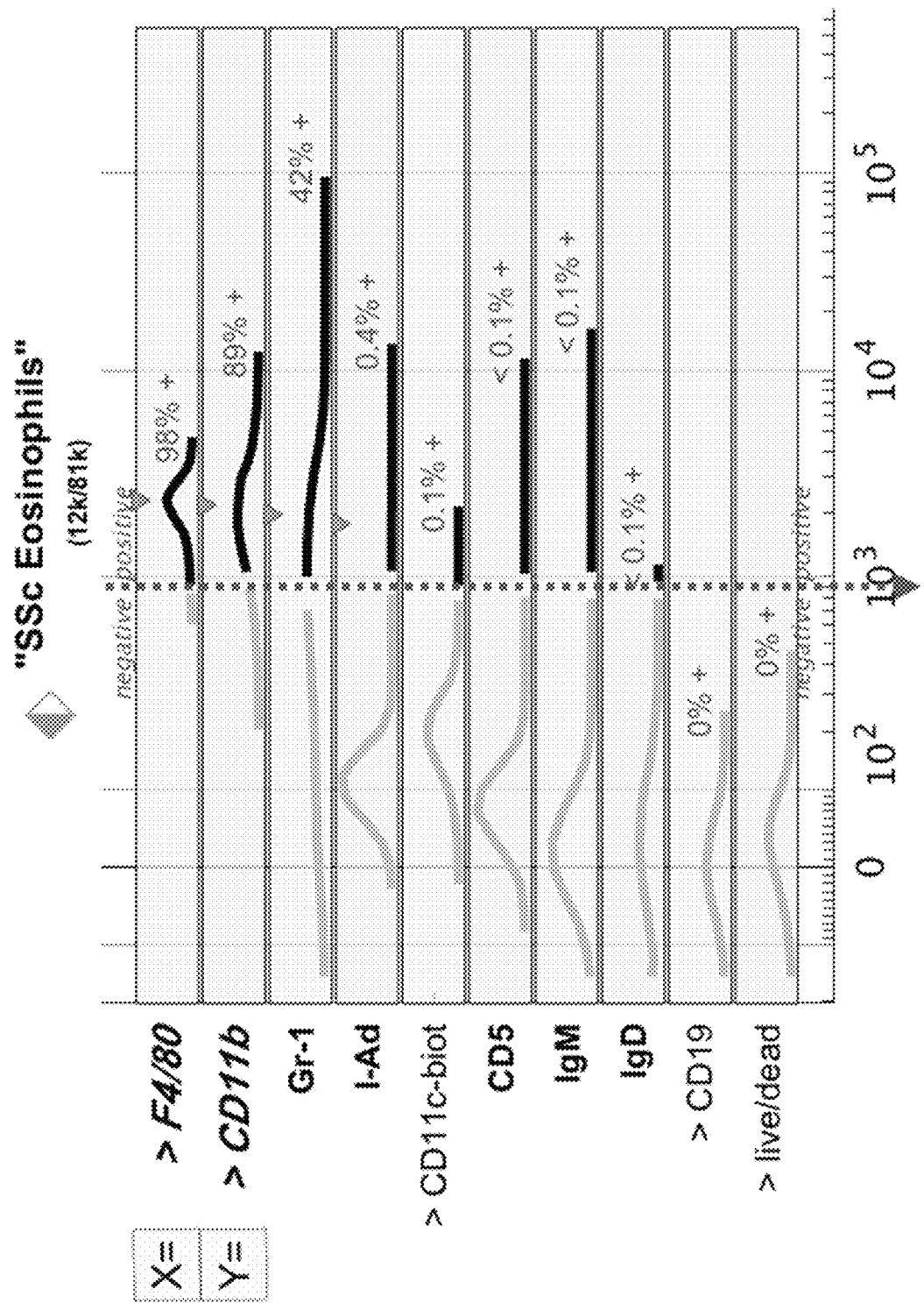
FIG. 24 shows a portion of a guidance window for the selected SSc Eosinophils cluster data from FIG. 22 with the densities for various dimensions shown as a histogram in accordance with an embodiment.
Figure 25:
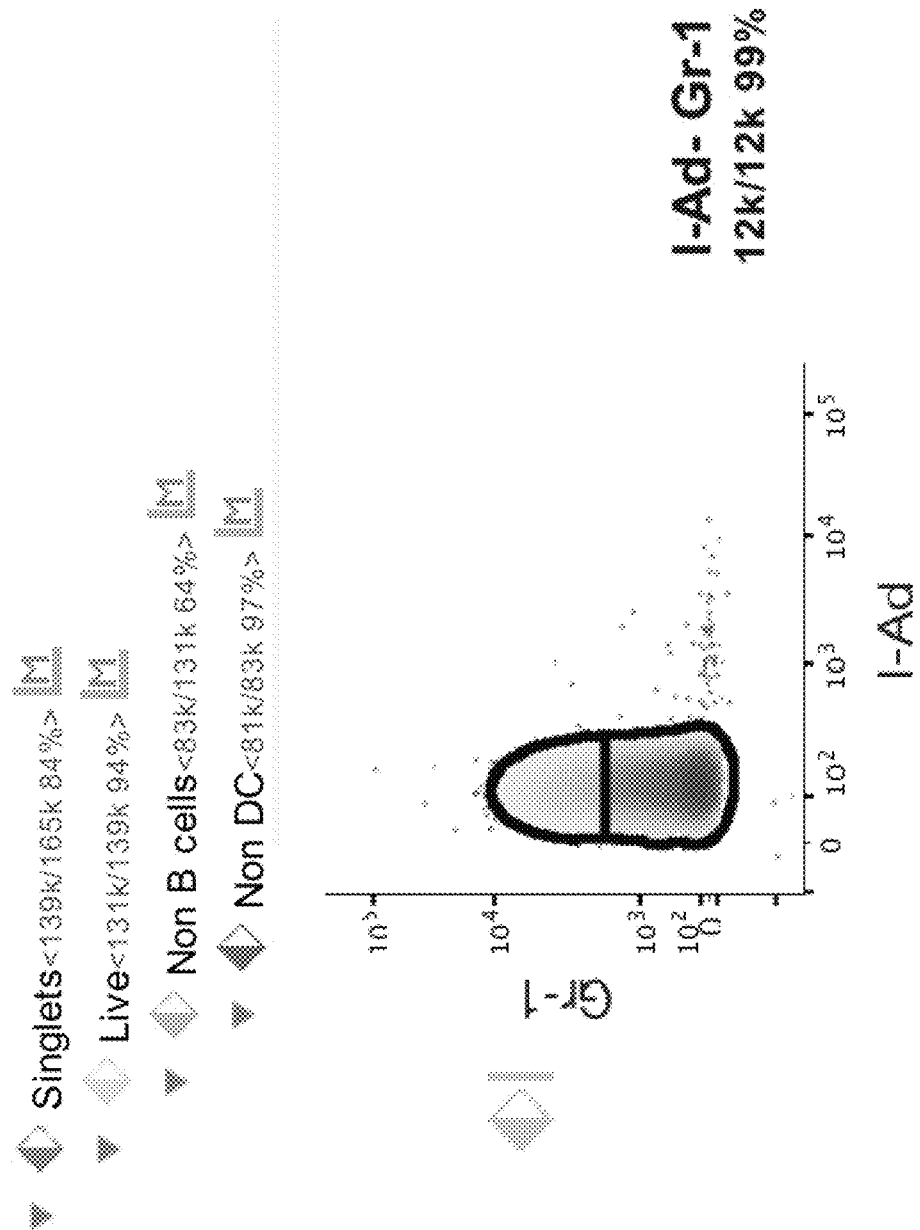
FIG. 25 shows a 2D cluster plot for new selected markers, specifically GR-1 and I-Ad, for determination of a subsequent gate in accordance with an embodiment.

The inventors incorporated the guidance window functionality described above into the AutoGate application for guided gating of data. Specifically, the guidance window and associated functionality was implemented as a MATLAB object oriented class definition called within the AutoGate application. Initially, a guidance window was used to show density distributions for a selected subset of data in a 2D cluster plot displayed in a plot editor window (see selected SsC Eosinophils in 2D cluster plot in FIG. 22). Specifically, The guidance window was used to probe for positive staining of SSc Eosinophils. The guidance window showed densities for various dimensions and markers in pseudo color (see FIG. 23) and as histograms (see FIG. 24) based on user selections. In FIG. 22, the 2D cluster plot shows CD11b values on the y-axis versus F4/80 values on the x-axis. The SSc Epsinophil gate was then subset on the next highest positive stains indicated by the guidance window as follows. As shown in FIGS. 23 and 24, the two markers for SSc Eosinophils that have higher positive staining (as shown by the single parameter/single marker plots and the indications of median values) and have not previously been used in a gate (as indicated by the lack of lack of italics and ">" in the corresponding label) are I-Ad and Gr-1. The user selects these markers by dragging the "x-label" to the I-Ad marker and dragging the "y-label" to the Gr-1 marker in the guidance window and, based on this user selection, the system changes the 2-D plot in the guidance window to show I-Ad data versus Gr-1 data (see FIG. 25). The SSc Epsinophil gate was subset on the next highest positive stains indicated by the guidance window (see FIG. 25).

Figure 26:
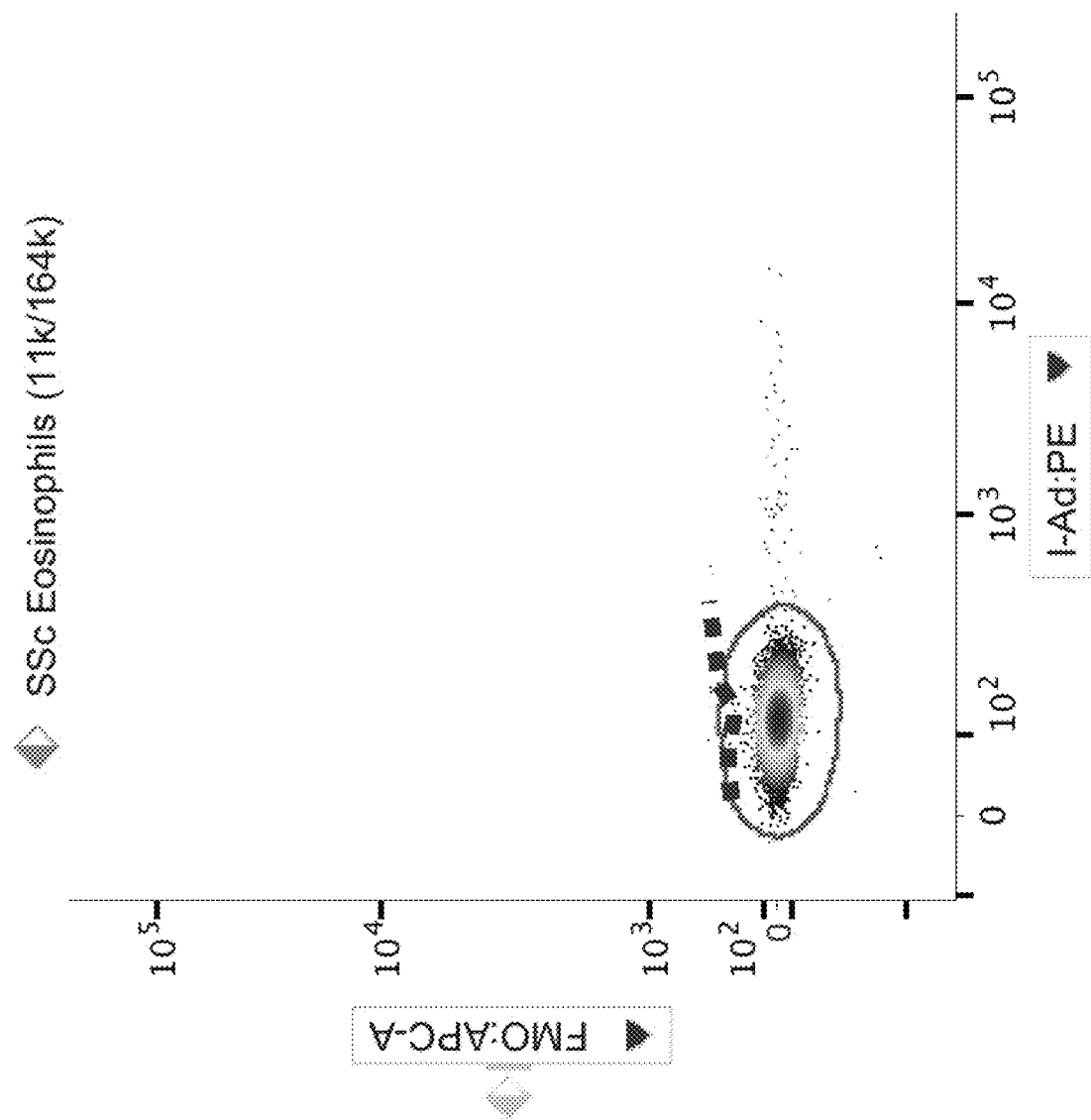
FIG. 26 shows FMO sample data for Gr-1 and a dotted line corresponding to the $99^{th}$ percentile in accordance with an embodiment.

In some embodiments, the user can chose to overlay the sample data with FMO control sample data and the system ensures that all of the gates for finding Ssc Eosinophils in the current sample data are duplicated in the FMO sample using the same reagents. The level of Gr-1 staining at the 99$^{th}$ percentile within an FMO sample is determined with the same gating (see FIG. 26 showing 2D plot of FMO data with all gates applied and 99$^{th}$ percentile line).

Figure 27:
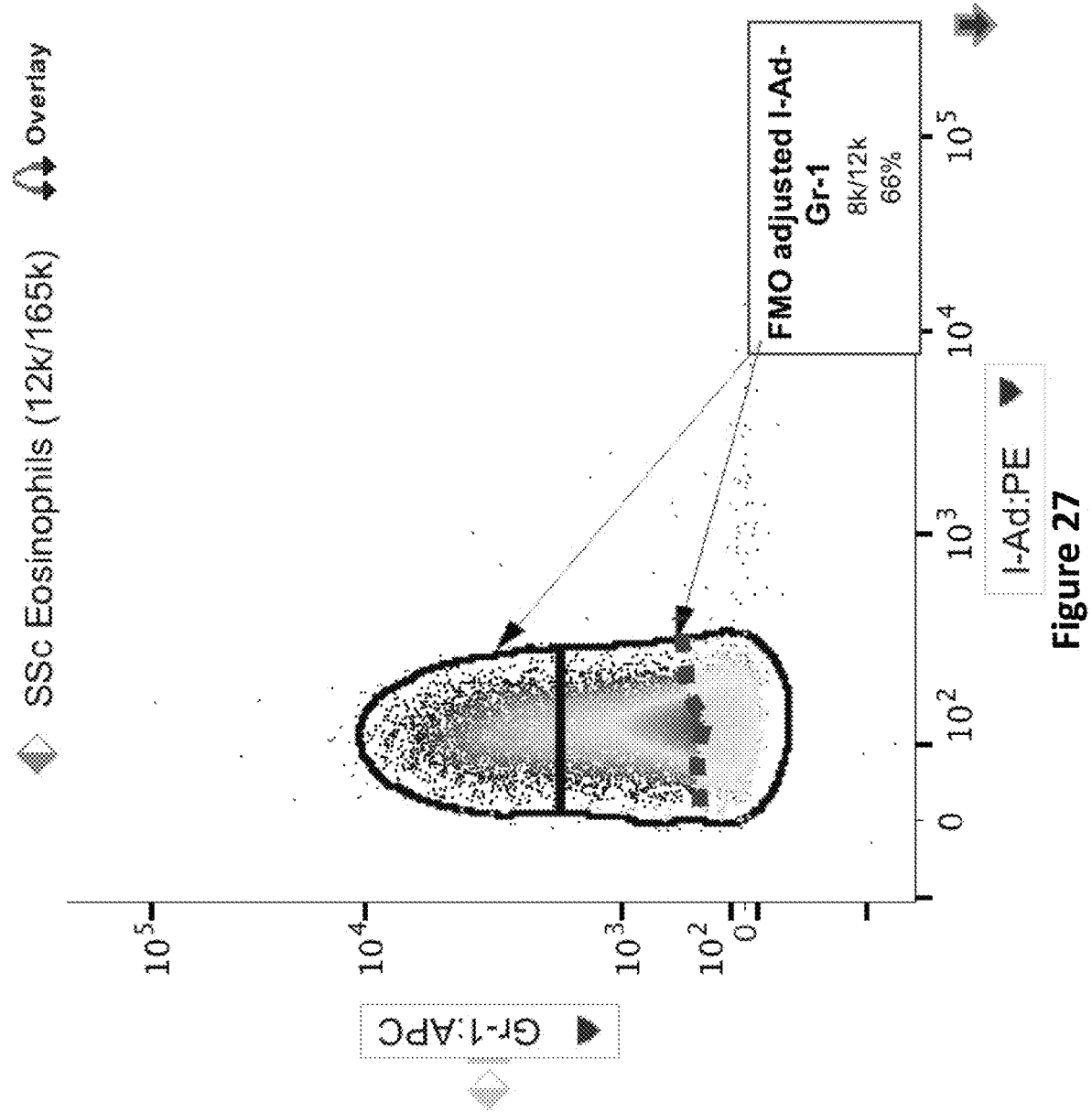
FIG. 27 shows the 2D cluster plot of FIG. 25 after application of the $99^{th}$ percentile line from the FMO sample as a gating border in accordance with an embodiment.

The percentile line from the FMO sample is then overlaid as a gating border to eliminate the 4 k cells not expressing real Gr-1:APC staining as shown in FIG. 27.

While the present invention has been described with reference to the specific embodiments and examples thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. A computer implemented method of matching clusters in data corresponding to different samples, the method comprising:
    obtaining or receiving first sample data, second sample data, an identification of one or more clusters in the first sample data, and an identification of one or more clusters in the second sample data;
    performing multivariate adaptive binning on a combined data set including the first sample data and the second sample data to determine a combined binning pattern;
    applying the combined binning pattern separately to the first sample data and the second sample data;
    for at least two different combinations of a first identified cluster in the first sample data and a second identified cluster in the second sample data, determining a dissimilarity score for the combination based on a quadratic form distance for multi-dimensional data using the combined binning pattern applied to the first identified cluster and the combined binning pattern applied to the second identified cluster;
    identifying one or more matched clusters and one or more merging candidates based on comparisons of the determined dissimilarity scores for the combinations; and
    determining, for each merging candidate in the first sample data or the second sample data, whether the merging candidate corresponds to a split of a cluster in the other sample data or corresponds to a missing cluster in the other sample data.

2. The method of claim 1, wherein the dissimilarity score for a first cluster in the first sample data and a second cluster in the second sample data is determined based on the following equation:

$$D^2(h,f) = (h-f)^T A(h-f) = \Sigma_{i=1}^n \Sigma_{j=1}^n a_{ij}(h_i-f_i)(h_j-f_j),$$

in which $h_i$ are the relative frequencies of the first cluster in the first sample data based on the combined binning pattern applied to the first cluster, $f_i$ are the relative frequencies of the second cluster in the second sample data based on the combined binning pattern applied to the second cluster, and $A=[a_{ij}]$ is a matrix of spatial dissimilarity between a bin i in the combined binning pattern of the first cluster in the first sample data and a bin j in the combined binning pattern of the second cluster in the second sample data.

3. The method of claim 2, wherein $a_{ij}=1-d_{M_{ij}}/d_{max}$, where $d_{M_{ij}}$ is the Euclidean distance between centers of mass as calculated on the combined data set of the ith and jth bins in the combined binning pattern, and $d_{max}$ is the maximum value of all the $d_{M_{ij}}$.

4. The method of claim 1, wherein identifying one or more matched clusters and one or more merging candidates based on comparisons of the determined dissimilarity scores for the combinations comprises:
    determining a lowest dissimilarity score for each cluster in the first sample data and the second sample data; and
    for each cluster:
        identifying the cluster as matched to a corresponding cluster in the other sample data where the lowest dissimilarity score for the cluster in the first sample data or the second sample data is also the lowest dissimilarity score for the corresponding cluster in the other sample data; and
        identifying the cluster as a candidate merging cluster where the lowest dissimilarity score for the cluster in the first sample data or the second sample data is not the lowest dissimilarity score for the corresponding cluster in the other sample data set.

5. The method of claim 1, wherein determining, for each merging candidate in the first sample data or the second sample data, whether the merging candidate corresponds to a split of a cluster in the other sample data or corresponds to a missing cluster in the other sample data comprises:
    combining the merging candidate with the nearest cluster in the same sample data and calculating a new dissimilarity score for the combined cluster;
    identifying the merging candidate as a split of the corresponding cluster in the other sample data where the new dissimilarity score is equal to or lower than the lowest prior dissimilarity score for the nearest cluster, and using the combination of the merging candidate and the nearest cluster as a merged cluster matched to the corresponding cluster for any further determinations of whether a merging candidate corresponds to a split of a cluster or a missing cluster; and
    identifying the candidate merging cluster as missing from the other sample where the new dissimilarity score is higher than the lowest prior dissimilarity score for the nearest matched cluster.

6. The method of claim 1, wherein the multivariate adaptive binning is performed in k-dimensions and wherein performing multivariate adaptive binning on the combined data set including the first sample data and the second sample data to determine the combined binning pattern comprises determining and dividing the combined data set into k-dimensional bins such that each bin contains the same number of events, wherein k is between 2 and 50.

7. The method of claim 1, wherein applying the combined binning pattern separately to the first sample data and the second sample data comprises, for at least three of the identified clusters collectively across the first sample data and the second sample data, generating a histogram for the identified cluster based on the combined binning pattern.

8. The method of claim 7, wherein determining the dissimilarity score for the combination based on the quadratic form distance for multi-dimensional data using the combined binning pattern applied to the first identified cluster and the combined binning pattern applied to the second identified cluster comprises using the histogram generated for the first identified cluster and the histogram generated for the second identified cluster in the determination of the dissimilarity score.

9. The method of claim 1, wherein a dissimilarity score is determined for each combination of an identified cluster in the first sample data and an identified cluster in the second sample data.

10. The method of claim 1, wherein the first sample data and the second sample data include cytometry data, and wherein the method is a method for aligning cell subsets in different cytometry samples.

11. The method of claim 1, wherein at least one of the dimensions in the multivariate adaptive binning corresponds to measured fluorescence data in spectral ranges corresponding to markers in the first sample data and the second sample data.

12. The method of claim 1, wherein the method further comprises:
    for each matched cluster in the first data sample or the second data sample and each corresponding cluster in the other data sample, determining a distance between a geometric mean of the matched cluster and a geometric mean of the corresponding cluster.

13. The method of claim 12, wherein the method further comprises:
for a distance between the geometric mean of the matched cluster and the geometric mean of the corresponding cluster exceeding a threshold value, identifying the matched cluster and the corresponding cluster as unmatched.

14. A system for matching clusters in data corresponding to different samples, the system comprising:
memory in communication with storage configured to store first sample data, second sample data, an identification of one or more clusters in the first sample data, and an identification of one or more clusters in the second sample data; and
a processor comprising:
an adaptive binning module configured to perform multivariate adaptive binning on a combined data set including the first sample data and the second sample data to determine a combined binning pattern;
a dissimilarity module configured to, for at least two combinations of a first identified cluster in the first sample data and a second identified cluster in the second sample data, determine a dissimilarity score for the combination based on a quadratic form distance for multi-dimensional data using the combined binning pattern applied to the first identified cluster in the first data set and the combined binning pattern applied to the second identified cluster in the second data set;
a matching and merging candidate identification module configured to identify one or more matched clusters and one or more merging candidates based on comparisons of the determined dissimilarity scores for the combinations; and
a determination module configured to determine, for each merging candidate in the first sample data or the second sample data, whether the merging candidate corresponds to a split of a cluster in the other sample data or corresponds to a missing cluster in the other sample data.

15. The system of claim 14, wherein the adaptive binning module or the dissimilarity module is further configured to apply the combined binning pattern separately to the first sample data and the second sample data.

\* \* \* \* \*